United States Patent [19]

Sato et al.

[11] Patent Number: 5,513,345
[45] Date of Patent: Apr. 30, 1996

[54] SEARCHING SYSTEM FOR DETERMINING ALTERNATIVE ROUTES DURING FAILURE IN A NETWORK OF LINKS AND NODES

[75] Inventors: Yasuyuki Sato, Iwate; Keiji Miyazaki, Kawasaki; Kohei Iseda, Kawasaki; Takafumi Chujo, Kawasaki, all of Japan

[73] Assignee: Fujitsu Limited, Kanagawa, Japan

[21] Appl. No.: 405,606

[22] Filed: Mar. 17, 1995

[30] Foreign Application Priority Data

Mar. 18, 1994 [JP] Japan .................................. 6-049554

[51] Int. Cl.$^6$ .......................... G06F 13/00; H04L 12/00; H04Q 11/04
[52] U.S. Cl. .............................. 395/182.02; 395/183.19
[58] Field of Search .................................. 395/575, 325, 395/183.19, 182.02; 370/54, 60.1

[56] References Cited

U.S. PATENT DOCUMENTS

| | | | |
|---|---|---|---|
| 4,686,669 | 9/1987 | Chang | 370/54 |
| 4,905,233 | 2/1990 | Cain et al. | 370/94.1 |
| 4,999,771 | 3/1991 | Ralph et al. | 364/200 |
| 5,086,499 | 2/1992 | Mutone | 364/200 |
| 5,113,390 | 5/1992 | Hayashi et al. | 370/65 |
| 5,367,642 | 11/1994 | Dally | 395/325 |
| 5,377,333 | 12/1994 | Nakagoshi et al. | 395/325 |
| 5,396,638 | 3/1995 | Kanekura | 395/775 |

FOREIGN PATENT DOCUMENTS 2-168760  6/1990  Japan .

OTHER PUBLICATIONS

Grover, W. D., "The Selfhealing™ Network: A Fast Distributed Restoration Technique for Networks Using Digital Crossconnect Machines", Globecom '88, pp. 28.2.1–28.2.6, Nov. 1987.
Grover, W. D., et al., "Performance Studies of a Selfhealing Network Protocol in Telecom Canada Long Haul Networks", Globecom '90, pp. 403.3.1–403.3.7, Dec. 1990.
Yang, C. Han, et al., "Fitness: Failure Immunization Technology for Network Service Survivability", Globecom '88, pp. 47.31–47.3.6, Dec. 1988.
Miyazaki, K. et al., "Spare Capacity Assignment for Muliptle–Link Failure", IWACA '92, Mar. 1992.
Sakau Chi, H., et al., "A Self–Healing Network with an Economical Spare–Channel Assignment", Globecom '90, pp. 403.1.1–403.1.6, Dec. 1990.
Chujo, T., et al., "The Design and Simulation of an Intelligent Transport Network with Distributed Control", NOMS '90, pp. 11.4.1–11.4.12, Feb. 1990.
Komine, H., et al., "A Distributed Restoration Algorithm for Multiple–Link and Node Failures of Transport Networks", Globecom '90, pp. 403.4.1–403.4.5, Dec. 1990.

Primary Examiner—Robert W. Beausoliel, Jr.
Assistant Examiner—Alan M. Fisch

[57] ABSTRACT

A system for searching for alternative routes in a network at the time of a failure in a node or link which executes a stage for initiation of failure restoration processing which starts up failure restoration processing in accordance with various types of messages when a failure occurs at a link or node, a stage for processing a restoration message for searching for an alternative route, a stage for processing an acknowledgment message for reserving an alternative route, a stage for processing a cancellation message for cancelling reservation of an alternative route, a stage for processing a confirmation message for confirming a reserved alternative route and making a switching of cross-connect equipment, a stage for processing a cross-connection completion message for notifying the completion of switching of the cross-connect equipment to the nodes, a stage for processing a cross-connection acknowledgment message for confirming the completion of switching of all of the cross-connect equipment on the alternative route, and a stage for processing a cross-connection confirmation message for performing processing to complete the search for an alternative route and which thereby searches for alternative routes autonomously in a distributed manner.

14 Claims, 51 Drawing Sheets

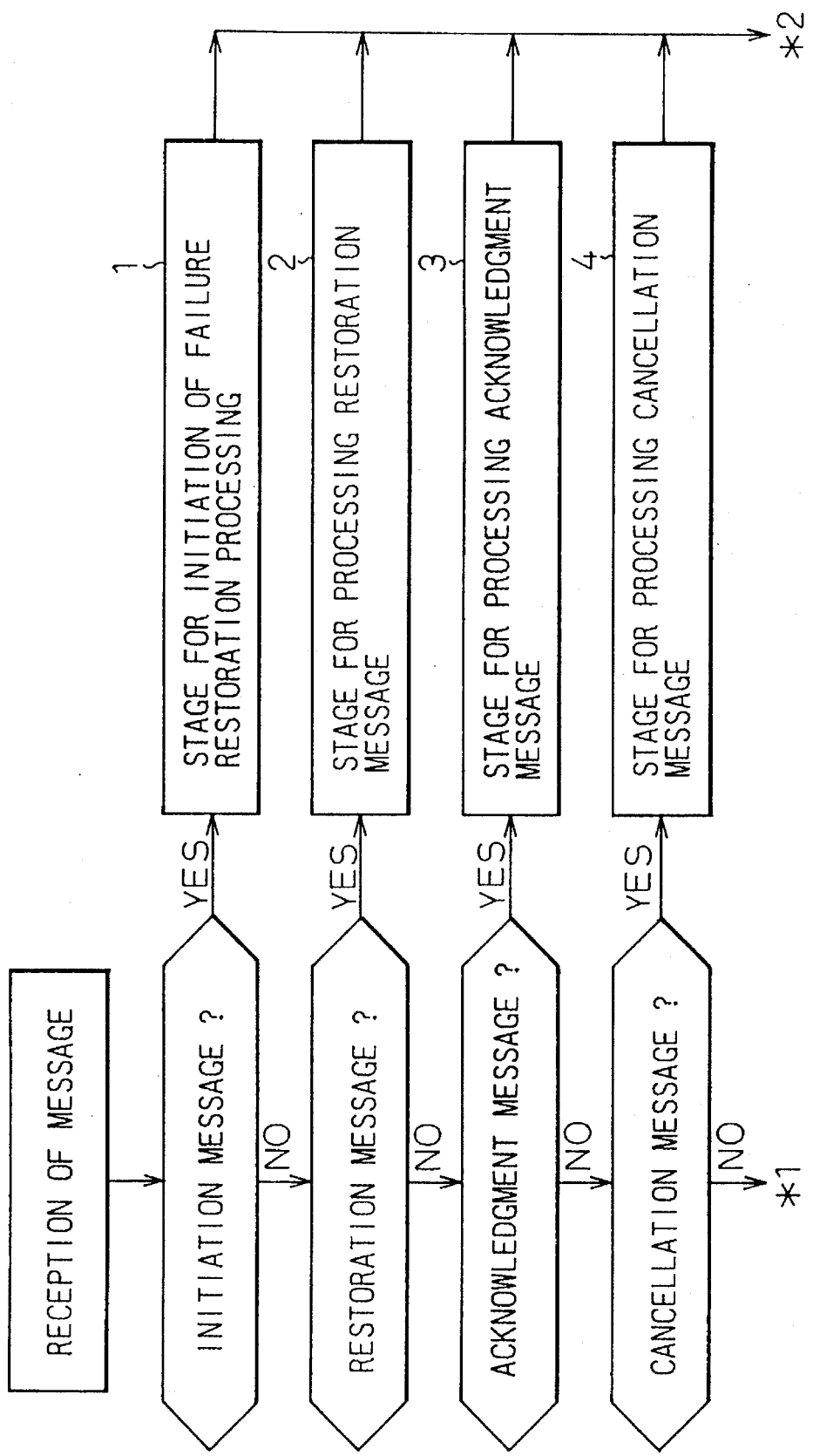

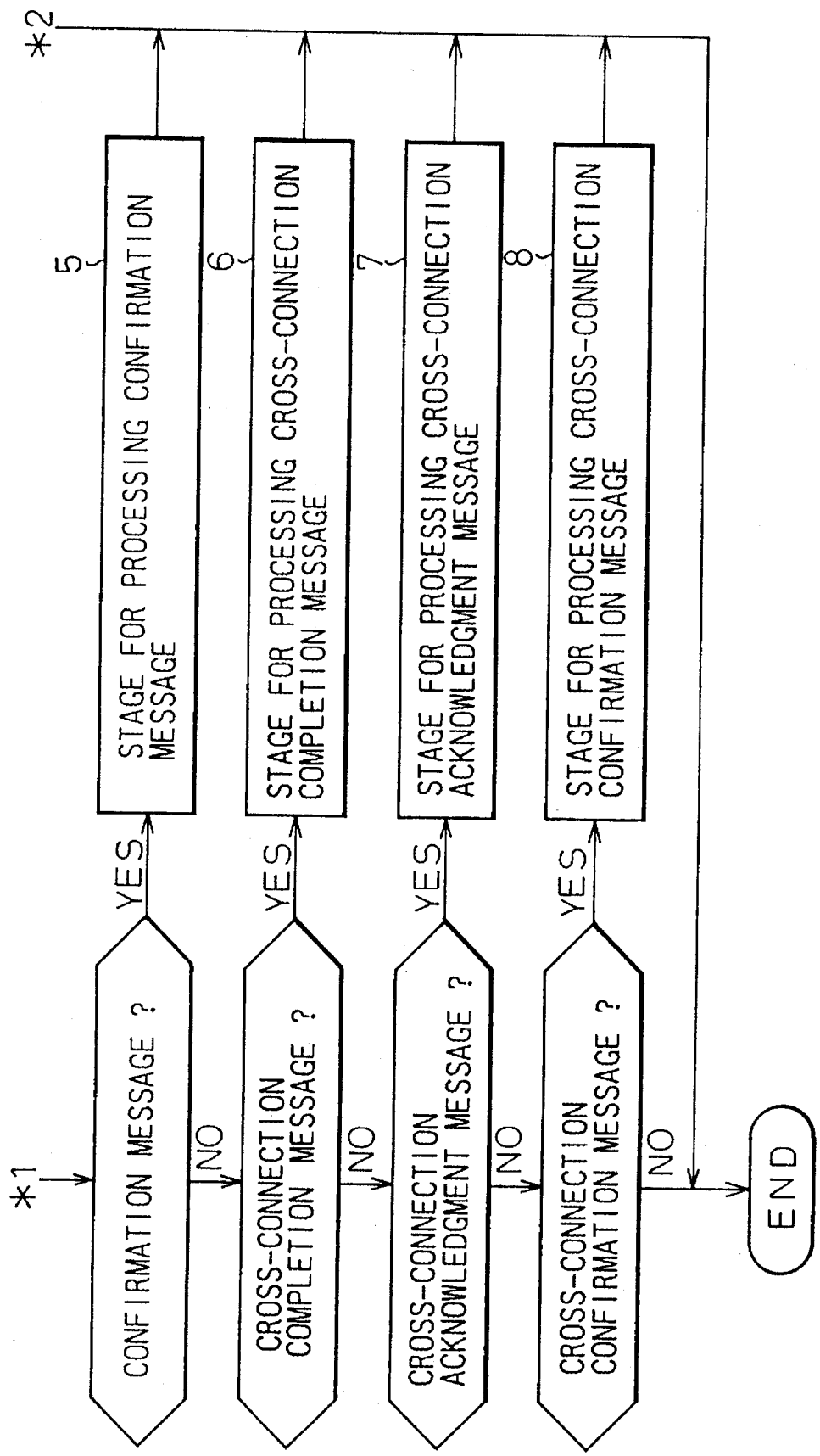

STAGE FOR PROCESSING RESTORATION MESSAGE

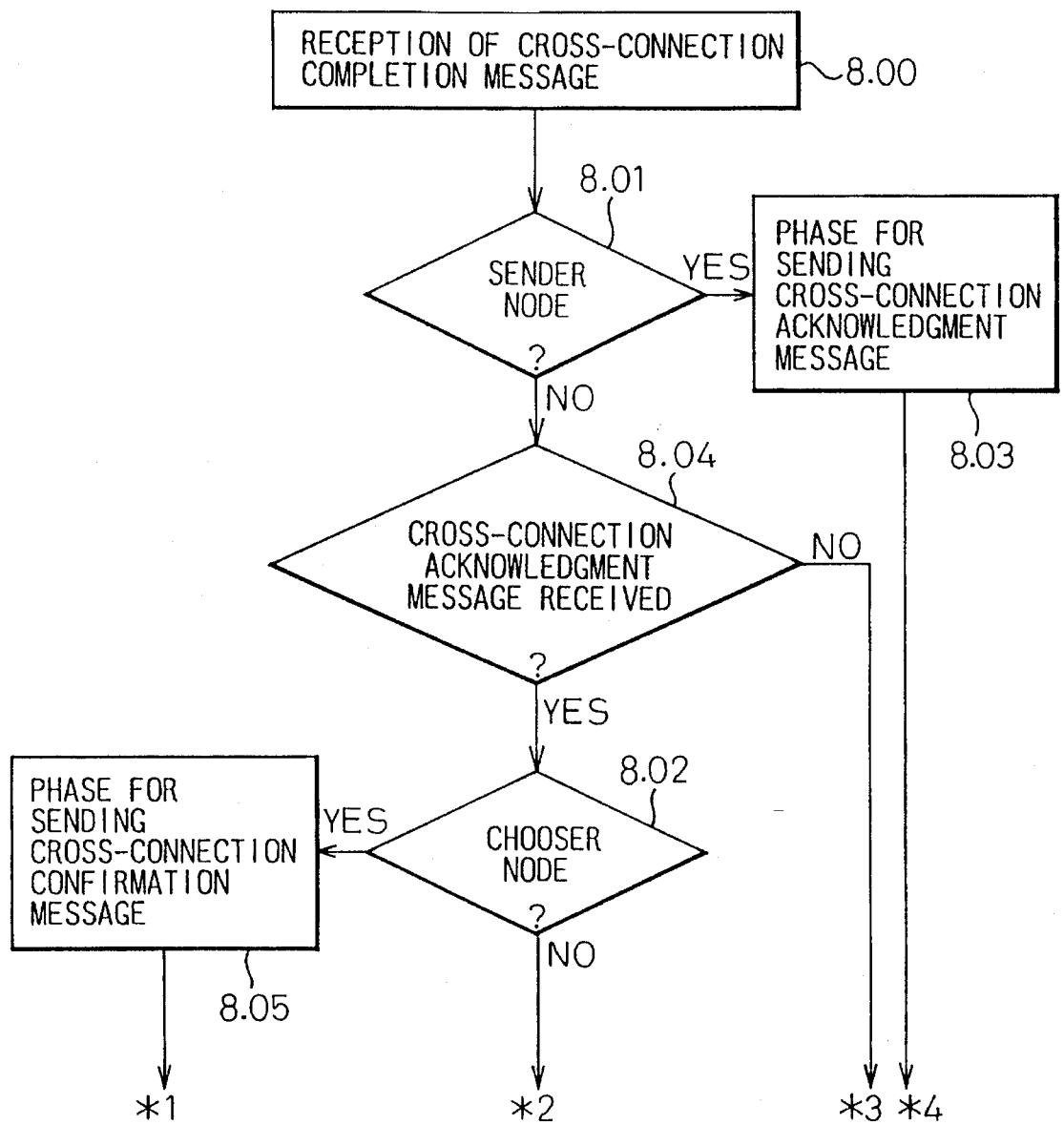

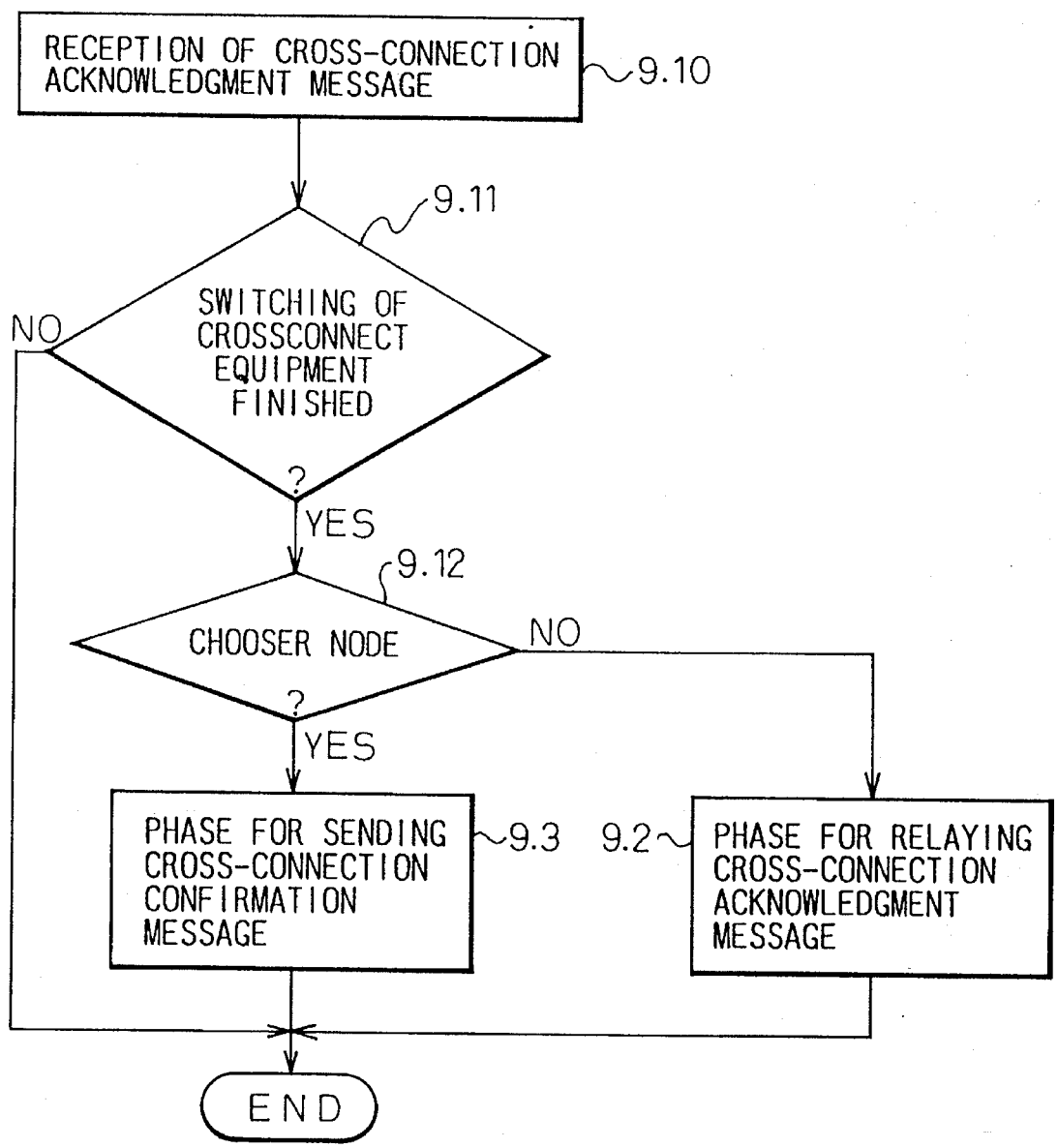

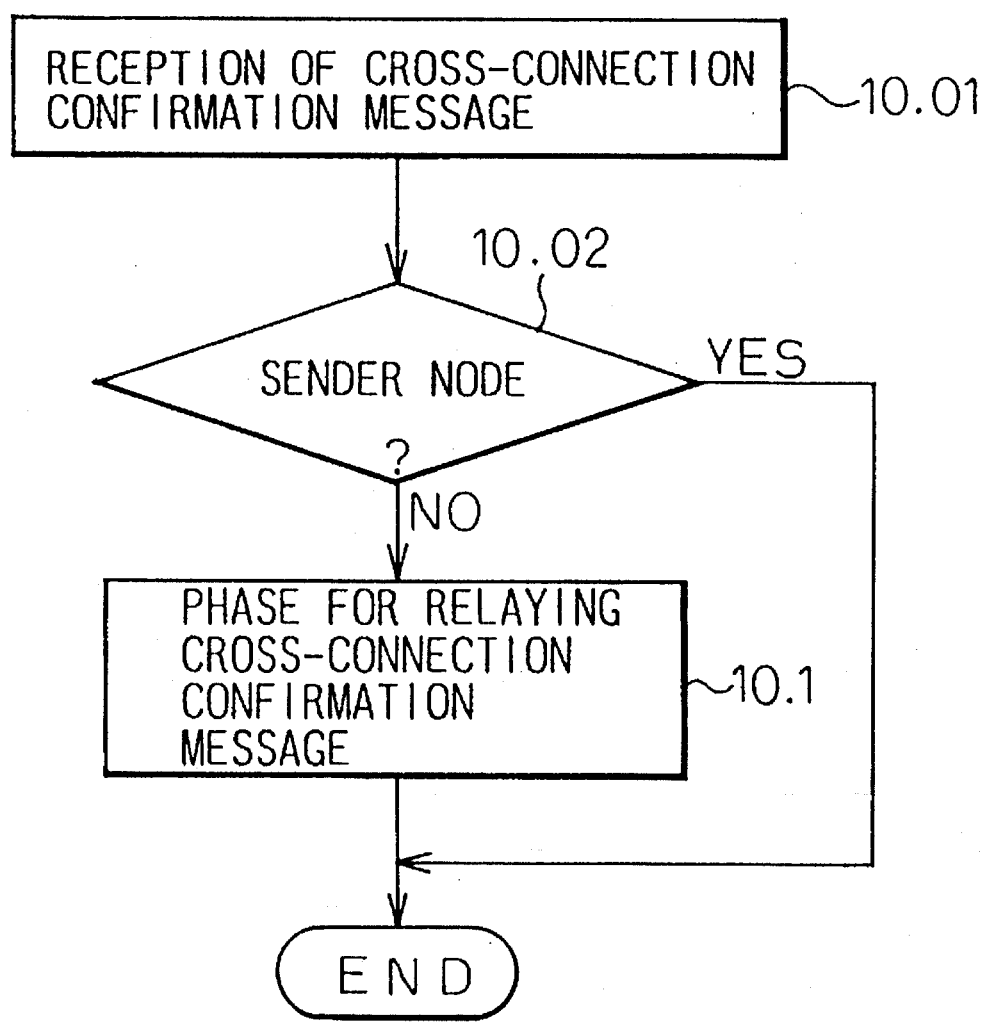

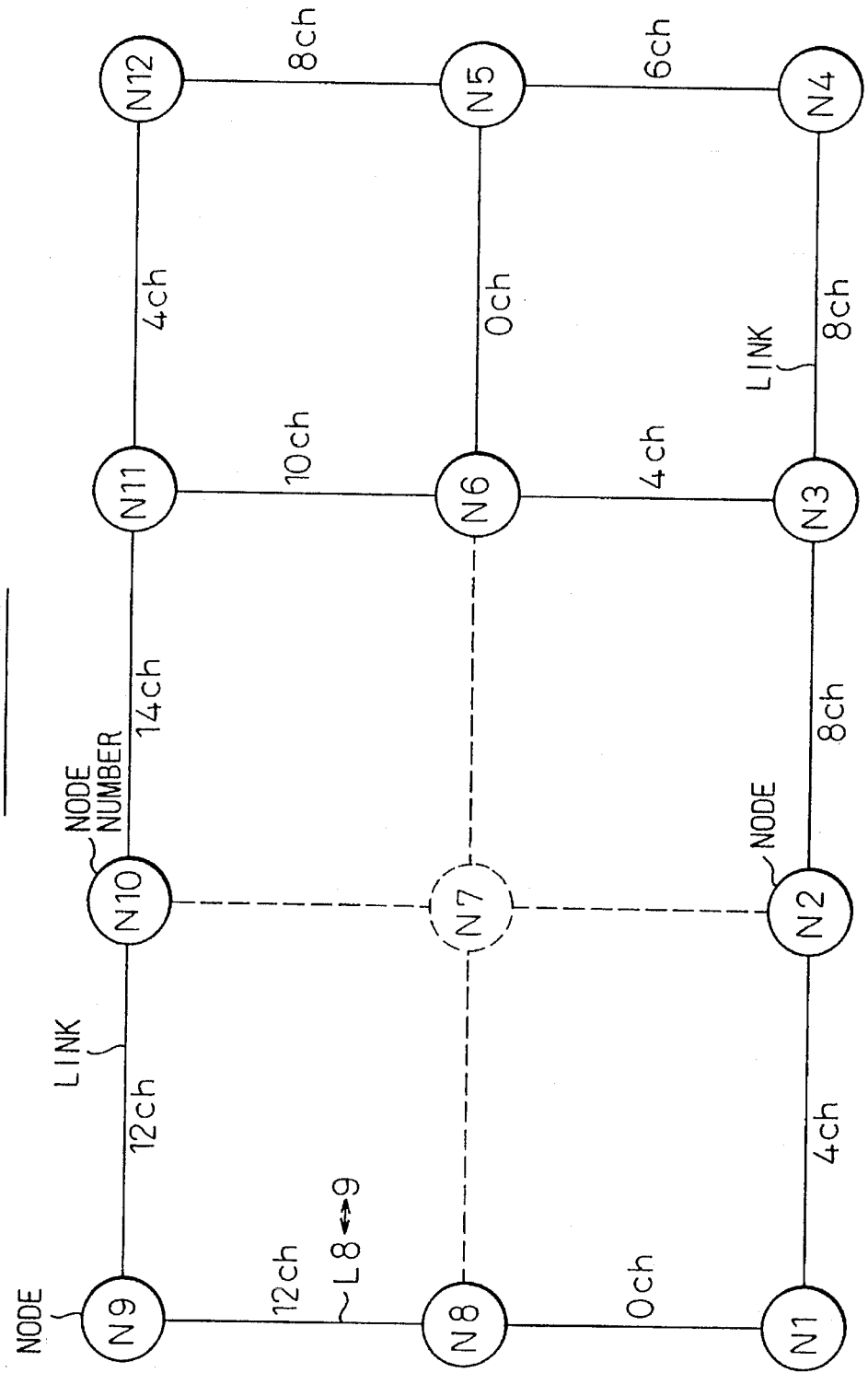
Fig.10 SCENARIO (1)

SCENARIO (2)

SCENARIO (3)

SCENARIO (4)

SCENARIO (5)

Fig. 15 SCENARIO (6)

Fig. 16 SCENARIO (7)

SCENARIO (8)

SCENARIO (9)

SCENARIO (10)

SCENARIO (11)

SCENARIO (12)

Fig. 24 SCENARIO (15)

SCENARIO (17)

Fig. 27 SCENARIO (18)

SCENARIO (19)

SCENARIO (20)

Fig. 30

RESTORATION MESSAGE CREATED AT NODE N8

| ELEMENTS | VALUES |
|---|---|
| COMMAND NUMBER | RESTORATION COMMAND |
| SENDER NODE | N8 |
| LIST OF CHOOSER NODE NUMBERS | N7, N2, N6, N0 |
| LIST OF NUMBER OF REQUESTED CHANNELS | 2, 4, 8, 0 |
| NUMBER OF AVAILABLE CHANNELS | 14 |
| NUMBER OF HOPS | 9 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | EMPTY |
| LIST OF TRACED NODE NUMBERS | EMPTY |

Fig. 31

RESTORATION MESSAGE TRANSMITTED FROM NODE N9 TO NODE N10

| ELEMENTS | VALUES |
|---|---|
| COMMAND NUMBER | RESTORATION COMMAND |
| SENDER NODE | N8 |
| LIST OF CHOOSER NODE NUMBERS | N7, N2, N6, N0 |
| LIST OF NUMBER OF REQUESTED CHANNELS | 2, 4, 8, 0 |
| NUMBER OF AVAILABLE CHANNELS | 12 |
| NUMBER OF HOPS | 8 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | EMPTY |
| LIST OF TRACED NODE NUMBERS | EMPTY |

Fig. 32

ACKNOWLEDGMENT MESSAGE CREATED AT NODE N6

| ELEMENTS | VALUES |
|---|---|
| COMMAND NUMBER | ACKNOWLEDGE COMMAND |
| SENDER NODE | N8 |
| LIST OF CHOOSER NODE NUMBERS | N7, N6, N0, N0 |
| LIST OF NUMBER OF REQUESTED CHANNELS | 0, 8, 0, 0 |
| NUMBER OF AVAILABLE CHANNELS | 8 |
| NUMBER OF HOPS | 1 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | N6 |
| LIST OF TRACED NODE NUMBERS | N6 |

Fig. 33

RESTORATION MESSAGE CONTINUED FROM NODE N6 TO NODE N3

| ELEMENTS | VALUES |
| --- | --- |
| COMMAND NUMBER | RESTORATION COMMAND |
| SENDER NODE | N8 |
| LIST OF CHOOSER NODE NUMBERS | N7, N2, N0, N0 |
| LIST OF NUMBER OF REQUESTED CHANNELS | 2, 4, 0, 0 |
| NUMBER OF AVAILABLE CHANNELS | 4 |
| NUMBER OF HOPS | 5 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | EMPTY |
| LIST OF TRACED NODE NUMBERS | EMPTY |

Fig. 34

ACKNOWLEDGMENT MESSAGE RELAYED FROM NODE N11 TO NODE N10

| ELEMENTS | VALUES |
| --- | --- |
| COMMAND NUMBER | ACKNOWLEDGE COMMAND |
| SENDER NODE | N8 |
| LIST OF CHOOSER NODE NUMBERS | N7, N6, N0, N0 |
| LIST OF NUMBER OF REQUESTED CHANNELS | 0, 8, 0, 0 |
| NUMBER OF AVAILABLE CHANNELS | 8 |
| NUMBER OF HOPS | 2 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | N6, N11 |
| LIST OF TRACED NODE NUMBERS | N6, N11 |

Fig. 35

CANCELLATION MESSAGE CREATED AT NODE N6

| ELEMENTS | VALUES |
| --- | --- |
| COMMAND NUMBER | CANCELLATION COMMAND |
| SENDER NODE | N8 |
| LIST OF CHOOSER NODE NUMBERS | N7, N2, N0, N0 |
| LIST OF NUMBER OF REQUESTED CHANNELS | 0, 4, 0, 0 |
| NUMBER OF AVAILABLE CHANNELS | 2 |
| NUMBER OF HOPS | 2 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | N2, N3 |
| LIST OF TRACED NODE NUMBERS | N2, N3, N6 |

Fig. 36

CONFIRMATION MESSAGE CREATED AT NODE N8

| ELEMENTS | VALUES |
|---|---|
| COMMAND NUMBER | CONFIRMATION COMMAND |
| SENDER NODE | N8 |
| LIST OF CHOOSER NODE NUMBERS | N7, N6, N0, N0 |
| LIST OF NUMBER OF REQUESTED CHANNELS | 0, 8, 0, 0 |
| NUMBER OF AVAILABLE CHANNELS | 8 |
| NUMBER OF HOPS | 4 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | N6, N11, N10, N9, N8 |
| LIST OF TRACED NODE NUMBERS | N6, N11, N10, N9, N8 |

Fig. 37

DUMMY CANCELLATION MESSAGE CREATED AT NODE N3

| ELEMENTS | VALUES |
|---|---|
| COMMAND NUMBER | ACKNOWLEDGE COMMAND |
| SENDER NODE | N8 |
| LIST OF CHOOSER NODE NUMBERS | N7, N2, N0, N0 |
| LIST OF NUMBER OF REQUESTED CHANNELS | 0, 4, 0, 0 |
| NUMBER OF AVAILABLE CHANNELS | 2 |
| NUMBER OF HOPS | 1 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | N2 |
| LIST OF TRACED NODE NUMBERS | N2, N3, N6 |

Fig. 38

ACKNOWLEDGMENT MESSAGE TRANSMITTED FROM NODE N3 TO NODE N4

| ELEMENTS | VALUES |
|---|---|
| COMMAND NUMBER | ACKNOWLEDGE COMMAND |
| SENDER NODE | N8 |
| LIST OF CHOOSER NODE NUMBERS | N7, N2, N0, N0 |
| LIST OF NUMBER OF REQUESTED CHANNELS | 0, 4, 0, 0 |
| NUMBER OF AVAILABLE CHANNELS | 2 |
| NUMBER OF HOPS | 2 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | N2, N3 |
| LIST OF TRACED NODE NUMBERS | N2, N3, N6, N3 |

Fig. 39

CONFIRMATION MESSAGE RELAYED FROM NODE N9 TO NODE N10

| ELEMENTS | VALUES |
|---|---|
| COMMAND NUMBER | CONFIRMATION COMMAND |
| SENDER NODE | N8 |
| LIST OF CHOOSER NODE NUMBERS | N7, N6, N0, N0 |
| LIST OF NUMBER OF REQUESTED CHANNELS | 0, 8, 0, 0 |
| NUMBER OF AVAILABLE CHANNELS | 8 |
| NUMBER OF HOPS | 3 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | N6, N11, N10, N9, N8 |
| LIST OF TRACED NODE NUMBERS | N6, N11, N10, N9, N8, N9 |

Fig. 40

CROSS-CONNECTION ACKNOWLEDGE MESSAGE TRANSMITTED FROM NODE N8 TO NODE N9

| ELEMENTS | VALUES |
|---|---|
| COMMAND NUMBER | CROSS-CONNECTION ACKNOWLEDGE COMMAND |
| SENDER NODE | N8 |
| LIST OF CHOOSER NODE NUMBERS | N7, N6, N0, N0 |
| LIST OF NUMBER OF REQUESTED CHANNELS | 0, 8, 0, 0 |
| NUMBER OF AVAILABLE CHANNELS | 8 |
| NUMBER OF HOPS | 4 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | N6, N11, N10, N9, N8 |
| LIST OF TRACED NODE NUMBERS | N6, N11, N10, N9, N8 |

Fig. 41

CROSS-CONNECTION ACKNOWLEDGMENT MESSAGE RELAYED FROM NODE N9 TO NODE N10

| ELEMENTS | VALUES |
|---|---|
| COMMAND NUMBER | CROSS-CONNECTION ACKNOWLEDGE COMMAND |
| SENDER NODE | N8 |
| LIST OF CHOOSER NODE NUMBERS | N7, N6, N0, N0 |
| LIST OF NUMBER OF REQUESTED CHANNELS | 0, 8, 0, 0 |
| NUMBER OF AVAILABLE CHANNELS | 8 |
| NUMBER OF HOPS | 3 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | N6, N11, N10, N9, N8 |
| LIST OF TRACED NODE NUMBERS | N6, N11, N10, N9, N8, N9 |

Fig. 42

CROSS-CONNECTION CONFIRMATION MESSAGE TRANSMITTED FROM NODE N6 TO NODE N11

| ELEMENTS | VALUES |
|---|---|
| COMMAND NUMBER | CROSS-CONNECTION CONFIRMATION COMMAND |
| SENDER NODE | N8 |
| LIST OF CHOOSER NODE NUMBERS | N7, N6, N0, N0 |
| LIST OF NUMBER OF REQUESTED CHANNELS | 0, 8, 0, 0 |
| NUMBER OF AVAILABLE CHANNELS | 8 |
| NUMBER OF HOPS | 1 |
| NUMBER OF REVERSE ACKNOWLEDGMENT MESSAGES | 0 |
| NUMBER OF REVERSE CANCELLATION MESSAGES | 0 |
| LIST OF NODE NUMBERS ALONG ALTERNATIVE ROUTE | N6, N11, N10, N9, N8 |
| LIST OF TRACED NODE NUMBERS | N6, N11, N10, N9, N8 N9, N10, N11, N6 |

Fig.44

(1) NUMBER OF SUPPLIABLE CHANNELS STATED IN MESSAGE

| a | b | c | d | e | f | g | h |
|---|---|---|---|---|---|---|---|
| 7 | 5 | 7 | 4 | 2 | 3 | 3 | 5 |

Fig.45

(2) NUMBER OF SUPPLIABLE CHANNELS STATED IN MESSAGE

| c' | d' | g' | h' |
|----|----|----|----|
| 2  | 4  | 2  | 5  |

Fig.46

CROSSING MESSAGE TABLE (1)

| NUMBER | MESSAGE | NUMBER OF SUPPLIABLE CHANNELS |
|---|---|---|
| 1 | g | 3 |
| 2 | e | 2 |
| 3 | c | 7 |

Fig.47

CROSSING MESSAGE TABLE (2)

| NUMBER | MESSAGE | NUMBER OF SUPPLIABLE CHANNELS |
|---|---|---|
| 1 | g | 2 |
| 2 | e | 2 |
| 3 | c | 4 |

OPERATION SCENARIO (1)

OPERATION SCENARIO (2)

OPERATION SCENARIO (3)

OPERATION SCENARIO (4)

OPERATION SCENARIO (5)

OPERATION SCENARIO (6)

SEARCHING SYSTEM FOR DETERMINING ALTERNATIVE ROUTES DURING FAILURE IN A NETWORK OF LINKS AND NODES

BACKGROUND OF THE INVENTION

1. Field of the Invention

The present invention relates to a system for searching for alternative routes for bypassing a failure occurring at a node or link in a network.

Along with the application of technology for ultra-high speed transmission in recent years, the range of a network which a failure affects has gradually become greater. In particular, while failures at nodes due to fires, earthquakes, and other disasters may occur infrequently, they tend to affect a greater number of channels compared with failures at links and therefore have become serious problems which can no longer be ignored.

Accordingly, a high speed system for searching for alternative routes, which is able to perform processing for restoration of service not only in the case of failures at single links, but also failures at multiple links, has become necessary.

2. Description of the Related Art

Conventional systems for searching for alternative routes have been designed for fast restoration of service in the case of failures at single links. Once a failure occurs, they flood restoration messages to the network. The paths receiving the restoration message the fastest are allocated as alternative routes. And they set the maximum bundles of channels able to be allocated through those paths. If the related failure is not restored as a whole by one search for alternative routes, the system tries the search again to set alternative routes for as many channels as possible.

In the above conventional systems for searching for alternative routes, however, there was the problem that the rate of restoration of service from the failures significantly declines when a failure occurs at a node or a failure occurs at multiple links.

SUMMARY OF THE INVENTION

Therefore, the present invention has as its object to solve the above problem in the related art and to provide a function for searching for alternative routes which is able to restore service at a high speed and with as high rate of restoration as possible by enabling restoration of service from failures at nodes and failures at multiple links as well.

To attain the above object, the present invention provides a function for searching for alternative routes in a network, in the case of a failure in a node or link, which executes a stage for initiation of failure restoration processing which starts up failure restoration processing in accordance with various types of messages when a failure occurs at a link or node, a stage for processing a restoration message for searching for an alternative route, a stage for processing an acknowledgment message for reserving alternative routes, a stage for processing a cancellation message for cancelling reservation of alternative routes, a stage for processing a confirmation message for confirming reserved alternative routes and making a switching of cross-connect equipment, a stage for processing a cross-connection completion message for notifying the completion of switching of the cross-connect equipment to the nodes, a stage for processing a cross-connection acknowledgmentment message for confirming the completion of switching of all of the cross-connect equipment on the alternative route, and a stage for processing a cross-connection confirmation message for performing a process to complete the search for an alternative route and which thereby searches for alternative routes autonomously in a distributed manner.

BRIEF DESCRIPTION OF THE DRAWINGS

The above object and features of the present invention will be more apparent from the following description of the preferred embodiments with reference to the accompanying drawings, wherein:

FIGS. 1A and 1B are views illustrating the basic principle of the present invention;

FIGS. 7A and 7B are flow charts of the stage for processing a cross-connection completion message;

FIG. 8 is a flow chart of the stage for processing a cross-connection acknowledgment message;

FIG. 9 is a flow chart of the stage for processing a cross-connection confirmation message;

FIG. 10 is a view of a scenario (1) of a network in the present invention;

FIG. 30 is a table of a restoration message produced at the node N8;

FIG. 31 is a table of a restoration message transmitted to the link L9→10;

FIG. 32 is a table of an acknowledgmentment message prepared at the node N6;

FIG. 33 is a table of a restoration message continued from the node N6 to the node N3;

FIG. 34 is a table of an acknowledgmentment message relayed from the node N11 to the node N10;

FIG. 35 is a table of a cancellation message prepared at the node N6;

FIG. 36 is a table of a confirmation message prepared at the node N8;

FIG. 37 is a table of a dummy cancellation message prepared at the node N3;

FIG. 38 is a table of an acknowledgment message transmitted from the node N3 to the node N4;

FIG. 39 is a table of a confirmation message relayed from the node N9 to the node N10;

FIG. 40 is a table of a cross-connection acknowledgment message transmitted from the node N8 to the node N9;

FIG. 41 is a table of a cross-connection acknowledgment message relayed from the node N9 to the node N10;

FIG. 42 is a table of a cross-connection confirmation message transmitted from the node N6 to the node N11;

FIG. 44 is a view of the number of suppliable channels (1) in messages according to an example of the invention;

FIG. 45 is a view of the number of suppliable channels (2) in messages according to an example of the invention;

FIG. 46 is a crossing message table (1);

FIG. 47 is a crossing message table (2);

FIGS. 50A and 50B are views for explaining a scenario of operation (3) of the system of the present invention, wherein FIG. 50A shows the conventional case and FIG. 50B the case of the system of the present invention;

DESCRIPTION OF THE PREFERRED EMBODIMENTS

Figure 2:
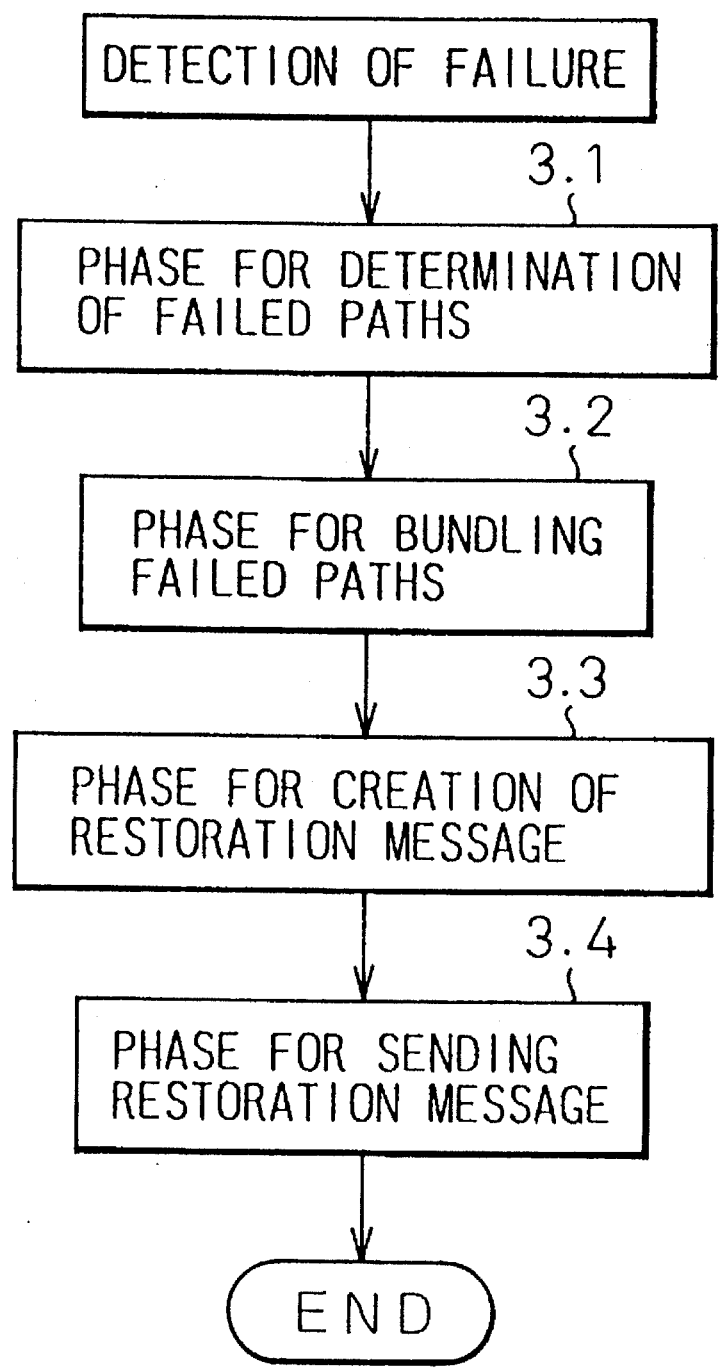
FIG. 2 is a flow chart of the stage for initiation of failure restoration processing.

The embodiments of the present invention will be described next with reference to the related figures.

FIGS. 1A and 1B are views illustrating the basic principle of the present invention and show by flow charts the algorithm of processing performed when a node receives a message. First, the various embodiments appearing in the algorithm of FIGS. 1A and 1B will be listed in (1) to (14) below:

(1) A system for searching for alternative routes in a network constituted by a plurality of nodes which searches for alternative routes by distributed control in the case of a failure at a link or node; a node detecting a failure in a link or in a node executes a stage for initiation of failure restoration processing in accordance with an initiation message to determine and bundle the failed paths and create and send a restoration message for searching for alternative routes. A node receiving the restoration message executes a stage for processing the restoration message to send back an acknowledgment message for reserving an alternative route when the node is a candidate for a chooser stated in the restoration message and relays the restoration message on when the node is not a candidate as a chooser node. A node receiving the acknowledgment message executes a stage for processing the acknowledgment message to send a confirmation message for confirming and deciding on a reserved alternative route and start switching at cross-connect equipment switching when that node is the sender node in the restoration message and to relay the acknowledgment message and send back a cancellation message for cancelling reservation of the alternative route to the nodes for which reservation of alternative routes could not be continued when that node is not the sender node. A node receiving the cancellation message executes a stage for processing the cancellation message to release reserved spare channels and, then, tries to transmit an acknowledgment message once again to another route in the same way as the above stage for processing an acknowledgment message and suspends processing for nodes for which reservation of the alternative route could not be continued. A node receiving the confirmation message executes a stage for processing the confirmation message to finally confirm the spare channels, starts the cross-connect equipment switching if the node is a node, and relays the confirmation message if the node is not a chooser node. A node for which cross-connect equipment switching has been completed executes a stage for processing a cross-connection completion message in accordance with the cross-connection completion message. It issues a cross-connection acknowledgment message when that node is the sender node. It further issues a cross-connection confirmation message, when that node is not a sender node, if it has already received a cross-connection acknowledgment message and is a chooser node, and relays the cross-connection acknowledgment message if that node is not a chooser node. It immediately ends the processing if not yet receiving the cross-connection acknowledgment message when the cross-connect equipment switching has been started and, conversely, orders cross-connect equipment switching when switching has not yet been started. A node receiving a cross-connection acknowledgment message executes a stage for processing the cross-connection acknowledgment message to send the cross-connection confirmation message if that node is a chooser node at the completion of the cross-connect equipment switching and relay the cross-connection acknowledgment message if that node is not a chooser node. A node receiving the cross-connection confirmation message executes a stage for processing the cross-connection confirmation message to relay the cross-connection confirmation message if that node is not the sender node and completion the relaying of the message if that node is the sender node. By this way, an alterative route is formed autonomously in a distributed manner.

(2) A system of (1), in which at the stage for initiation of failure restoration processing, a node detecting failure bundles the failed paths affected by that failure, holds the information on all of the chooser candidate nodes and the number of channels of corresponding paths as a message, and thereby starts to search for alternative routes for the failed paths all together, makes the next node on a failed side of a failed path a chooser candidate node of the message if that node is a termination node, makes the next node to the next node a candidate if not the termination node, and decides on the node performing the restoration processing for the failed path based on the node identifiers at the end of the path of the failed side and the node identifier at the end of the path on the nonfailed side.

(3) A system of (2), in which at the stage for initiation of the failure restoration processing, when a failure occurs at multiple links, a node detecting failures from two successive failed links on a failed path passing through the two links does not perform restoration processing on the failed path passing through the two links.

(4) A system of (2), in which at the stage for processing a restoration message, broadcasting is continued so long as the total number of suppliable channels in the messages of the same role sent to a port up until then, for each port able to send a restoration message for searching for an alternative route, exceeds the total number of requested channels or the number of hops does not exceed a certain limit. "Messages of the same role" means messages issued due to the same causes.

(5) A system of (4), in which each node is provided with two message queues, one of which is used as a queue for restoration messages and the other as a queue for other types of messages, and the processing for restoration messages is executed on a nonpriority basis.

(6) A system of (4), in which at the stage for processing a restoration message, when a chooser candidate node stated in the restoration message receives a restoration message, it sends the message back to the port receiving a restoration message for reserving an alternative route, then prepares a restoration message from which that node has been removed from the chooser candidate nodes and continues the broadcasting of that message.

(7) A system of (2), in which at the stage for processing a restoration message, each node is provided with a restoration message table storing as information the received restoration messages, the port identifiers receiving them, and channel identifiers reserved by the acknowledgment messages and records the alternative route information in the table.

(8) A system of (2), in which at the stage for processing an acknowledgment message, each node is provided with an input message table storing the received messages and an output message table storing as information the output messages, the port identifiers receiving as input the messages which caused the processing, and the number of channels confirmed by the confirmation message for the acknowledgment messages and records information on the reservations and decisions of the alternative routes in the same manner.

(9) A system of (2), in which at the stage for processing an acknowledgment message, the acknowledgment message is transmitted with reference to the restoration message table, one or more messages arriving the earliest among the restoration messages of the same role are selected until the number of suppliable channels is met or there are no longer any restoration messages, and the acknowledgment messages can be divided into a plurality of messages by sending acknowledgment messages to the ports where the restoration messages were input.

(10) A system of (9), in which at the stage for processing an acknowledgment message, the acknowledgment message contains information on the number of the reverse acknowledgment messages and the number of reverse cancellation messages and finds the number of the acknowledgment messages and number of cancellation messages which crossed the acknowledgment message in question so as to arbitrate competition over spare channels among acknowledgment messages.

(11) A system of (10), in which at the stage for processing an acknowledgment message, it is decided if an acknowledgment message received by a node has priority over an acknowledgment message which crosses that acknowledgment message based on the no. of the node and the no. of the node passed just before, a cancellation message for cancelling the competing acknowledgment message is sent out and that first acknowledgment message is allowed to pass when it has priority, and reference is made to the spare channels of the ports and an acknowledgment message indicating the shortage of channels is stopped when it does not have priority.

(12) A system of (9), in which at the stage for processing a cancellation message, information on the alternative route being reserved by the acknowledgment message and the cancellation message is created and when a node cannot send an acknowledgment message indicating the number of suppliable channels, a cancellation message indicating the shortage is sent back to the node just before which sent the acknowledgment message so that the node just before tries to send the acknowledgment message once again.

(13) A system of (2), in which at the stage for processing a confirmation message, each node is provided with a cross-connection table storing as information the confirmation messages ordering switching, the nos. of the input ports, the nos. of the output ports, and the state of the starting, ending, and acknowledgment of the cross-connect equipment switching to thereby manage the cross-connect equipment.

(14) A system of (2), in which at the stage for processing a cross-connection acknowledgment message and the stage for processing a cross-connection confirmation message, the start of switching of the cross-connect equipment is instructed by the processing of the confirmation message and, when the switch instruction is received, if the corresponding cross-connect equipment switching completes, a cross-connection acknowledgment message is sent along the alternative route from the sender node to the chooser node, if the cross-connect switching does not end, a cross-connection acknowledgment message to be sent when ending the switching is sent along the alternative route from the sender node to the chooser node, then a cross-connection confirmation message is sent from the chooser node to the sender node to confirm the cross-connect equipment switching.

The operation of the system for searching for alternative routes according to the present invention will be explained below with reference to FIGS. 1A and 1B.

[1] Basic Principle

In the system for searching for alternative routes of the present invention, a node detecting a failure sends a restoration message to the nodes surrounding it and learns of the presence of an alternative route by that message reaching the node at the other end of the failed distance. Next, the node at the other end of the failed distance which received the restoration message sends a message in the opposite direction and designates that route as the alternative route.

Below, an explanation will be made of the components of the messages in the present invention and their functions.

(1) Command No.

No. for identifying the type of the message.

(2) Sender Node

A node detecting a failure and creating a message on the same.

(3) List of Chooser node Nos.

A list of addresses of alternative routes (or candidates for the same) of failed paths corresponding to the messages. The list includes records of the one first connected chooser nodes and records of the (network connectivity—1) number of second connected chooser nodes. In the restoration message, these are called chooser candidate nodes. In other types of messages, the "chooser node" means the second connected chooser node when there is one second connected chooser node and the first connected chooser node when there is only the first connected chooser node.

(4) List of Numbers of Requested Channels

A list of the numbers of failed paths having as addresses the corresponding chooser candidate nodes. The i-th element in the list means the number of requested channels for the i-th chooser candidate node in the list of chooser node nos.

(5) Number of Suppliable Channels

The number of channels of an alternative route which can be secured by the message at that point of time.

(6) Number of Hops

In the case of a restoration message, the number of nodes through which the message can pass. For other messages, the number of nodes through which the message passes from the chooser node in the alternative route going to be reserved (or reserved).

(7) Number of Reverse Acknowledgment Message

The total number of acknowledgment messages which a node sending a message receives up to then at the port from which it sent that message. The number of reverse acknowledgment messages is used for arbitration of competition among acknowledgment messages.

(8) Number of Reverse Cancellation Messages

The total number of cancellation messages which a node sending a message receives up to then at the port from which it sent that message. The number of reverse cancellation messages is used for arbitration of competition among acknowledgment messages.

(9) List of Nos. of Nodes Along Alternative Route

A list of nodes showing the alternative route which a message is going to reserve (or has reserved).

(10) Initiation Message

A virtual message deemed to be sent from the link where the failure occurred to the nodes at the two ends of the link or sent from the node where the failure occurred through all of the links connected to the node to the opposite sides of those links. A node receiving this message initiates the stage for failure restoration processing.

(11) Restoration Message

A message for searching for an alternative route. This message is sent from the sender node and broadcast to nearby nodes in accordance with a set algorithm so as to search for chooser candidate nodes. A node receiving this message executes the stage for processing a restoration message.

(12) Acknowledgment Message

A message for reserving an alternative route. This is sent from a chooser node receiving a restoration message, proceeds in the reverse direction from the restoration message, and reaches the sender node while reserving the route. A node receiving this message executes the stage for processing an acknowledgment message.

(13) Cancellation Message

A message for cancellation of reservation of an alternative route. This message returns to the node just before the sender node, from which the acknowledgment message corresponding to that message arrived, while cancelling reservations of the route based on the information on the reserved route in the message. A node receiving this message executes the stage for processing a cancellation message.

(14) Confirmation Message

A message for confirming and determining the reserved alternative route. The message is sent from the sender node to the chooser nodes along the alternative route. A node receiving the message executes the stage for processing a confirmation message.

(15) Cross-Connection completion Message

A virtual message given to a node equipped with cross-connect equipment for notifying it of the completion of switching of the cross-connect equipment. A node receiving this message executes the stage for processing a cross-connection completion message.

(16) Cross-Connection Acknowledgment Message

A message sent from a sender node to inform the next node along the determined alternative route that the switching at the cross-connect equipment up to that node had completed. A node receiving this message executes the stage for processing a cross-connection acknowledgment message.

(17) Cross-Connection Confirmation Message

A message sent from a chooser node to notify the sender node that all of the switching of the cross-connect equipment had completed. A node receiving this message executes the stage for processing a cross-connection confirmation message.

[2] Nodes

Each node is provided with a restoration message table, a cross-connection table, and a message queue. Each node, further, has ports for the input and output of data to and from the links connected to them. One port is provided for one link. Each port is provided with a spare channel table, an input message table, and an output message table.

[2.1] Spare Channel Table

Each port has a spare channel table. This is used to manage the spare channels of the link corresponding to the port. There are three states of a spare channel: released, reserved, and confirmed. The spare channel table shows the total number of channels in each state. That is, it shows the number of released channels, the number of reserved channels, and the number of confirmed channels.

[2.2] Restoration Message Table

Each node has a restoration message table which stores in the order of processing the restoration messages which the node has received and processed from the various ports. The restoration message table is comprised of records of (i) the restoration messages received, (ii) the numbers of channels used showing the numbers of channels reserved by acknowledgment messages, and (iii) the nos. (identifiers) of ports receiving the messages.

[2.3] Cross-Connection Table

Each node has a cross-connection table which is used to manage the state of the cross-connect equipment switching at the nodes and the corresponding messages. The cross-connection table is comprised of records of the confirmation messages instructing cross-connect equipment switching, the nos. (identifiers) of the input ports receiving the confirmation messages, the nos. (identifiers) of the output ports outputting messages as a result of processing of the confirmation messages, Boolean algebra indicating if cross-connect equipment switching has started or not, Boolean algebra indicating if cross-connect equipment switching has completed or not, and Boolean algebra indicating if cross-connection confirmation messages corresponding to the cross-connect equipment switching have already been received or not. Here, the Boolean algebra assumes of binary value of "1" or "0" indicating "true" or "false".

[2.4] Input Message Table

Each port has an input message table which stores in the order of processing the acknowledgment messages, cancellation messages, and confirmation messages which the node to which the port belongs receives from the port and processes. The input message table is comprised of records of the received messages.

[2.5] Output Message Table

Each port is provided with an output message table which stores in the order of output the acknowledgment messages, cancellation messages, and confirmation messages which the node to which the port belongs outputs to the port. The output message table is comprised of records of the output messages, the nos. of the ports receiving the input messages causing the processing of the output messages, and, in the case of acknowledgment messages, the number of channels used indicating the number of channels confirmed by the confirmation messages.

[2.6] Message Queue

Each node is provided with a message queue which stores the messages received by the node from the ports until the messages can be processed. The received messages are stored in the message queue until their turn for processing. Two techniques are used for realizing the message queue. One is called the single message queue technique and the other the dual message queue technique.

2.6.1] Single Message Queue Technique

In this technique, each node is provided with one queue which stores the messages which are received in the order of receipt without regard as to the type of the messages.

[2.6.2] dual Message Queue Technique

In this technique, each node is provided with two queues: a restoration message queue and a general message queue. When a received message is a restoration message, it is stored in the restoration message queue. All other messages are stored in the general message queue. No messages are ever taken out from the restoration message queue until all messages awaiting processing in the general message queue finish being processed. According to this technique, the processing of restoration messages is delayed until after the other types of messages.

[3] Stage for Initiation of Failure Restoration Processing (1 in FIG. 1)

FIG. 2 is a flow chart of the stage for initiation of the failure restoration processing. If a failure occurs at any of the links in a network, the nodes at the two ends of the link detect its occurrence. If a failure occurs at any of the nodes in the network, the nodes connected to that node through a link detect its occurrence.

As shown in FIG. 2, a node receiving notification of the occurrence of a failure first determines the failed paths by phase 3.1. Next, it bundles the failed paths by phase 3.2 and executes phase 3.3 for creation of a restoration message. Next, it executes phase 3.4 for sending the restoration message and then ends the stage.

[3.1] Phase 3.3 for Determination of Failed Paths

In this phase, the node treats the working paths passing through the port to which the failure was notified as candidates for failed paths. The node determines if it itself initiated the failure restoration processing based on the nos. of the two nodes at the two ends of the candidates for failed paths.

[3.2] Phase 3.2 for Bundling Failed Paths

In this phase, the node determines the chooser nodes which it itself covers for each of the failed paths. That is, in the failed path passing through the second connected chooser node, the second connected chooser node is set as the chooser node of the failed path. In the other failed paths, that is, the failed paths wherein the first connected chooser node is at one end of the path, the first connected chooser node is set as the chooser node of the failed path. Here, the "first connected chooser node" means the node adjoining the sender node on the failure side. Further, the "second connected chooser node" means the node adjoining the first connected chooser node on the failure side.

All of the chooser nodes of the failed paths are set as chooser candidate nodes in the restoration message prepared by the node. However, just the first connected chooser node is always set as a chooser node candidate in the restoration message regardless of if it is or is not a chooser node of the failed paths.

Next, the node determines the number of requested channels for each of the chooser candidate nodes in the restoration message. In this case, it totals the number of channels of the failed paths having the chooser candidate nodes as chooser nodes and uses the sum as the number of requested channels for the chooser candidate nodes.

[3.3] Phase 3.3 for Creation of Restoration Message

In this phase, the node bundles failed paths and then creates a restoration message as follows:

(1) Makes the no. of the command in the message a value indicating a restoration command.

(2) Makes the no. of the sender node in the message the no. of the above node.

(3) Sets the list of chooser node nos. and the list of numbers of requested channels as described in the section of the phase for bundling failed paths.

(4) Makes the number of suppliable channels in the message equal to the total of the number of requested channels for all of the chooser candidate nodes.

(5) Makes the number of hops in the message the predetermined maximum number of hops. Here, the number of hops means the number of times of transmission of the restoration message through nodes. A certain limit is set for that number of transmissions.

(6) Makes the number of reverse acknowledgment messages and the number of reverse cancellation messages in the message both made 0.

(7) Empties the list of nos. of nodes along the alternative route.

[3.4] Phase 3.4 for Sending Restoration Message

In this phase, the node creates a copy of the created restoration message for any port other than the ports which are down as a result of the failure and consecutively and independently executes the step of sending the restoration message for the same. Phase 3.4 includes the following step:

[3.4.1] Step for Sending Restoration Message

In This step, the node compares the number of opened channels at the port with the number of suppliable channels in the message. It revises downward the number of suppliable channels so that the number does not exceed the number of released channels. Further, if the number of suppliable channels is not 0, it sends the message on to the port.

[4] Stage for Processing Restoration Message (2 in FIG. 1)

Figure 3:
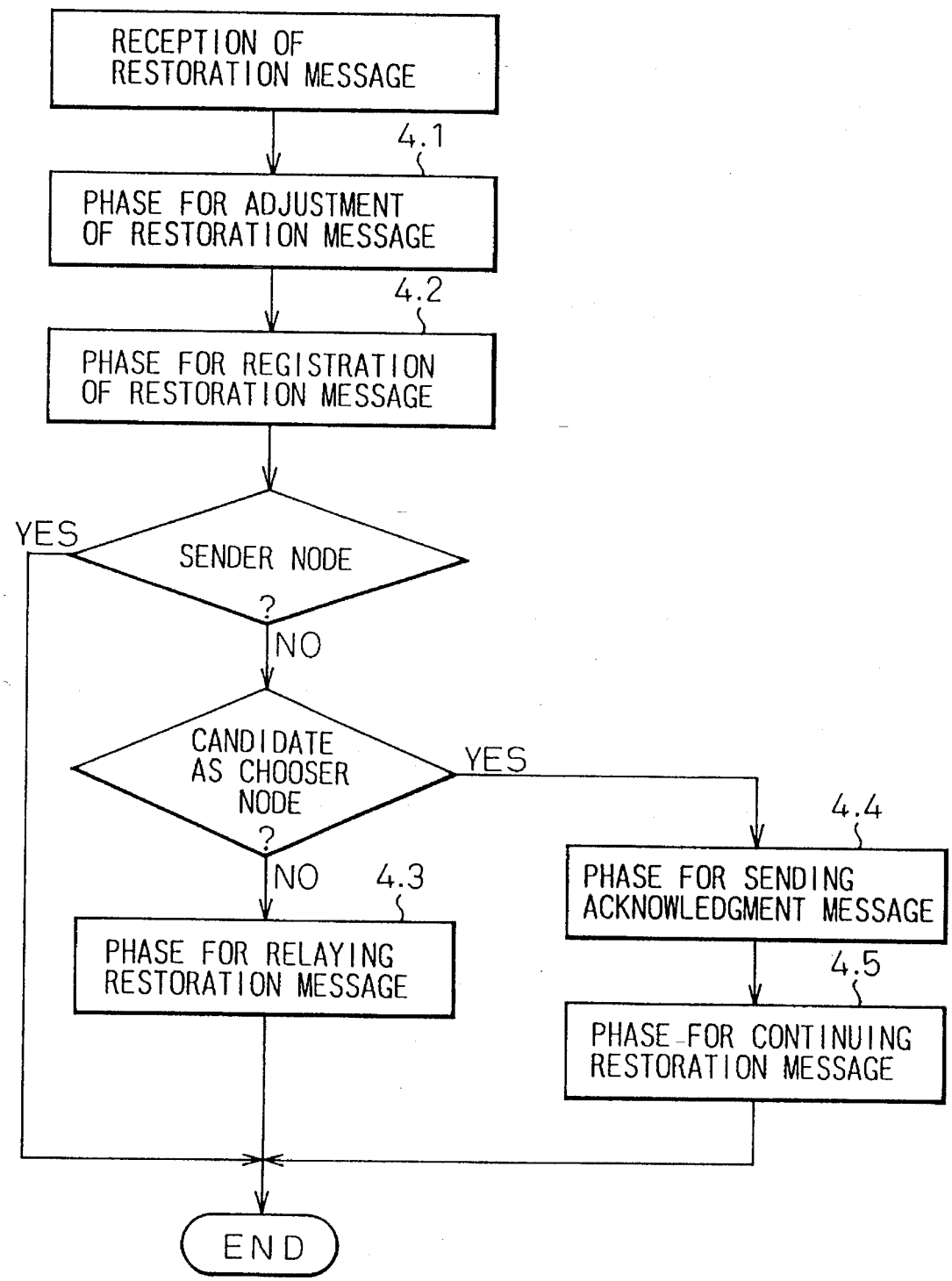
FIG. 3 is a flow chart of the stage for processing a restoration message.

FIG. 3 is a flow chart of the stage for processing a restoration message. As shown in FIG. 3, a node (a) receiving a restoration message first executes a phase 4.1 for adjustment of the restoration message. It then executes a phase 4.2 for registration of the restoration message. Next, the node (a) investigates if it itself is the sender node in the message, one of the chooser candidate nodes, or another node aside from the same. As a result of the investigation, (1) If the node is the sender node, the node ends the stage 2.

(2) If the node is one of the chooser node candidates, the node executes the phase for sending the acknowledgment message, then executes the phase for continuing the restoration message, and then ends the stage 2.

(3) If not any of the above, the node executes the phase for relaying the restoration message, then ends the stage 2.

[4.1] Phase 4.1 for Adjustment of Restoration Message

In this phase, the node compares the number of suppliable channels in the received restoration message with the number of released channels of the port at which the message was received. It then revises downward the number of suppliable channels so that the number of suppliable channels does not exceed the number of released channels. The revised message is deemed the received message and the subsequent processing is continued.

[4.2] Phase 4.2 for Registration of Restoration Message

In this phase, the node registers the restoration message in the restoration message table of that node. The "port no." means the no. of the port at which the node received the restoration message. In this case, the number of channels used is made 0.

[4.3] Phase 4.3 for Relaying Restoration Message

At this phase, the node first subtracts 1 from the number of hops in the restoration message received. It then consecutively and independently executes the following step [4.3.1] for sending a restoration message for all of the ports other than the port receiving the message.

[4.3.1] Step for Sending Restoration Message

At this step, the node first compares the number of opened channels of the port provided at the node with the total number of allowed suppliable channels in the restoration messages of the same roles as the message, that is, the total number of channels supplied. Here, the number of released channels minus the total number of channels supplied are called the "allowed suppliable channels". As a result of this processing, (1) When the number of allowed suppliable channels is less than 0, the node does not send the restoration message to the port.

(2) When the number of allowed suppliable channels is greater than or equal to the number of suppliable channels in the message, the node sends the message as is to the port.

(3) When the number of allowed suppliable channels is less than the number of suppliable channels in the message, the node changes the number of suppliable channels in the message to the number of allowed suppliable channels, then sends the message to the port.

[4.4] Phase 4.4 for Sending Acknowledgment Message

In this phase, a node prepares an acknowledgment message indicating that it is a chooser node based on the received restoration message as follows:

(1) Makes the no. of the command in the acknowledgment message a value indicating an acknowledgment command.

(2) Makes the no. of the sender node in the acknowledgment message the same as the no. of the sender node in the restoration message.

(3) Prepares a list of chooser node nos. and a list of number of requested channels for the acknowledgment message. That is, (a) When the node in question is the first connected chooser node in the restoration message,

* Prepares a list comprising the list of chooser node nos. in the restoration message from which the second and later elements (chooser node nos.) are deleted and makes this the list of chooser node nos. in the acknowledgment message.

* Prepares a list comprising the list of numbers of requested channels in the restoration message from which the second and later elements are deleted and makes this the list of numbers of requested channels in the acknowledgment message.

(b) When the node in question is one of the second connected chooser nodes in the restoration message,
* Prepares a list comprising the list of chooser node nos. in the restoration message but designating the no. of the node in question as the second element, that is, the 1st element of the second connected chooser nodes, and making the following elements empty and makes this the list of chooser node nos. in the acknowledgement message.
* Prepares a list comprising the list of numbers of requested channels in the restoration message but making the first element 0 and the second element that number of requested channels for the node in question in that message and makes this the list of numbers of requested channels in the acknowledgment message.

(4) Refers to the output message tables of all of the ports, totals the numbers of suppliable channels in the acknowledgment messages of the same role for each message, and thereby finds the total number of supplied channels. Here, the number of requested channels for the node in question minus the total number of supplied channels is referred to as the number of allowed suppliable channels. As a result of this processing, (a) When the number of allowed suppliable channels is less than 0, the number of suppliable channels in the acknowledgment message is made 0.

(b) When the number of allowed suppliable channels is greater than or equal to the number of suppliable channels in the restoration message, the number of suppliable channels in the acknowledgment message is made the number of allowed suppliable channels in the restoration message.

(c) When the number of allowed suppliable channels is less than the number of suppliable channels in the restoration message, the number of suppliable channels in the acknowledgment message is made that number of allowed suppliable channels.

(5) Makes the number of hops in the acknowledgment message 1.

(6) Refers to the input message table of the port so as to find the total number of acknowledgment messages received from that port. Makes the number of reverse acknowledgment messages in the acknowledgment message that total number.

(7) Refers to the input message table of the port so as to find the total number of cancellation messages received from that port. Makes the number of reverse cancellation messages in the acknowledgment message that total number.

(8) Makes the list of nos. of nodes along the alternative route in the acknowledgment message a list containing the no. of the node in question as its only element.

Next, the node increases the number of channels used in the records of the restoration messages in the restoration message table of the node by the number of suppliable channels in the acknowledgment message. If the number of suppliable channels is not 0, the node executes the following step 4.4.1 for reserving spare channels and step 4.4.2 for registering the output acknowledgment message for the port receiving the restoration message, then sends the acknowledgment message to the port.

[4.4.1] Step 4.4.1 for Reserving Spare Channels

At this step, the node reduces the number of released channels of the port by the number of suppliable channels in the acknowledgement message and increases the number of reserved channels of the port by the number of suppliable channels.

[4.4.2] Step 4.4.2 For Registering Output Acknowledgment Message

At this step, the node registers the acknowledgment message in the output message table of the port. The no. of the input port in the record of the message is made the no. of the port receiving the original message which caused the registration processing. The number of channels used given in the record is made 0.

[4.5] Phase 4.5 for Continuing Restoration Message

In this phase, the node prepares a restoration message consisting of the received restoration message from which the request for that node has been deleted. The node first prepares a copy of the restoration message received and then changes it as follows:

(1) Decreases the number of hops in the new restoration message by 1.

(2) Changes the list of chooser node nos. and the list of numbers of requested channels in the new restoration message as follows:

(a) When the node is the first connected chooser node in the original restoration message, makes the 1st element in the list of numbers of requested channels 0.

(b) When the node is a second connected chooser node in the original restoration message, deletes the element specifying that node from the list of chooser node nos. At the same time, it deletes the element indicating the number of requested channels for that node from the list of numbers of requested channels.

(3) Compares the total of the numbers of requested channels in the list of numbers of requested channels, that is, the total number of channels requested, with the number of suppliable channels in the restoration message. As a result, (a) When the total number of requested channels is greater than or equal to the number of suppliable channels in the original restoration message, the number of suppliable channels in the new restoration message is made the number of suppliable channels in the original restoration message.

(b) When the total number of requested channels is less than the number of suppliable channels in the original restoration message, the number of suppliable channels in the new restoration message is made the total number of requested channels.

Further, if the number of suppliable channels of the restoration message prepared is not 0, the node consecutively and independently executes the step for sending a new restoration message to all of the ports other than the port receiving the original restoration message.

[5] State for Processing Acknowledgment Message (3 in FIG. 1)

Figure 4:
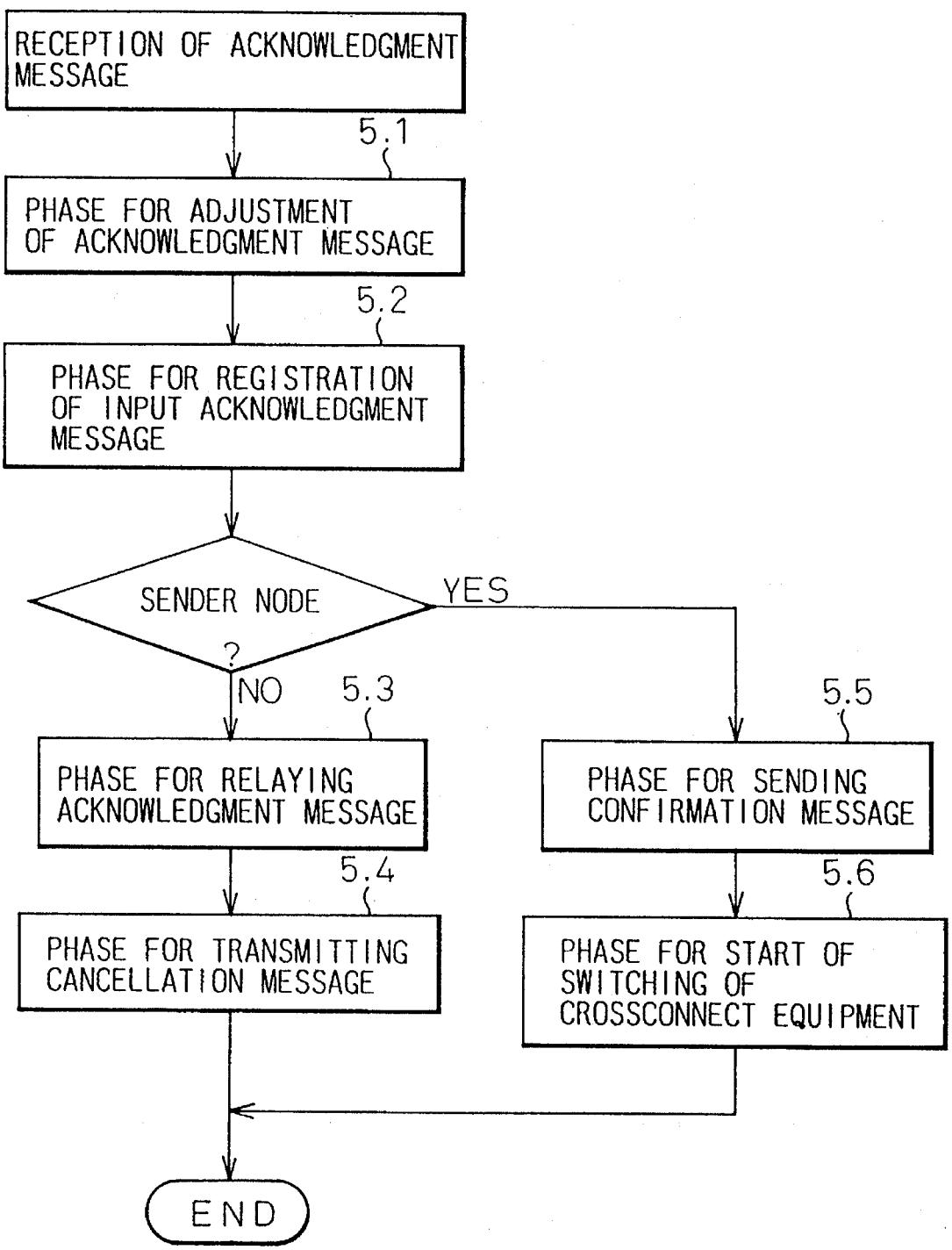
FIG. 4 is a flow chart of the stage for processing an acknowledgment message.

FIG. 4 is a flow chart of the stage for processing an acknowledgment message. As shown in FIG. 4, a node receiving an acknowledgment message first executes the phase 5.1 for adjusting the acknowledgement message, then executes the phase 5.2 for registering the input acknowledgment message. Next, the node investigates if it is the sender node in the message or is any other node. As a result, (1) If the node is the sender node, the node executes the phase for sending a confirmation message, executes the phase 5.6 for starting switching of the cross-connect equipment, and then ends stage 3.

(2) If the node is not the sender node, the node executes the phase for relaying the acknowledgement message, executes the phase 5.4 for sending a cancellation message, then ends stage 3.

[5.1] Phase 5.1 for Adjusting Acknowledgment Message

In this phase, the node arbitrates competition among acknowledgment messages, that is, competition over spare channels of the links. First, it investigates the priorities of the acknowledgment message. To do this, it compares the no. of the port sending the acknowledgment message with the no. of the node in question to determine if the acknowledgment message has priority. Here, the number of released channels of the port in question is referred to as the number of released port channels.

(1) When the acknowledgment message does not have priority and the number of released port channels is less than the number of suppliable channels in the acknowledgment message, the number of suppliable channels in the acknowledgment message is made the number of opened port channels.

(2) The total of the number of reverse acknowledgment messages and the number of reverse cancellation messages with respect to an acknowledgment message is called the number of reverse messages. When retrieving acknowledgment messages from the output message table of the port receiving this message, the total number of messages found is called the number of output acknowledgment messages. When retrieving cancellation messages from the output message table of the port receiving this message, the total number of messages found is called the number of output cancellation messages. The total of the number of output acknowledgment messages and the number of output cancellation messages is called the number of output messages. Further, the number of output acknowledgment messages minus the number of reverse acknowledgment messages is called the number of crossing acknowledgment messages. The number of output cancellation messages minus the number of reverse cancellation messages is called the number of crossing cancellation messages. The number of output messages minus the number of reverse output messages is called the number of crossing messages.

When the acknowledgment message has priority, if the number of crossing acknowledgment messages is 0, the node executes the step for reserving spare channels and ends the stage. If the number of crossing acknowledgment messages is not 0, it then executes the step [5.1.1] for preparing a crossing message table. It makes the number of cancelled channels 0 and repeatedly executes the following processing until the number of crossing messages becomes 0:

(a) When the (number of crossing messages)-th message in the crossing message table is an acknowledgment message, it executes the following step [5.1.2] for arbitrating competition among acknowledgment messages and reduces the number of crossing messages by 1.

(b) Next, when the number of released port channels is less than the number of suppliable channels in the acknowledgment message, it makes the number of suppliable channels in the acknowledgment message the number of released channels.

Next the node executes the step for reserving spare channels.

The above phase 5.1 includes the following steps:

[5.1.1] Step for Preparing Crossing Message Table

The crossing message table contains the acknowledgment messages or cancellation messages which have crossed. The node takes out the acknowledgement messages or cancellation messages from the output message table in order from the later processed messages and registers them in the crossing message table. It executes this processing only for the number of crossing messages.

[5.1.2] Step for Arbitrating Competition Among Acknowledgment Messages

In this step, the node subtracts from the number of suppliable channels in the acknowledgment message the number of released port channels and further the number of canceled channels. The result is called the number of cancellation channels. Further, it reduces the number of cancellation channels by the total of the numbers of suppliable channels in the acknowledgment messages from the 1st to (number of crossing messages)-th (last message in the crossing message table. Further, it increases the number of cancellation channels by the total of the numbers of suppliable channels in the cancellation messages from the 1st to (number of crossing messages)-th message in the crossing message table. As a result, (1) When the number of cancellation channels is less than 0, the node reduces the number of crossing messages by 1 and ends the step.

(2) When the value of the number of cancellation channels is positive, the node first increases the number of reserved channels of the port by the number of cancellation channels and increases the number of released channels of the port by the number of cancellation channels. Further, it retrieves records corresponding to the (number of crossing messages)-th acknowledgment message in the crossing message table from the output message table of the port and reduces the number of suppliable channels in the records by the number of cancellation channels. Next, it prepares a copy of the acknowledgement message and makes the following changes so as to prepare a dummy acknowledgment message assumed to be received from the port indicated by the input port no. given in the records:

(a) makes the number of suppliable channels in the dummy acknowledgment message the number of cancellation channels.

(b) Reduces the number of hops in the dummy acknowledgment message by 1.

(c) Makes the number of reverse acknowledgment messages in the dummy acknowledgment message 0.

(d) Makes the number of reverse cancellation messages in the dummy acknowledgment message 0.

(e) Makes the list of nos. of nodes along the alternative route in the dummy acknowledgment message the list with the final element deleted.

Further, the node executes the phase 5.3 for relaying an acknowledgment message as if having received the acknowledgement message. Next, the node investigates if it itself is a chooser node in the message or is another node. As a result, (a) If the node is a chooser node, it reduces the number of crossing messages by 1 and ends the step.

(b) When the node is not a chooser node, it executes the phase 5.4 for sending a cancellation message, then reduces the number of crossing messages by 1 and ends the step.

[5.2] Phase 5.2 for Registering Input Acknowledgment Message

In this phase, the node registers the acknowledgment message in the input message table of the port receiving that message.

[5.3] Phase 5.3 for Relaying Acknowledgment Message

In this phase, the node first prepares the acknowledgment message to be sent. That is, it prepares a copy of the acknowledgment message received by the node and makes the following changes:

(1) Increases the number of hops in the new acknowledgment message by 1.

(2) Adds the no. of the node in question to the list of nos. of nodes along the alternative route in the new acknowledgment message.

Next, the node sets the number of suppliable channels in the acknowledgment message as the number of remaining suppliable channels. It then refers to the restoration message table of the node and retrieves the restoration messages of the same role. It takes out the restoration messages in order from the earlier arriving messages and executes the following step [5.3.1] for sending an acknowledgment message for each of the same. This work ends when the number of remaining suppliable channels becomes zero or there are no longer any corresponding restoration messages.

[5.3.1] Step for Sending Acknowledgment Message

In this step, the node first determines the port into which the restoration message was input from the records in the restoration message table of the node. It searches for whether there are any cancellation messages having the same role as this acknowledgment message in the input message table of the port and when there are, ends this step. Next, it determines the number of channels used from the records in the restoration message table. It then finds the number of suppliable channels in the restoration message minus the number of channels used. This value is called the number of nonused channels. The node makes the following changes to the acknowledgment message scheduled to be sent based on the information on the port:

(1) Compares the number of released channels of the port, the number of nonused channels, and the number of remaining suppliable channels. As a result, (a) When the number of released channels is greater than or equal to the number of remaining suppliable channels and the number of nonused channels is greater than or equal to the number of remaining suppliable channels, makes the number of suppliable channels in the acknowledgment message the number of remaining suppliable channels.

(b) When the number of released channels is greater than or equal to the number of nonused suppliable channels and the number of remaining suppliable channels is greater than or equal to the number of nonused suppliable channels, makes the number of suppliable channels in the acknowledgment message the number of nonused channels.

(c) When the number of nonused channels is greater than or equal to the number of released channels and the number of remaining suppliable channels is greater than or equal to the number of released channels, makes the number of suppliable channels in the acknowledgment message the number of released channels.

(2) Refers to the input message table of the port so as to find the total number of the acknowledgment messages received from the port and makes the number of reverse acknowledgment messages of the acknowledgment message being changed the total number.

(3) Refers to the input message table of the port so as to find the total number of cancellation messages received from the port and makes the number of reverse cancellation messages of the acknowledgment message being changed the total number.

The node next reduces the number of remaining suppliable channels by the number of suppliable channels in the acknowledgment message. Further, it increases the number of channels used by the number of suppliable channels. If the number of suppliable channels is 0, it executes the step of reserving spare channels and the step of registering an output acknowledgment message for the port receiving the restoration message, then sends the acknowledgment message to that port.

[5.4] Phase 5.4 for Sending Cancellation Message

In this phase, the node first prepares a cancellation message based on the acknowledgment message received as follows:

(1) Makes the no. of the command in the cancellation message a value showing a cancellation command.

(2) Makes the no. of the sender node in the cancellation message the same as the no. of the sender node in the acknowledgment message.

(3) Makes the list of chooser node nos. in the cancellation message the same as the list of chooser node nos. in the acknowledgment message.

(4) Makes the list of numbers of requested channels in the cancellation message the same as the number of request channels in the acknowledgment message.

(5) Makes the number of suppliable channels in the cancellation message the number of the remaining suppliable channels.

(6) Makes the number of hops in the cancellation message the same as the number of hops in the acknowledgment message.

(7) Makes the number of reverse acknowledgment messages in the cancellation message 0.

(8) Makes the number of reverse cancellation messages in the cancellation message 0.

(9) Makes the list of nos. of nodes along the alternative route in the cancellation message the same as the list of nos. of nodes along the alternative route in the acknowledgment message.

Further, the node reduces the number of suppliable channels in the records of the acknowledgment messages in the input message table of the port receiving the acknowledgment message by the number of suppliable channels in the cancellation message. If the number of suppliable channels in the cancellation message prepared is not 0, it executes the step of releasing spare channels and the step of registering the output cancellation message for the port receiving the acknowledgment messagem, then sends the cancellation message to the port.

[5.4.1] Step for Registering Output Cancellation Message

At this step, the node registers the cancellation message in the output message table of the port. It makes the no. of the input port in the record corresponding to the message the no. of the port receiving the message which caused the registration processing. Further, it makes the number of channels used in the records 0.

[5.4.2] Step for Opening Spare Channels

At this step, the node reduces the number of spare channels for the port by the number of suppliable channels in the cancellation message and increases the number of released channels of the port by the number of suppliable channels.

[5.5] Phase 5.5 for Sending Confirmation Message

In this phase, the node prepares a confirmation message based on the acknowledgment message received as follows:

(1) Makes the no. of the command in the confirmation message a value indicating a confirmation command.

(2) Makes the no. of the sender node in the confirmation message the same as the no. of the sender node in the acknowledgment message.

(3) Makes the list of the chooser node nos. in the confirmation message the same as the list of chooser node nos. in the acknowledgment message.

(4) Makes the list of numbers of requested channels in the confirmation message the same as the list of numbers of requested channels in the acknowledgment message.

(5) Makes the number of suppliable channels in the confirmation message the same as the number of suppliable channels in the acknowledgment message.

(6) Makes the number of hops in the confirmation message the same as the number of hops in the acknowledgment message.

(7) Makes the number of reverse acknowledgment messages in the confirmation message 0.

(8) Makes the number of reverse cancellation messages in the confirmation message 0.

(9) Makes the list of nos. of nodes along the alternative route in the confirmation message the list of nos. of nodes along the alternative route in the acknowledgment message plus the no. of the node in question.

Further, the node increases the number of channels used in the records of the confirmation messages in the input message table of the port receiving the confirmation message by the number of suppliable channels in the acknowledgment message. Further, it executes the step [5.5.1] for finally confirming the spare channels and the step [5.5.2] for registering the output confirmation message for the port receiving the acknowledgment message, then sends the confirmation message to the port.

[5.5.1] Step for Finally Confirming Spare Channels

At this step, the node reduces the number of spare channels of the port by the number of suppliable channels in the confirmation message and increases the number of finally confirmed channels of the port by the number of suppliable channels.

[5.5.2] Step for Registering Output Confirmation Message

At this step, the node registers the confirmation message in the output message table of the port. It makes the no. of the input port in the record of the message the no. of the port receiving the message causing the registration processing. Further, it makes the number of the channels used in the record 0.

[6] Step for Processing Cancellation Message (FIGS. 1–4)

Figure 5:
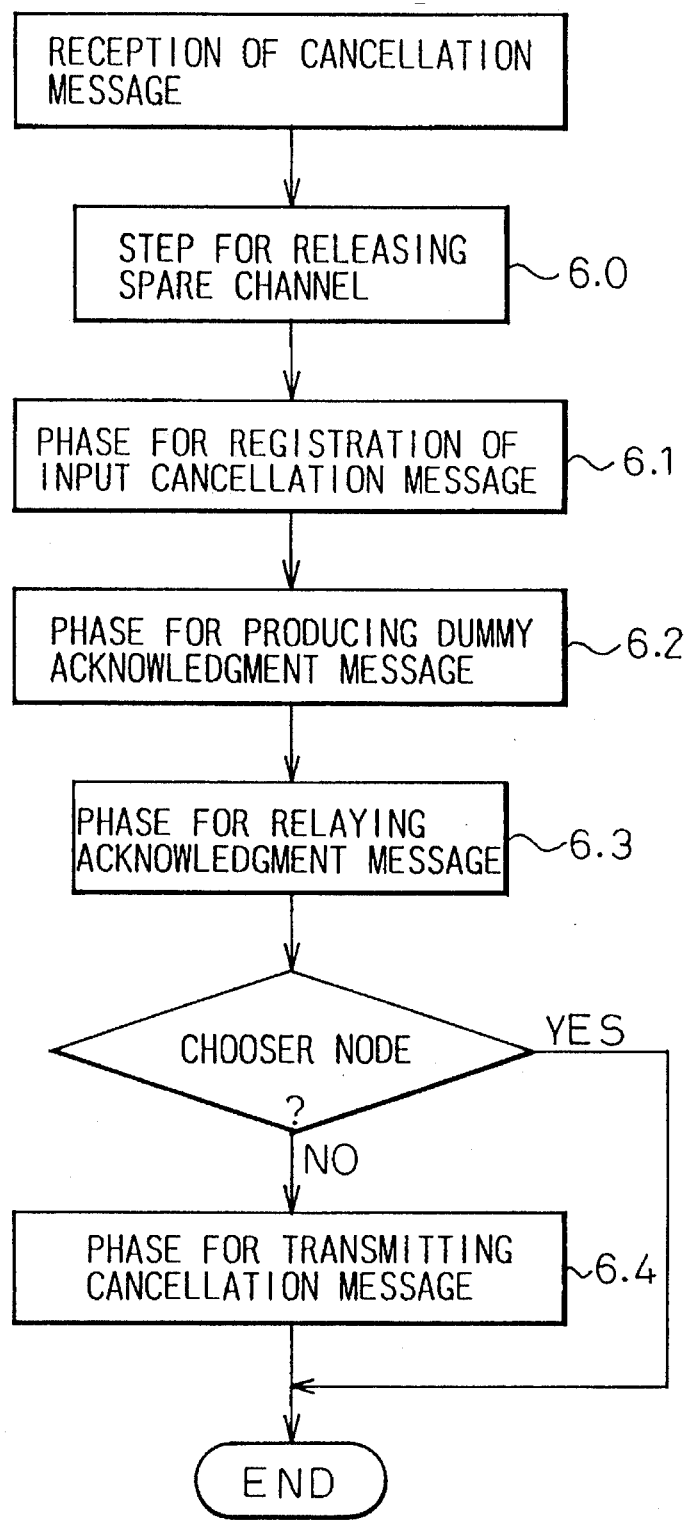
FIG. 5 is a flow chart of the stage for processing a cancellation message.

FIG. 5 is a flow chart of the stage for processing a cancellation message. As shown in FIG. 5, a node receiving a cancellation message first executes the step for opening spare channels, then executes the phase 6.1 for registering the input cancellation message. Next, by the phase 6.2 for producing a dummy acknowledgment message, it prepares a dummy acknowledgment message based on the cancellation message received by the node and executes the phase 6.3 for relaying a acknowledgment message as if it had received this as the acknowledgment message. Next, the node investigates if it itself is a chooser node in the message or is another node. As a result, (1) If the node is a chooser node, it ends the stage 4.

(2) If the node is not a chooser node, it executes the phase 6.4 for sending a cancellation message, then ends the stage 4.

[6.1] Phase 6.1 for Registering Input Cancellation Message

In this phase, the node registers the cancellation message in the input message table for the port receiving the message.

[6.2] Phase 6.2 for Producing Dummy Acknowledgment Message

In this phase, first, the node makes the value of the number of suppliable channels in the cancellation message received the number of remaining suppliable channels. Then, it searches for records of the confirmation messages able to be identified as the cancellation message from the output message table of the port receiving the cancellation message. Here, "confirmation messages able to be identified as a cancellation message" means messages which meet the following conditions:

(1) The no. of the sender node in the acknowledgment message is the same as the no. of the sender node in the cancellation message.

(2) The list of the chooser node nos. in the acknowledgment message is the same as the list of chooser node nos. in the cancellation message.

(3) The list of numbers of requested channels in the acknowledgment message is the same as the list of numbers of requested channels in the cancellation message.

(4) The number of suppliable channels in the acknowledgment message is greater than or equal to the number of suppliable channels in the cancellation message.

(5) The number of hops in the acknowledgment message is the same as the number of hops in the cancellation message.

(6) The list of nos. of nodes along the alternative route in the acknowledgment message is the same as the list of nos. of nodes along the alternative route in the cancellation message.

The node takes out the acknowledgment messages in the order of later arrival and executes the following processing on them:

(1) Subtracts from the number of suppliable channels in the record the number of channels used in the record. Calls the resultant value the number of nonused channels and compares the number of nonused channels and the number of remaining suppliable channels and (a) When the number of nonused channels is greater than or equal to the number of remaining suppliable channels, increases the number of channels used by the number of remaining suppliable channels and, further, makes the number of remaining suppliable channels 0.

(b) When the number of nonused channels is less than the number of remaining suppliable channels, increases the number of channels used by the number of nonused channels and, further, reduces the number of remaining suppliable channels by the number of nonused channels.

This work ends when the number of remaining suppliable channels becomes 0. The port to which the acknowledgment message is input is found from the no. of the port in the records. By this, the node prepares a dummy acknowledgment message assumed to have been received from the port as follows:

(1) Makes the no. of the command in the dummy acknowledgment message a value indicating an acknowledgment command.

(2) Makes the no. of the sender node in the dummy acknowledgment message the same as the no. of the sender no. in the cancellation message.

(3) Makes the list of the chooser node nos. in the dummy acknowledgment message the same as the list of chooser node nos. in the cancellation message.

(4) Makes the list of numbers of requested channels in the dummy acknowledgment message the same as the list of numbers of requested channels in the cancellation message.

(5) Makes the list of numbers of suppliable channels in the dummy acknowledgment message the same as the list of numbers of suppliable channels in the cancellation message.

(6) Makes the number of hops in the dummy acknowledgment message the number of hops in the cancellation message minus 1.

(7) Makes the number of reverse acknowledgment messages in the dummy acknowledgment message 0.

(8) Makes the number of reverse cancellation messages in the dummy acknowledgment message 0.

(9) Makes the list of nos. of nodes along the alternative route in the acknowledgment message the list of nos. of nodes along the alternative route in the cancellation message minus the last element.

[7] Stage for Processing Confirmation Message (5 in FIG. 1)

Figure 6:
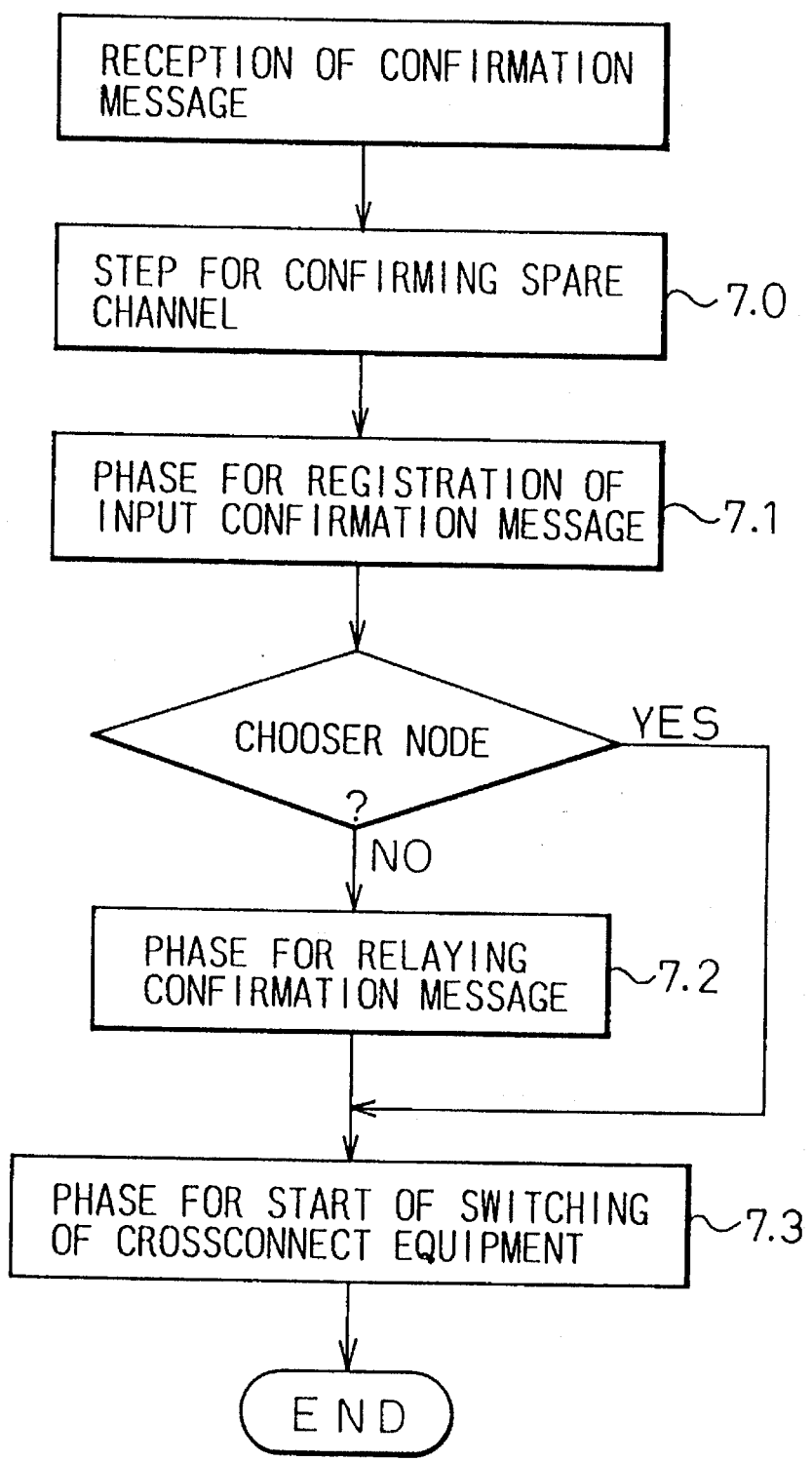
FIG. 6 is a flow chart of the stage for processing a confirmation message.

FIG. 6 is a flow chart of the stage for processing a confirmation message. As shown in FIG. 6, a node receiving a confirmation message executes the step 7.0 for finally confirming spare channels, then executes a phase 7.1 for registering the input confirmation message. Next, the node investigates if it itself is a chooser node in the received confirmation message or is another node. As a result, (1) If the node is a chooser node, it executes the phase 7.2 for relaying the confirmation message. Next, it executes the phase 7.3 for starting the switching of the cross-connect equipment, then ends the stage 5.

[7.1] Phase 7.1 for Registering Input Confirmation Message

In this phase, the node registers the input confirmation message in the input message table of the port receiving the message.

[7.2] Phase 7.2 for Relaying Confirmation Message

In this phase, the node first prepares a confirmation message to be sent out. That is, it prepares a copy of the confirmation message received and then makes the following changes:

(1) Reduces the number of hops in the new confirmation message by 1.

Next, the node makes the number of suppliable channels in the original confirmation message the number of remaining suppliable channels. It then searches for records of acknowledgment messages able to be identified as a confirmation message from the output message table of the port receiving the confirmation message. Here, "acknowledgment messages able to be identified as a confirmation message" means messages which meet the following conditions:

(1) The no. of the sender node in the acknowledgment message is the same as the no. of the sender node in the confirmation message.

(2) The list of the chooser node nos. in the acknowledgment message is the same as the list of chooser node nos. in the confirmation message.

(3) The list of numbers of requested channels in the acknowledgment message is the same as the list of numbers of requested channels in the confirmation message.

(4) The number of suppliable channels in the acknowledgment message is greater than or equal to the number of suppliable channels in the confirmation message.

(5) The number of hops in the acknowledgment message is the same as the number of hops in the confirmation message.

(6) The list of nos. of nodes along the alternative route in the acknowledgment message is the same as the list of nos. of nodes along the alternative route in the confirmation message.

The node takes out the confirmation messages in the order of earlier arrival and executes the following processing on them:

(1) Subtracts from the number of suppliable channels in the record the number of channels used in the record. Calls the resultant value the number of nonused channels and compares the number of nonused channels and the number of remaining suppliable channels and (a) When the number of nonused channels is greater than or equal to the number of remaining suppliable channels, increases the number of channels used by the number of remaining suppliable channels and, further, makes the number of remaining suppliable channels 0.

(b) When the number of nonused channels is less than the number of remaining suppliable channels, increases the number of channels used by the number of nonused channels and, further, reduces the number of remaining suppliable channels by the number of nonused channels.

This work ends when the number of remaining suppliable channels becomes 0. Next, the node executes the step of finally confirming the spare channels and the step of registering the output confirmation message for the ports specified by the nos. of the ports in the records, then sends the newly prepared confirmation messages to the ports.

[8] Stage for Processing Cross-Connection Completion Message (6 in FIG. 1)

Figure 7B:
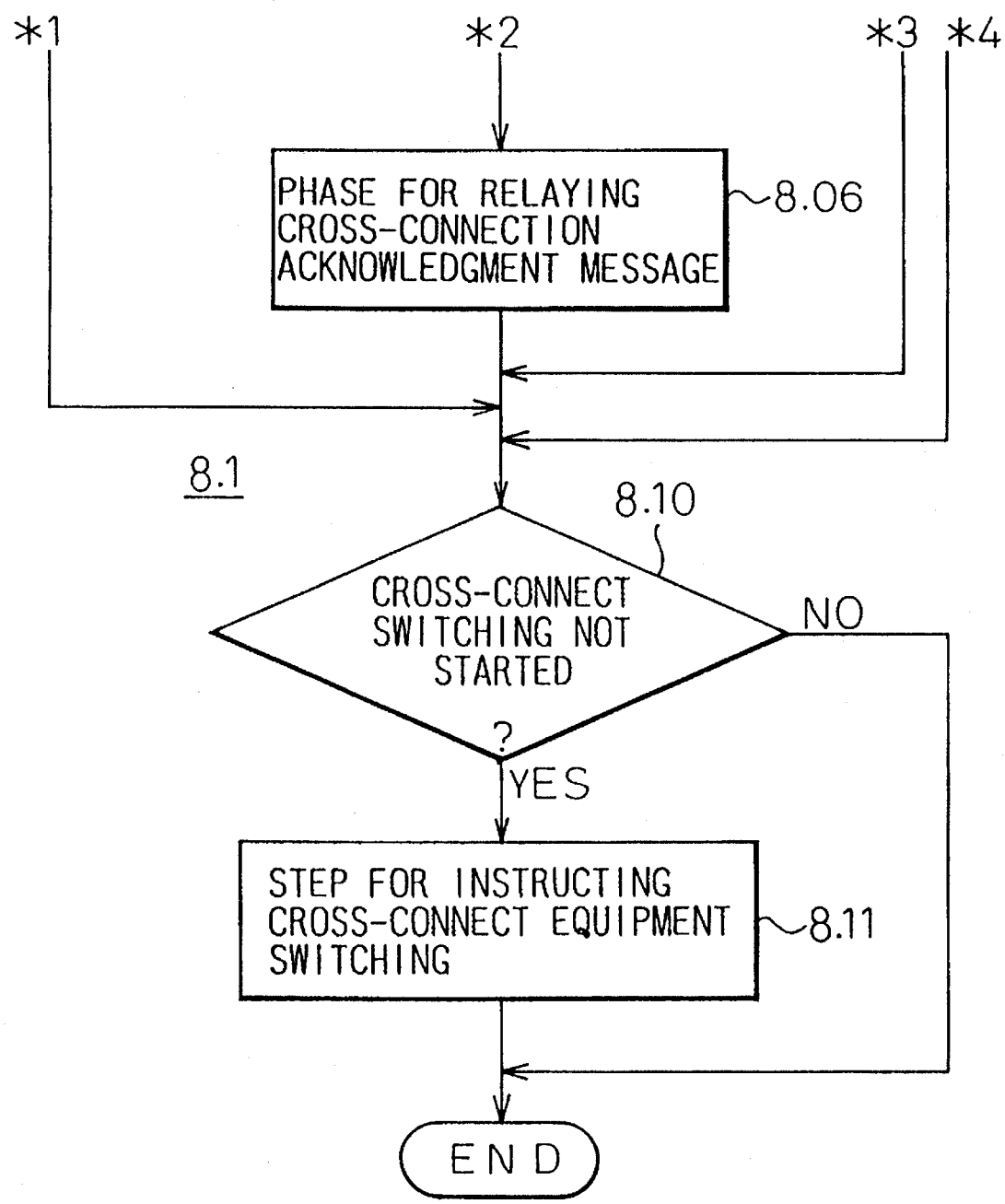

FIGS. 7A and 7B are flow charts of the stage for processing a cross-connection completion message. A node receiving a cross-connection completion message at the step 8.00 in FIG. 7A first searches for records of confirmation messages able to be identified as said cross-connection completion message and indicating cross-connect equipment switching in progress from the cross-connection table in the node and makes the Boolean algebra for the completion of cross-connect equipment switching in the record "true". It then investigates if it itself is the sender node, chooser node, or other node at step 8.01. As a result (1) If the node is the sender node, it executes the phase 8.03 for sending a cross-connection acknowledgment message.

(2) If the node is a chooser node and when already receiving and processing the corresponding cross-connection acknowledgment message (step 8.04), it executes the phase 8.05 for sending a cross-connection confirmation message.

(3) If the node is neither the sender node nor a chooser node and when already receiving and processing the corresponding cross-connection acknowledgment message (step 8.04), it executes the phase 8.06 for relaying the cross-connection acknowledgment message.

Next, the node refers to the cross-connection table and if there are records indicating that the cross-connect switching has not yet started, makes the Boolean algebra of the start of cross-connect equipment switching for one of the records "true, executes the step 8.11 for instructing the cross-connect equipment switching, then ends the stage 6.

[8.1] Phase 8.1 for Starting Cross-Connect Equipment Switching (?)

In this phase, the node first (1) Registers the sent confirmation message in the cross-connection table when the node is the sender node and (a) Makes the no. of the input port the no. of the port receiving the acknowledgment message causing the processing for starting the switching.

(b) Makes the no. of the output port the no. of the port sending the confirmation message.

(c) Makes the Boolean algebra for acknowledging the cross-connect equipment switching "true".

(2) Registers the received confirmation message in the cross-connection table when the node is a chooser node and (a) Makes the no. of the input port the no. of the port receiving the message.

(b) Makes the no. of the output port the no. of the port receiving the message.

(c) Makes the Boolean algebra for acknowledging the cross-connect equipment switching "false".

(3) Makes the Boolean algebra for completing the cross-connect equipment switching "false".

(4) Registers the received confirmation message in the cross-connection table when the node is not the sender node nor a chooser node and (a) Makes the no. of the input port the no. of the port receiving the message.

(b) Makes the no. of the output port the no. of the port outputting a confirmation message as a result of the registration processing.

(c) Makes the Boolean algebra for acknowledging the cross-connect equipment switching "false".

(5) Refers to the cross-connection table to investigate if cross-connect equipment switching is currently in progress. That is, (a) If the Boolean algebra for starting the cross-connect equipment switching is "true" and there is a record indicating that the Boolean algebra for completing the cross-connect equipment switching is "false", makes the Boolean algebra for starting the cross-connect equipment switching "false".

(b) If the Boolean algebra for starting the cross-connect equipment switching is "true" and there is no record indicating that the Boolean algebra for completing the cross-connect equipment switching is "false", makes the Boolean algebra for starting the cross-connect equipment switching "true" and executes the step 8.11 for instructing the cross-connect equipment switching. At this time, the CPU for the failure restoration processing at the node does not wait for the completion of the cross-connect equipment switching. The cross-connect equipment notifies the CPU for the failure restoration processing of the completion of the instructed switching when completed. In a simulation, simulation is made of the receipt of the cross-connection completion message by the node at the time of the completion of the switching. By this, the node executes the stage for processing the cross-connection completion message.

[8.1.1] Step 8.11 for Instructing Cross-Connect Equipment Switching

In this step, the node instructs switching to the cross-connect equipment at the node. This switching instruction is simulated by making it appear that the node is receiving a cross-connection completion message at the time of the completion of the switching. The cross-connection completion message is the acknowledgment message with the no. of the command changed to indicate a cross-connection completion command.

[8] Stage for Processing Cross-Connection Acknowledgment Message (7 in FIG. 1)

FIG. 8 is a flow chart of the stage for processing a cross-connection acknowledgment message. A node receiving a cross-connection acknowledgment message at step 9.10 in FIG. 8 first searches for records of confirmation messages able to be identified as the cross-connection acknowledgment message and indicating the acknowledgmentment of the cross-connect equipment switching has not been finished from the cross-connection table at the node and makes the Boolean algebra for acknowledging the cross-connect equipment switching in the record "true". At step 9.11 it then investigates if the cross-connect equipment switching has already been ended. As a result, (1) If the cross-connect equipment switching has already completed, at step 9.12, the node next investigates if it itself is a chooser node in the cross-connection acknowledgment message received or is another node. As a result, (a) If the node is a chooser node, the node executes the phase 9.3 for sending a cross-connection acknowledgment message and then ends the stage 7.

(b) If the node is not a chooser node, the node executes the phase 9.2 for relaying the cross-connection acknowledgment message, then ends the stage 7.

(2) If determined at step 9.11 that the cross-connect equipment switching has not yet completed, the node ends the stage 7.

[9.1] Phase for Sending Cross-Connection Acknowledgment Message

In this phase, the node prepares a cross-connection acknowledgment message based on the confirmation message in the record of the cross-connection table of the node. That is, it prepares a copy of the confirmation message and then makes the following changes:

(1) Makes the no. of the command in the cross-connection acknowledgment message a value indicating a cross-connection acknowledgment command.

Further, the node executes the step [9.1.1] for restoration of the spare channels and sends the cross-connection acknowledgment message to the port specified by the no. of the output port in the record.

[9.1.1] Step for Restoring Spare Channels

At this step, the node reduces the number of the finally confirmed channels of the port indicated by the no. of the input port in the record in the cross-connection table at the node by the number of the suppliable channels in the record.

[9.2] Phase 9.2 for Relaying Cross-Connection Acknowledgment Message

At this phase, the node prepares a cross-connection acknowledgment message on the basis of the confirmation message in the record of the acknowledgment message in the cross-connection table at the node. That is, it prepares a copy of the confirmation message and makes the following changes:

(1) Makes the no. of the command in the cross-connection acknowledgment message a value indicating a cross-connection acknowledgment command.

(2) Reduces the number of hops of the cross-connection acknowledgment message by 1.

The node then sends the cross-connection acknowledgment message to the port indicated by the no. of the output port in the record.

[9.3] Phase 9.3 for Sending Cross-Connection Acknowledgment Message

At this phase, the node prepares a cross-connection confirmation message based on the confirmation message in the record in the cross-connection table at the node. That is, it prepares a copy of the confirmation message and makes the following changes:

(1) Makes the no. of the command in the cross-connection confirmation message a value indicating a cross-connection confirmation command.

(2) Makes the number of hops in the cross-connection confirmation message 1.

Further, the node sends the cross-connection confirmation message to the port indicated by the no. of the output port in the record.

[10] Stage for Processing Cross-Connection Confirmation Message (8 in FIG. 1)

FIG. 9 is a flow chart of the stage for processing a cross-connection confirmation message. A node receiving a cross-connection confirmation message at step 10.01 in FIG. 9 investigates at step 10.02 if it itself is the sender node in the received cross-connection confirmation message. As a result, (1) If the node is the sender node, it ends the stage 8.

(2) If then node is not the sender node, the node executes the phase 10.1 for relaying the cross-connection confirmation message, then ends the stage 8.

[10.1] Phase 10.1 for Relaying Cross-Connection Confirmation Message

At this phase, the node first prepares the cross-connection confirmation message to be sent out based on the cross-connection confirmation message in question. That is, it prepares a copy of the cross-connection confirmation message in question and makes the following changes:

(1) Increases the number of hops is the new cross-connection confirmation message by 1.

Next, the node searches for records of confirmation messages able to be identified as the cross-connection confirmation message in question and indicating that the cross-connect equipment switching has already completed and the cross-connect equipment switching has already been acknowledged from the cross-connection table at the node. It then sends the newly prepared cross-connection confirmation message to the port indicated by the no. of the input port in the record.

FIGS. 10 to 29 show small network topologies of the network scenarios (1) to (20) based on embodiments of the present invention. In the figures, the circles indicate nodes. The references N1, N2, . . . in the circles show the node names and the numbers in them the node nos. The lines linking one node with another indicate links. The links are named by the nos. of the nodes at their two ends, for example, by L1←→3. When paying particular attention to the direction, however, they are indicated by L1→2, L2→1, etc.

The figures given near the links are the numbers of released channels of the links. For example, in FIG. 10, since L8←→9 has 12 spare channels, 12ch is indicated near it. Further, the nodes and links indicated by broken lines means ones currently not available.

FIGS. 30 to 42 are tables of messages in the embodiments of the present invention. FIG. 30 shows a restoration message produced at then ode N8; FIG. 31 a restoration message transmitted to the link L9→10; FIG. 32 an acknowledgment message prepared at then ode N6; FIG. 33 a restoration message continued from then ode N6 to the node N3; FIG. 34 an acknowledgment message relayed from the node N11 to node N10; FIG. 35 a cancellation message prepared at the node N6; FIG. 36 a confirmation message prepared at the node N8; FIG. 37 a dummy cancellation message prepared at the node N3; FIG. 38 an acknowledgment message transmitted from the node N3 to the node N4; FIG. 39 a confirmation message relayed from the node N9 to the node N10; FIG. 40 a cross-connection acknowledgment message transmitted from the node N8 to the node N9; FIG. 41 a cross-connection acknowledgment message relayed from the node N9 to the node N10; and FIG. 42 a cross-connection confirmation message transmitted from the node N6 to the node N11.

In the figures, the RS4, for example, described on the links indicates a restoration message, with 4 being the number of the suppliable channels. For example, N7, 2, 6 indicate chooser nodes (candidate), with the 7, 2, and 6 being the node nos. ch2, 4, and 8 for example indicate the number of channels corresponding to the chooser nodes N7, 2, and 6, that is, 2 channels for N7, 4 channels for N2, and 8 channels for N6. H4, for example, indicates the number of hops, with the 4 being the number of nodes passed through. Ack8, for example, indicates an acknowledgment message, with the 8 being the number of suppliable channels. CF8, for example, indicates a confirmation message, with 8 being the number of suppliable channels. Can2, for example, indicates a cancellation message, with the 2 being the number of suppliable channels. AckXC2 indicates a cross-connection acknowledgment message, with the 2 being the number of suppliable channels. CFXC2 for example indicates a cross-connection confirmation message, with the 2 being the number of suppliable channels.

Figure 43:
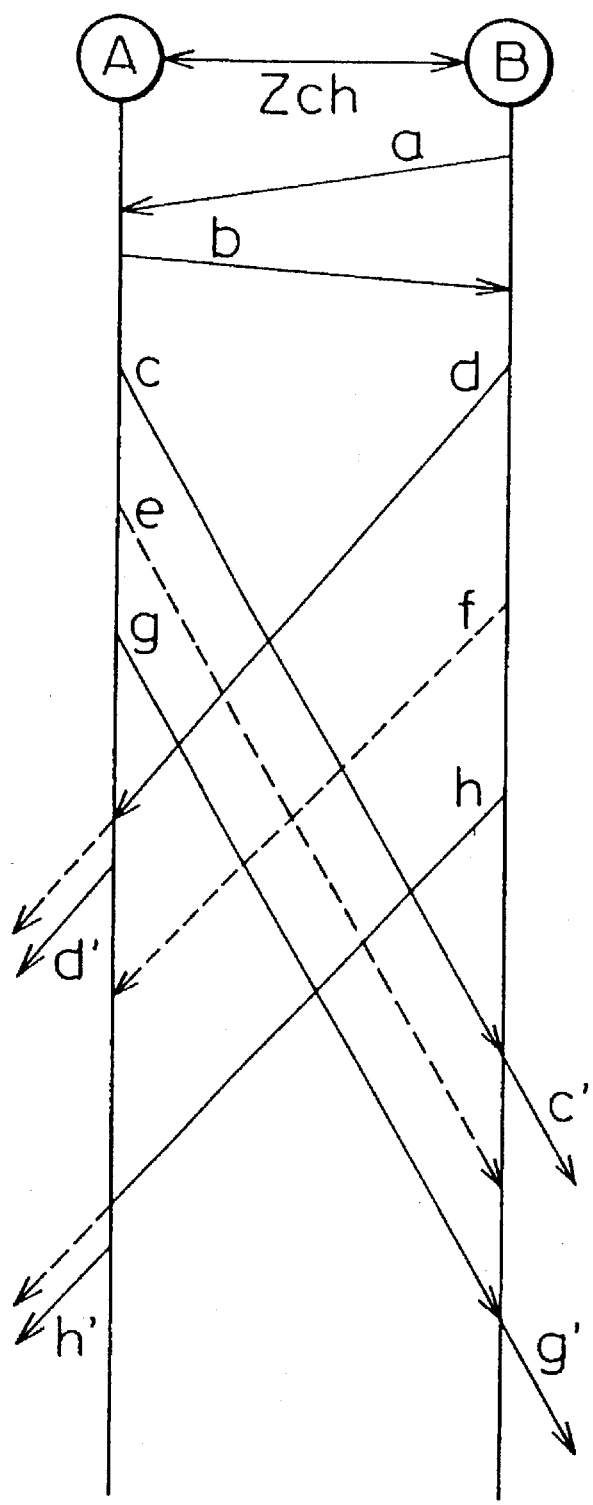
FIG. 43 is a view of a timetable as an example of in which acknowledgment messages compete.

FIG. 43 is a view of a timetable as an example in which acknowledgment messages compete. FIG. 44 is a table of the number of suppliable channels (1) in messages according to an example of the invention. FIG. 45 is a table of the number of suppliable channels (2) in messages according to an example of the invention. FIG. 46 is a crossing message table (1). FIG. 47 is a crossing message table (2).

[1] Detection of Failures

In FIG 10, the case is shown of a failure occurring at the node N7. The failure is detected at the nodes N2, N6, N8, and N10 adjoining the node N7.

[2] Initiation of Failure Restoration Processing

Take note of the node N8 in FIG. 10. The node N8 detects the failure from the link L7-8 and executes the stage 1 for inititio of failure restoration processing. The node N8, however, cannot determine if the failure is a failure of the link at the link L7-8 or a failure of the node at the node N7. The node N8 first therefore executes the phase 3.1 for determining the failed path. That is, it treats the working path passing through the link L7-8 as a candidate for a failed path.

Figure 11:
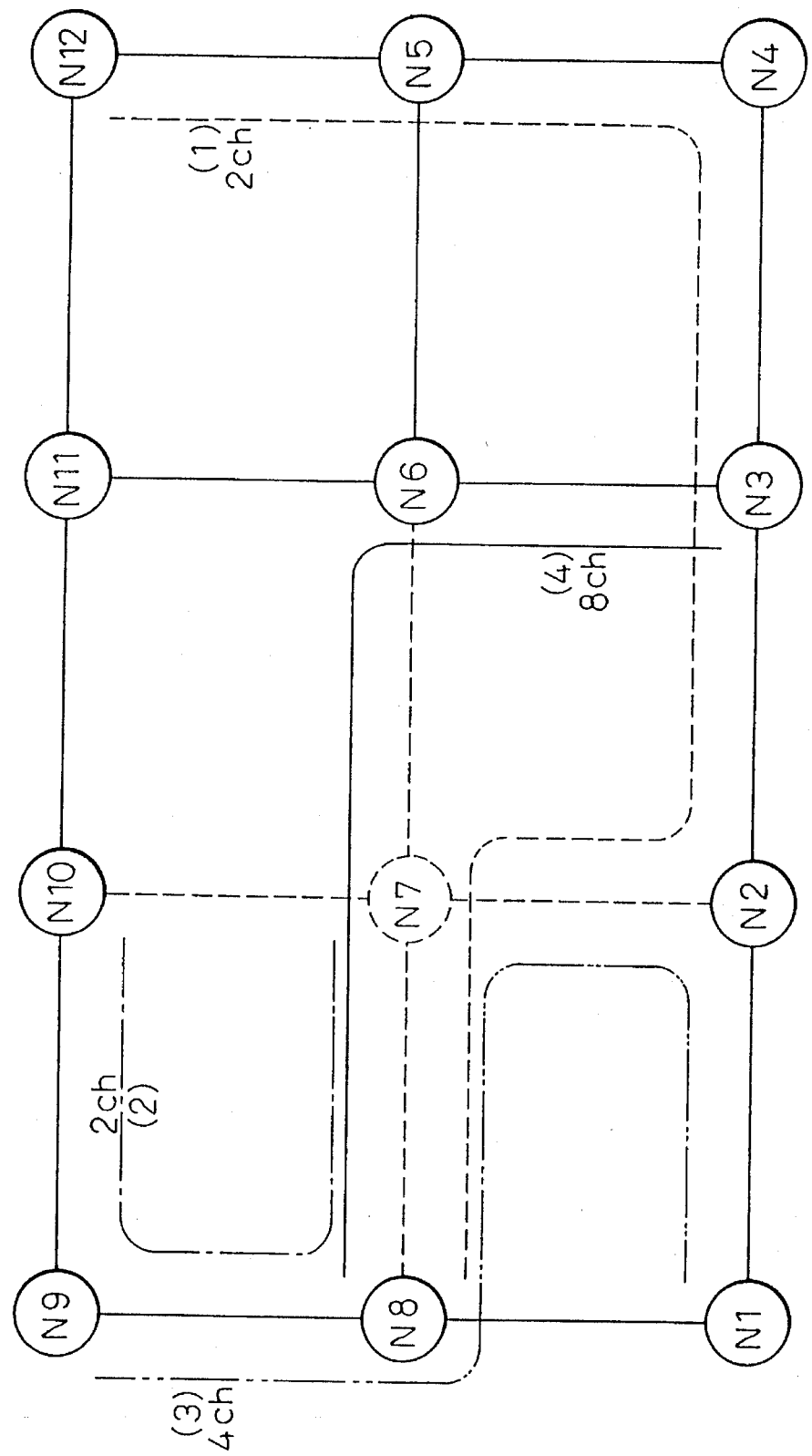
FIG. 11 is a view of a scenario (2) of a network in the present invention.

In FIG. 11, the free lines (1) to (4) connecting the links indicate working paths passing through the link L7-8 just before where the failure in the network occurred. That is, there are four paths shown by (1) to (4). The figures in parentheses show the number of the released channels of the paths.

(1) N12←→N5←→N4←→N3←→N2←→N7←→N8 (2ch)

(2) N10←→N9←→N8←→N7 (2ch)

(3) N9←→N8←→N7←→N2 (4ch)

(4) N8←→N7←→N6←→N3 (8ch)

If determining a failed path candidate to be a failed path when the no. of the node at the end of the path on the nonfailed side is larger than the no. of the node at the end of the path on the failed side, the paths (2), (3), and (4) become the failed paths. For the remaining path (1), the node N6 treats this as a failed path. Here, however, to facilitate understanding, initiation of the restoration processing for the nodes other than the node N8 is not considered at all.

Next, the node executes the phase 3.2 for bundling failed paths and creates the restoration message shown in FIG. 30. Then, it executes the phase 3.4 for sending a restoration message. Since there are 12 spare channels for the link L8←→9 (FIG. 10), it makes the number of suppliable channels 12 and sends the created restoration message to the link N8→9. Since the number of spare channels for the link L1←→8 is 0, it does not send the restoration message to the link L8→1.

[3] Relaying of Restoration Message

Figure 12:
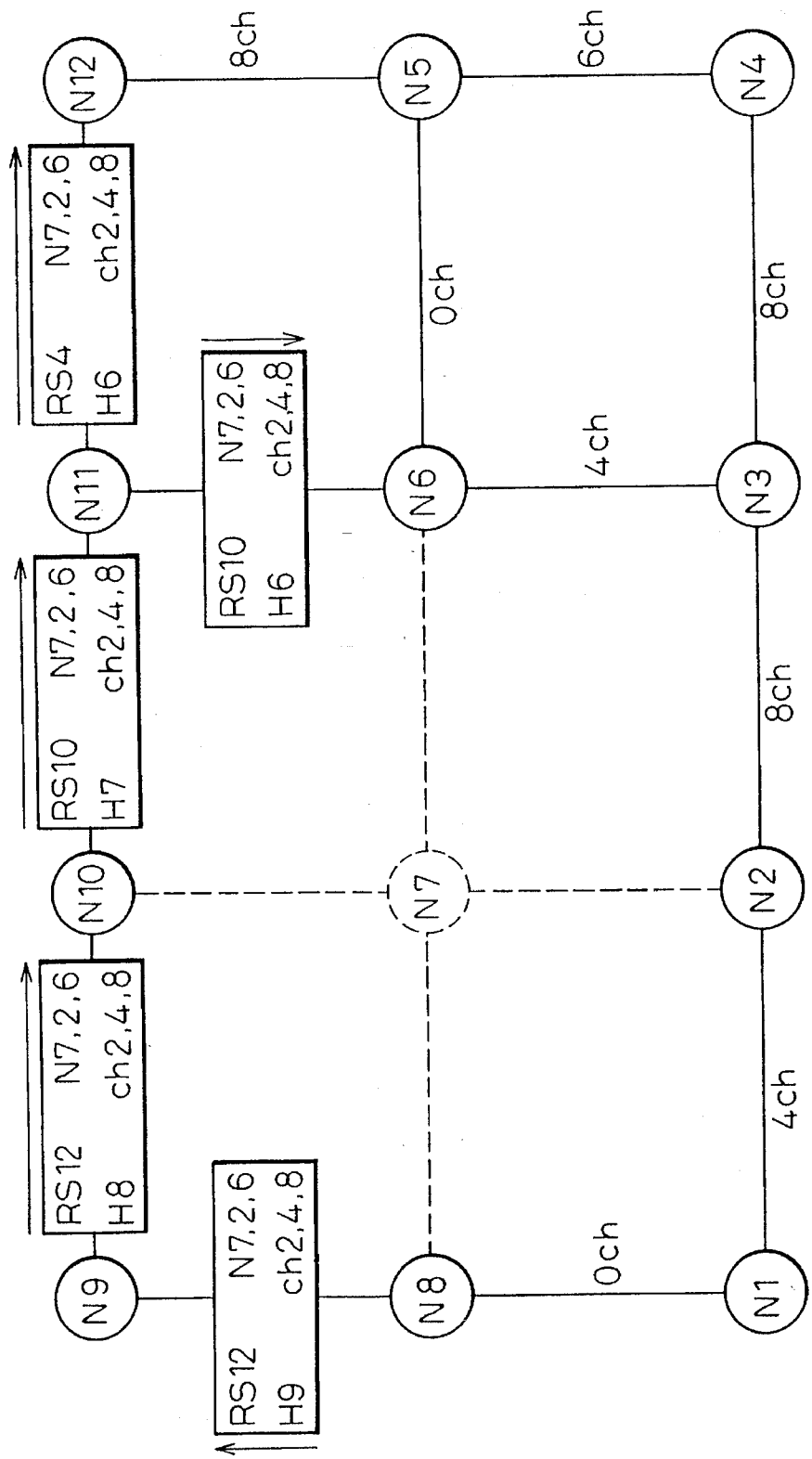
FIG. 12 is a view of a scenario (3) of a network in the present invention.

Take note of the node N9 in FIG. 12. The node N9 initiates the stage 2 for processing a restoration message when receiving a restoration message from the link L8→9. First, it executes the phase 4.1 for adjusting the restoration message, then executes the phase 4.2 for registering the input restoration message. Further, the node N9 is neither the sender node nor a chooser node stated in the restoration message, so executes the phase 4.3 for relaying the restoration message and relays the restoration message shown in FIG. 31 to the link L9→10. The restoration message is broadcast in this way.

[4] Sending of Acknowledgment Message

Figure 13:
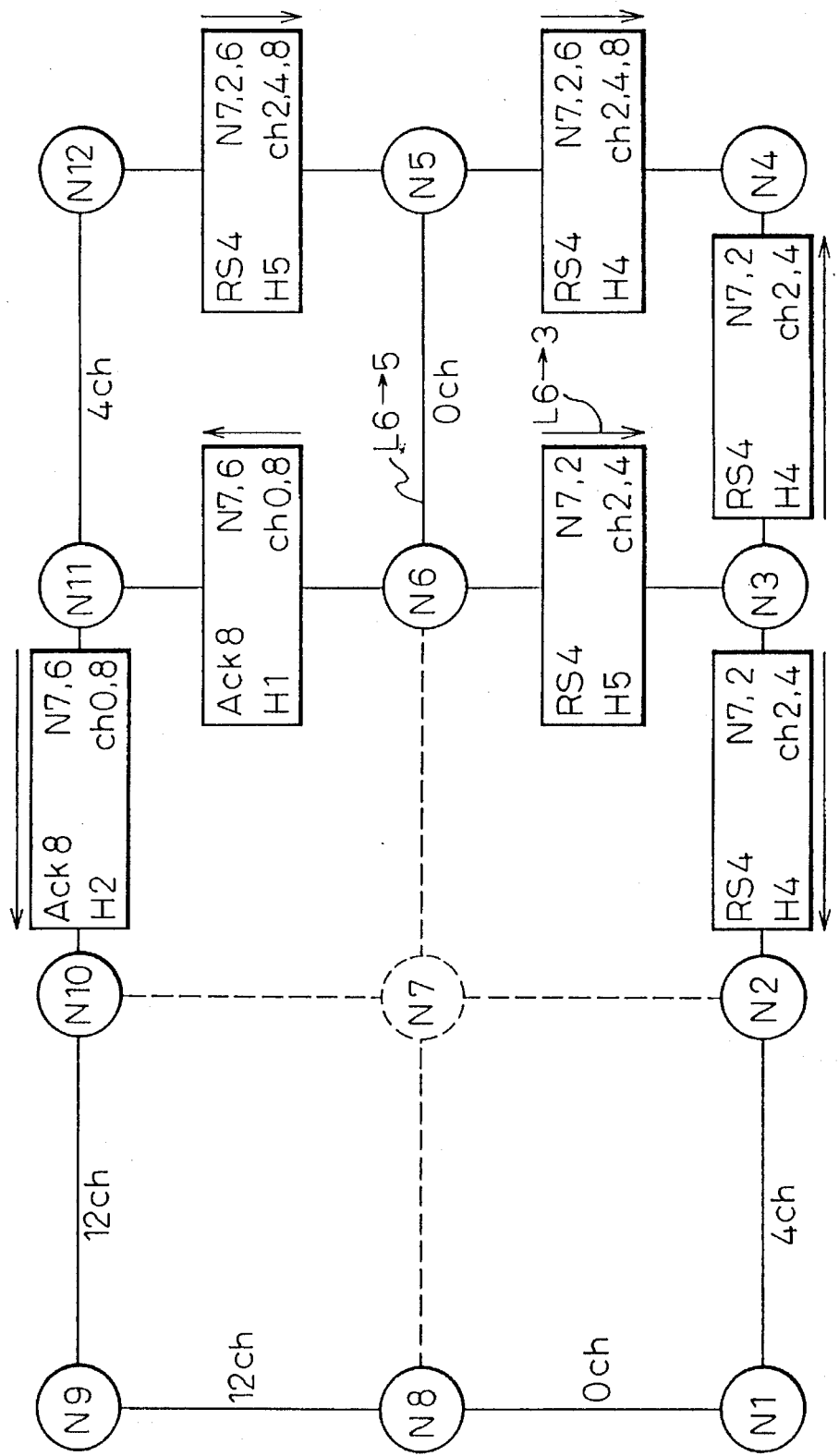
FIG. 13 is a view of a scenario (4) of a network in the present invention.

Take note of the node N6 in FIG. 13. The node N6 initiates the stage 2 for processing a restoration message when receiving a restoration message from the link L11→6. First, it executes the phase 4.1 for adjusting the restoration message, then executes the phase 4.2 for registering the input restoration message. Further, the node N6 is one of the chooser nodes stated in the restoration message, so executes the phase 4.4 for sending the restoration message and prepares and sends the restoration message shown in FIG. 32 to the link L6→11.

[5] Continuation of Restoration Message

In FIG. 13, after the node N6 sends the acknowledgment message, it then executes the phase 4.5 for continuing the restoration message and sends the restoration message shown in FIG. 33 to the link L6-3. There are zero released channels at the link L6-5>, so the message is not sent there.

[6] Relaying of Acknowledgment Message

Figure 14:
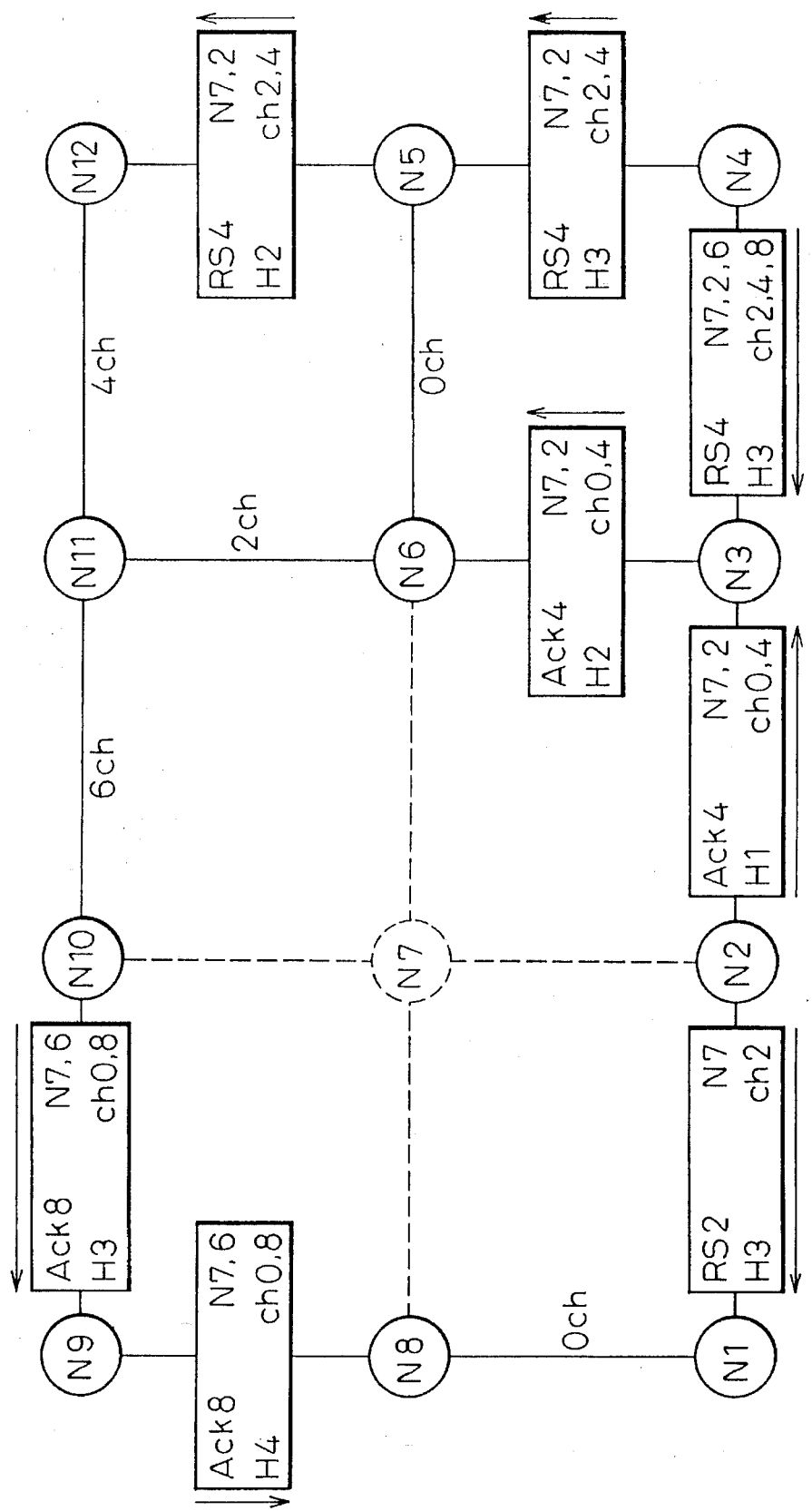
FIG. 14 is a view of a scenario (5) of a network in the present invention.

Take note of the node N11 in FIG. 13 and FIG. 14. The node N11 initiates the stage 3 for processing an acknowledgment message when receiving an acknowledgment message from the link L6→11. First, it executes the phase 5.1 for adjusting the acknowledgment message. Here, since there is no competition in acknowledgment messages, no special processing is performed and the phase 5.1 is ended. Next, it executes the phase 5.2 for registering the input acknowledgment message. Since the node N11 is not the sender node stated in the message, it executes the phase 5.3 for relaying the acknowledgment message and sends the acknowledgment message shown in FIG. 34 to the link L11→10. It then executes the phase 5.4 for sending the cancellation message, but no cancellation message is sent out here.

[7] Sending of Cancellation Message

Figure 15:
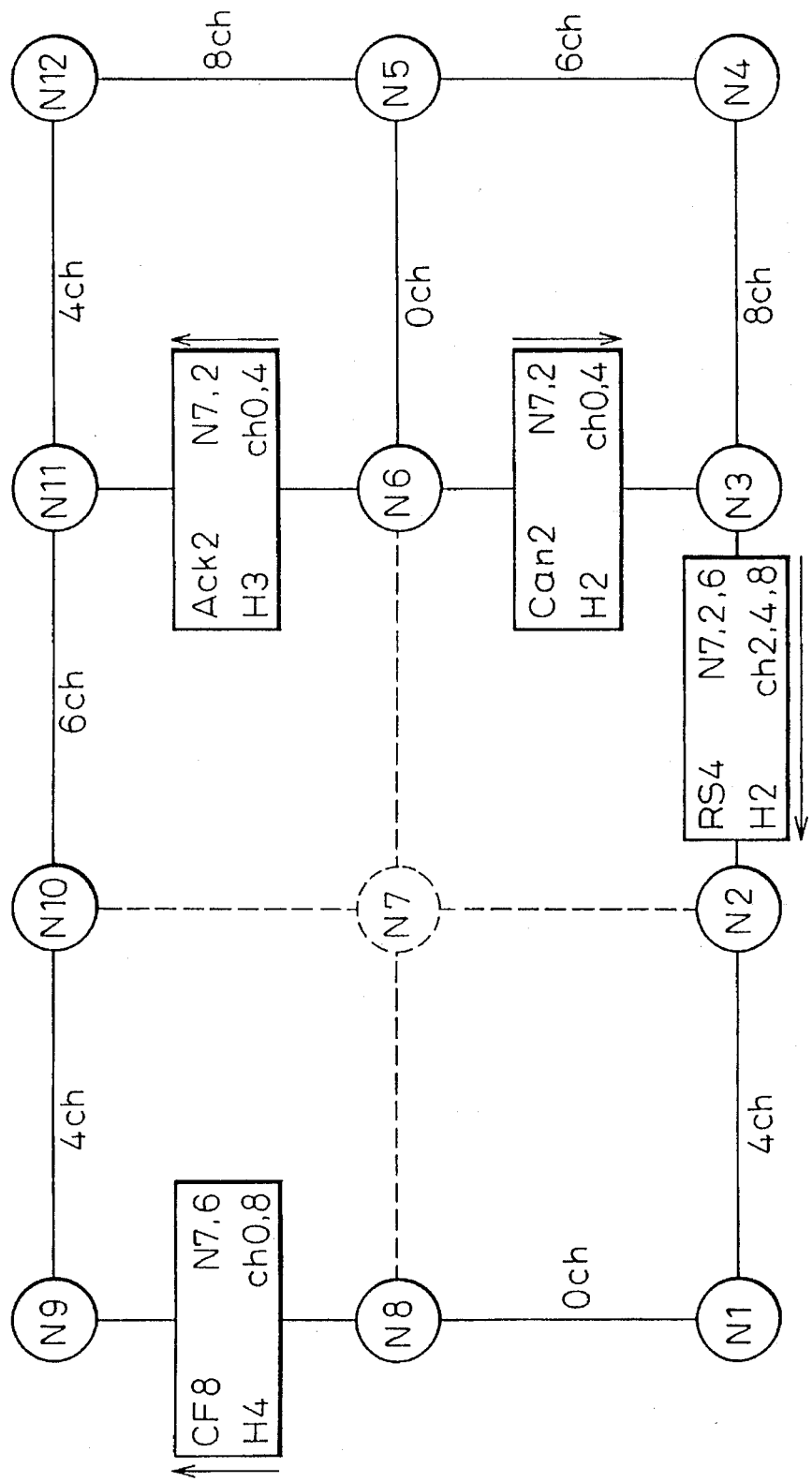
FIG. 15 is a view of a scenario (6) of a network in the present invention.

Take note of the node N6 in FIG. 15. The node N6 initiates the phase 5.3 for relaying the acknowledgment message when receiving an acknowledgment message from the link L3-6. First, it executes the phase 5.1 for adjusting the acknowledgment message, then executes the phase 5.2 for registering the input acknowledgment message and sends the acknowledgment message to the link L6-11. Next, it executes the phase 5.4 for sending the cancellation message and sends the cancellation message shown in FIG. 35 to the link L6-3.

[8] Sending of Confirmation Message

Take note of the node N8 in FIG. 15. The node N8 initiates the stage 3 for processing an acknowledgment message when receiving an acknowledgment message from the link L9→8. First, it executes the phase 5.1 for adjusting the acknowledgment message, then executes the phase 5.2 for registering the input acknowledgment message. Further, the node N8 is the sender node stated in the confirmation message, so executes the phase 5.5 for sending a confirmation message and sends the confirmation message shown in FIG. 36 to the link L8→9. Next, it executes the phase 5.6 for initiating the cross-connect equipment switching.

[9] Processing of Cancellation Message

Figure 16:
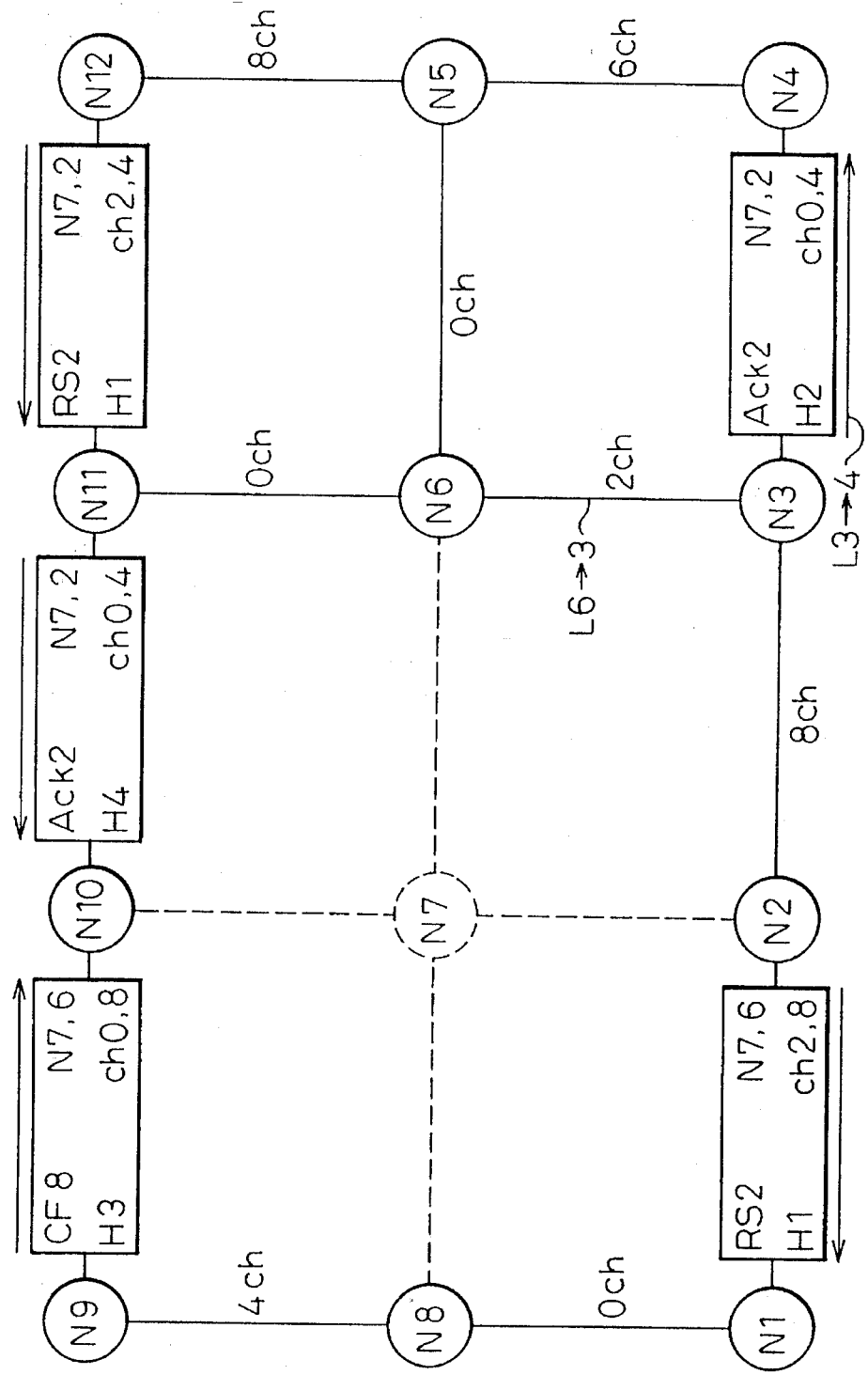
FIG. 16 is a view of a scenario (7) of a network in the present invention.
Figure 17:
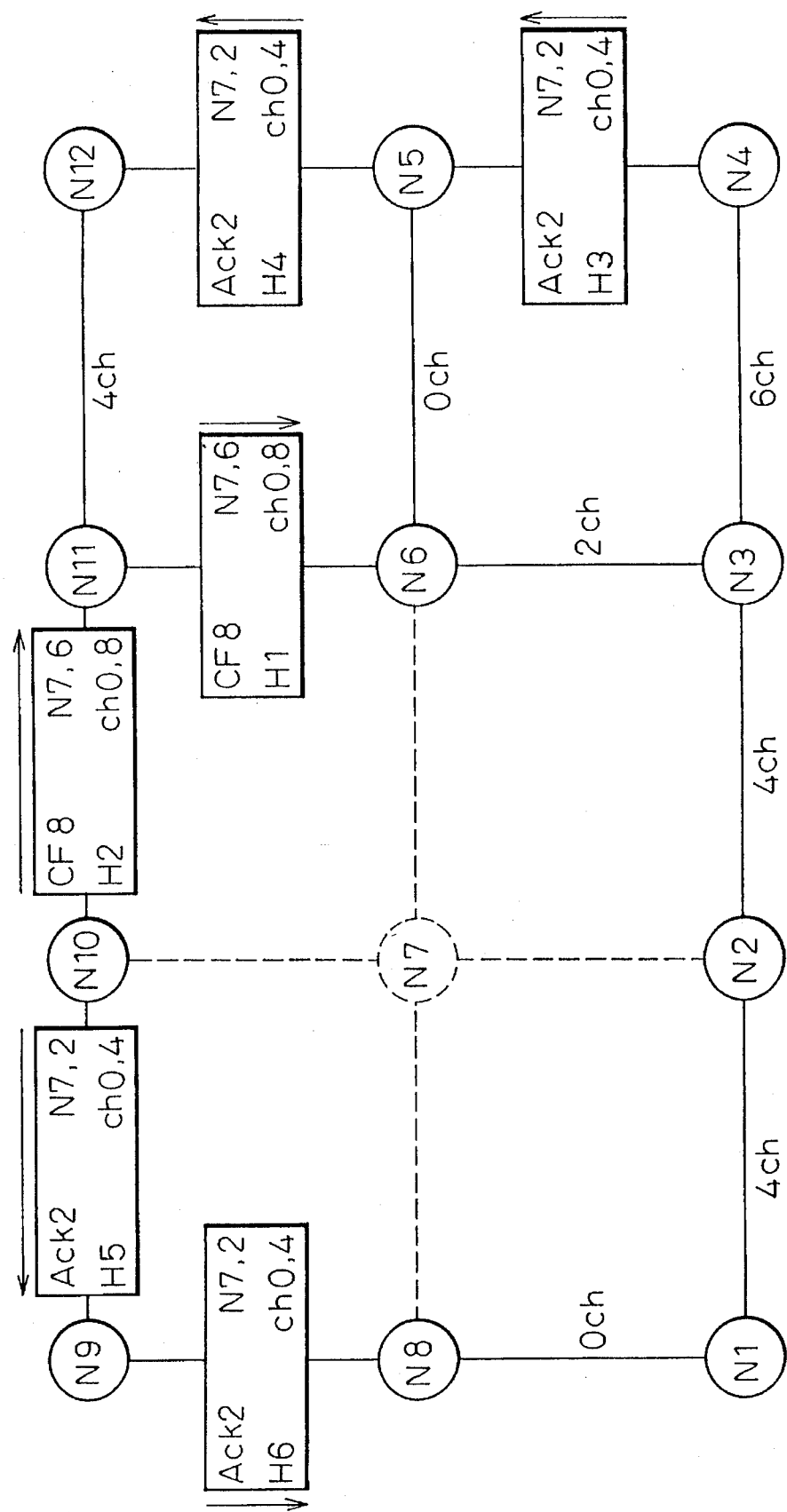
FIG. 17 is a view of a scenario (8) of a network in the present invention.
Figure 18:
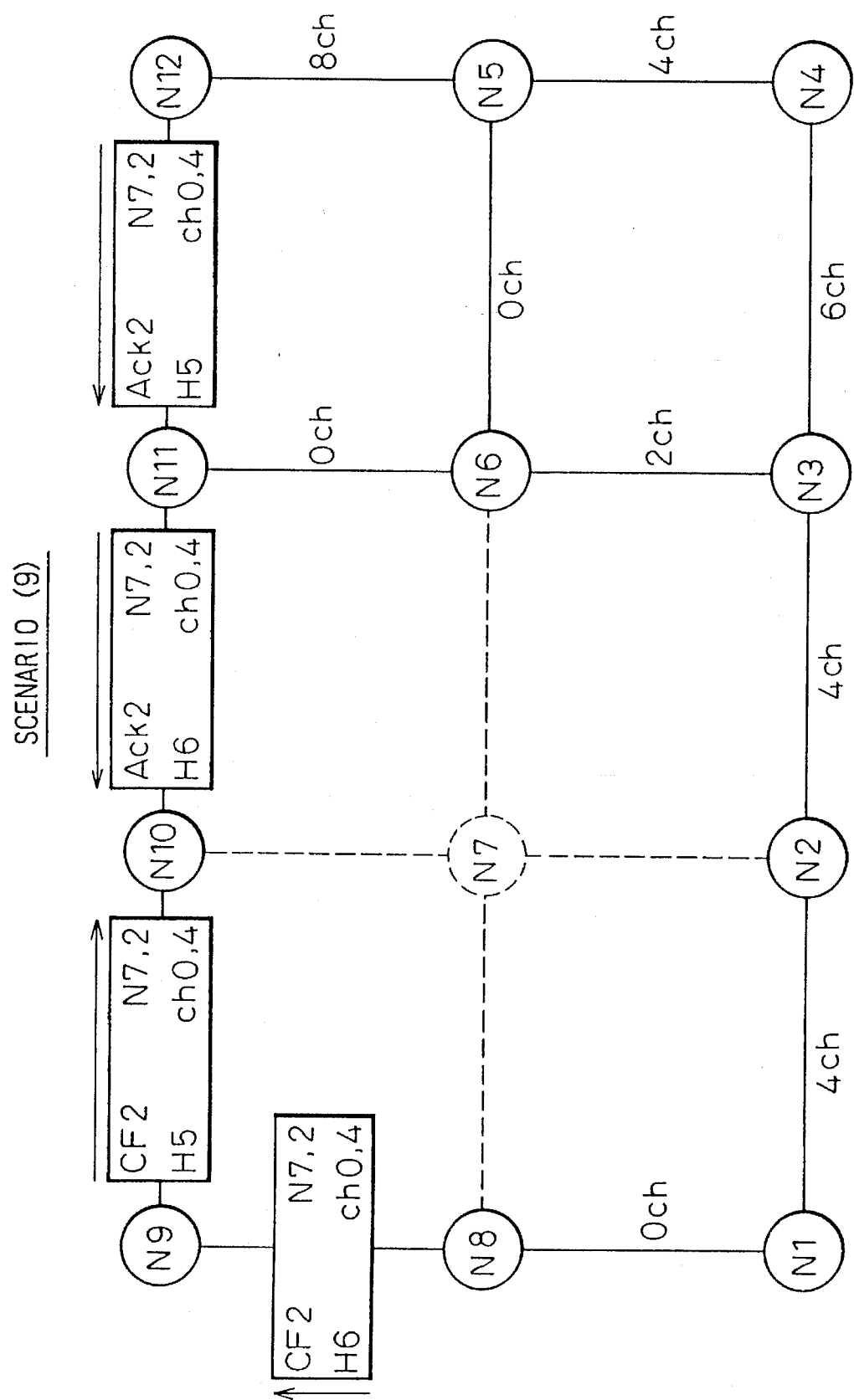
FIG. 18 is a view of a scenario (9) of a network in the present invention.
Figure 19:
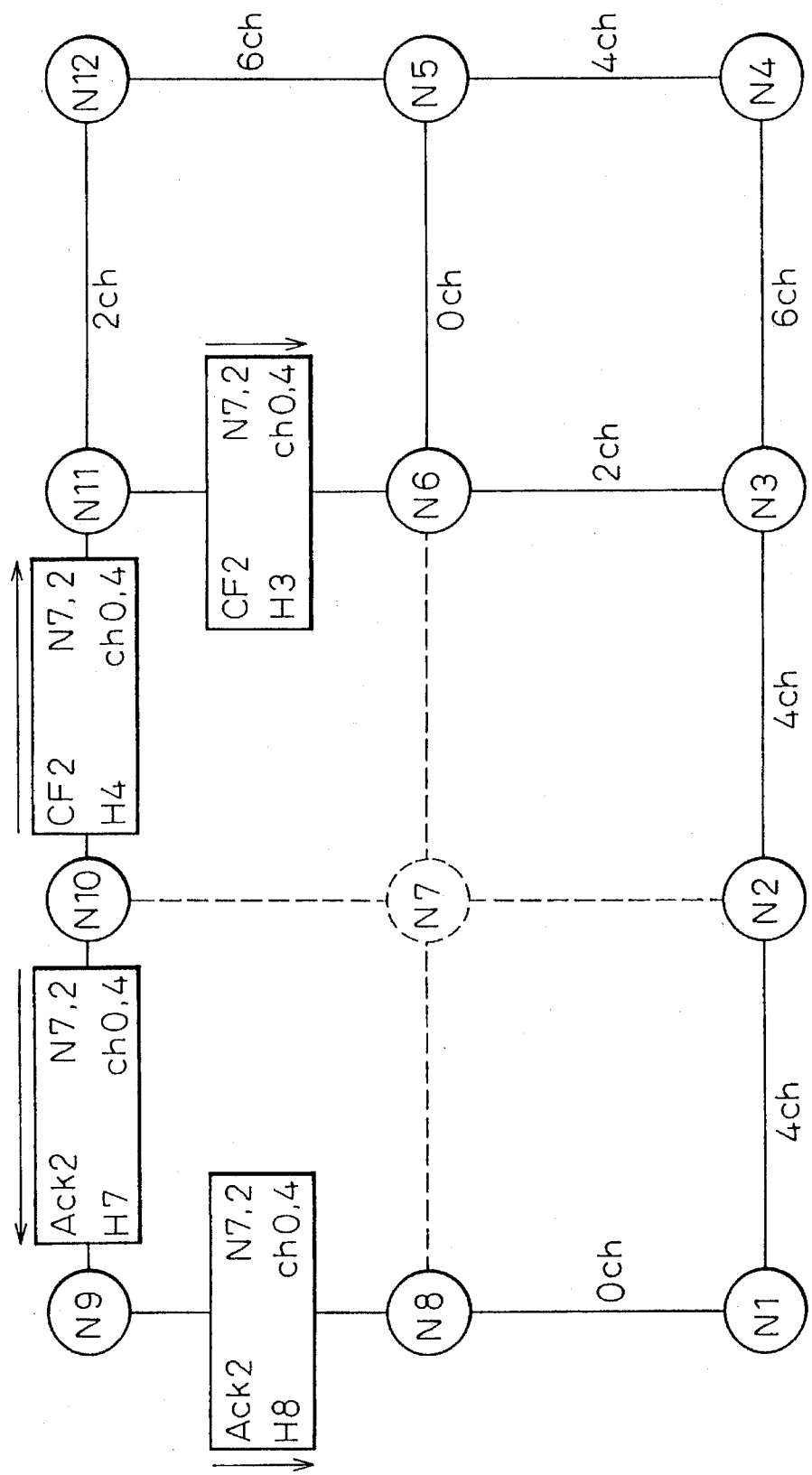
FIG. 19 is a view of a scenario (10) of a network in the present invention.
Figure 20:
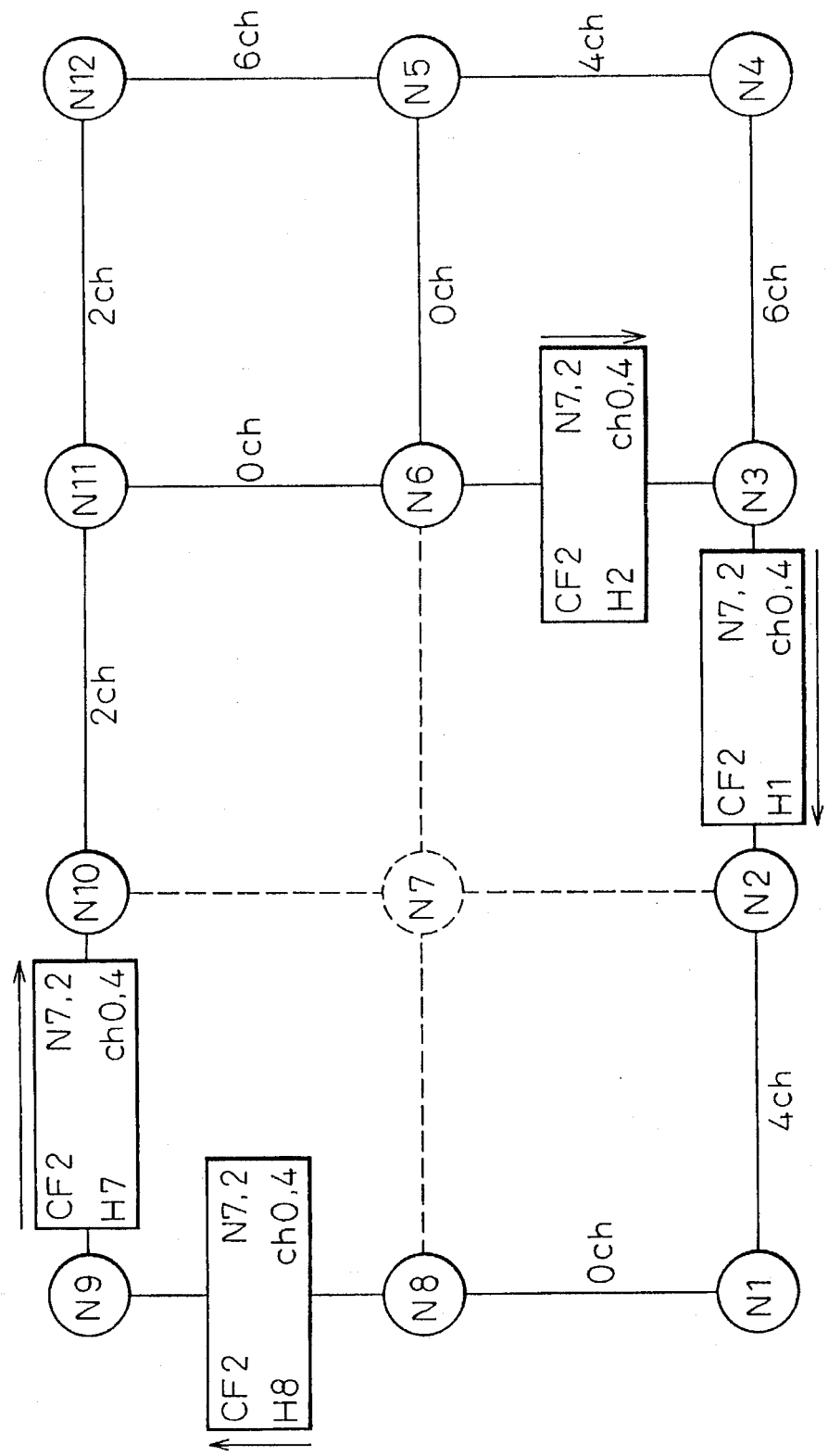
FIG. 20 is a view of a scenario (11) of a network in the present invention.
Figure 21:
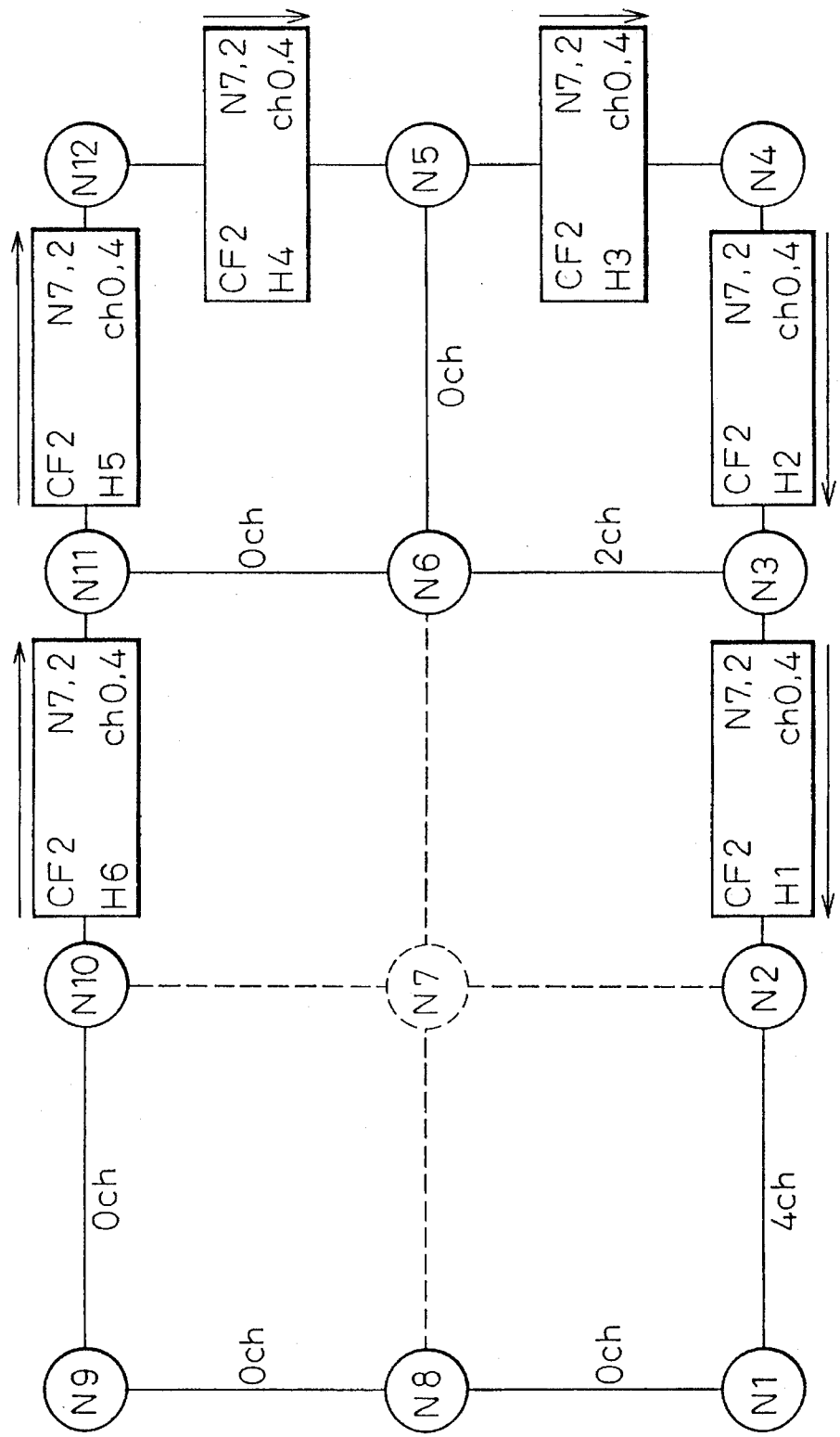
FIG. 21 is a view of a scenario (12) of a network in the present invention.

Take note of the node N3 in FIG. 16. The node N3 initiates the stage 4 for processing a cancellation message when receiving a cancellation message from the link L6→3. First, it executes the step 6.0 for releasing the spare channels and the phase 6.1 for registering the input cancellation message. Further, it executes the phase 6.2 for producing a dummy acknowledgment message so as prepare the dummy acknowledgment message shown in FIG. 37 and executes the phase 6.3 for relaying an acknowledgment message as if having received an acknowledgment message. As a result, it sends out the acknowledgment message shown in FIG. 38 to the link L3-4.

[10] Relaying of Confirmation Message

Take note of the node N9 in FIG. 16. The node N9 initiates the stage 5 for processing a confirmation message when receiving a confirmation message from the link L8→9. First, it executes the phase 7.1 for registering the input confirmation message and the step 7.0 for confirming the spare channels. Further, since the node N9 is not a chooser node, it executes the phase 7.2 for relaying the confirmation message and sends the confirmation message shown in FIG. 39 to the link L9→10. Next, it executes the phase 7.3 for starting the cross-connect equipment switching.

Similar procedures are executed for the other nodes as shown in FIG. 17 to FIG. 21.

[11] Sending of Cross-Connection Acknowledgment Message

Figure 22:
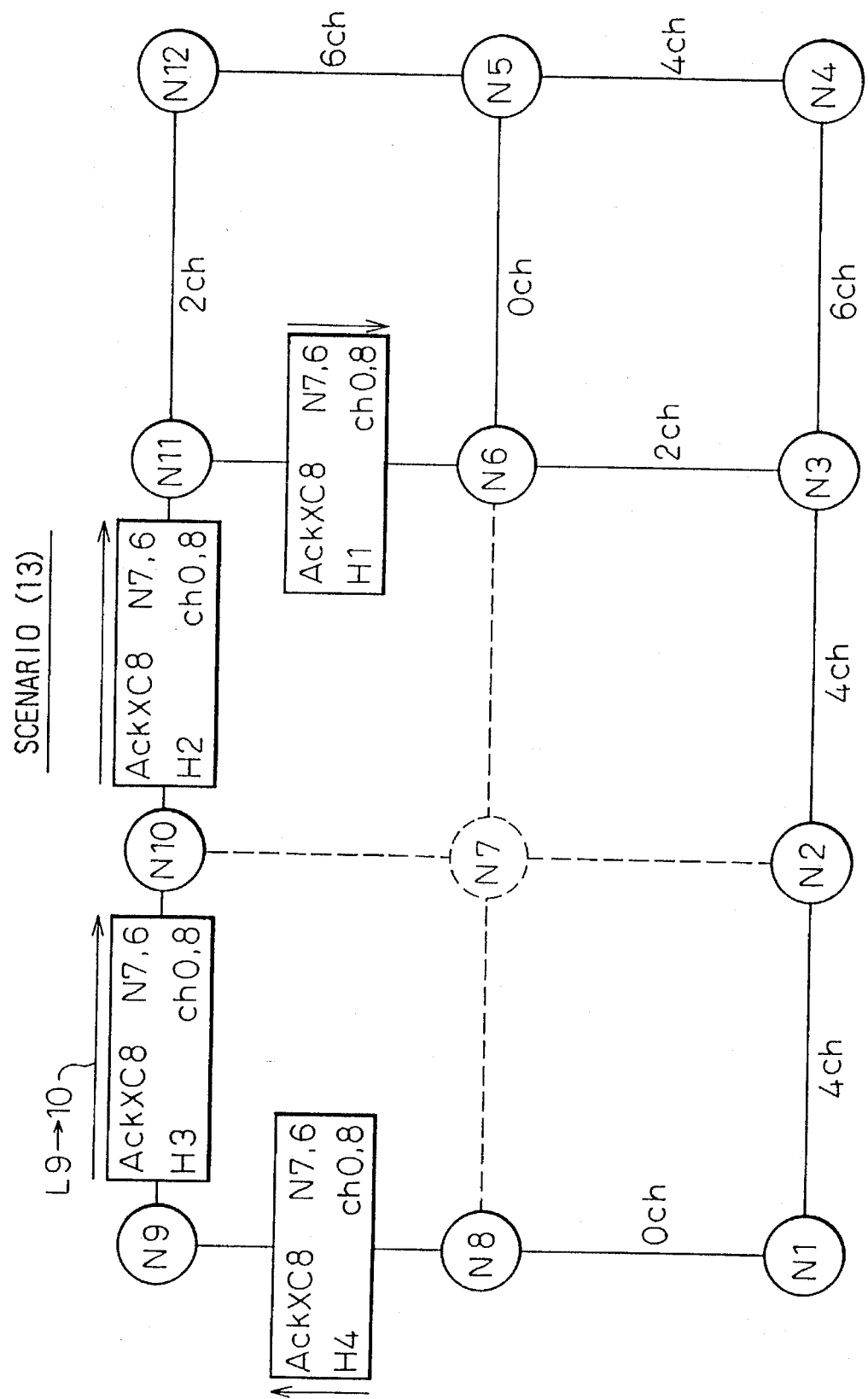
FIG. 22 is a view of a scenario (13) of a network in the present invention.

Take note of the node N8 in FIG. 22. The node N8 executes the phase for ending the cross-connect equipment switching when the cross-connect equipment switching completes. Since the node N8 is the sender node, it immediately executes the phase 8.03 for sending the cross-connection acknowledgment message and sends the cross-connection acknowledgment message shown in FIG. 40 to the link L8→9.

[12] Relaying of cross-connection acknowledgment message

Take note of the node N8 in FIG. 22. The node N9 initiates the stage 7 for processing a cross-connection acknowledgment message when receiving the cross-connection acknowledgment message from the link L8→9. If the cross-connect equipment switching in the node N9 has already completed, since the node N2 is not a chooser node stated in the message, it executes the phase 9.2 for relaying the cross-connection acknowledgment message and sends the cross-connection acknowledgment message shown in FIG. 41 to the link L9→10.

[13] Sending of Cross-Connection Acknowledgment Message

Figure 23:
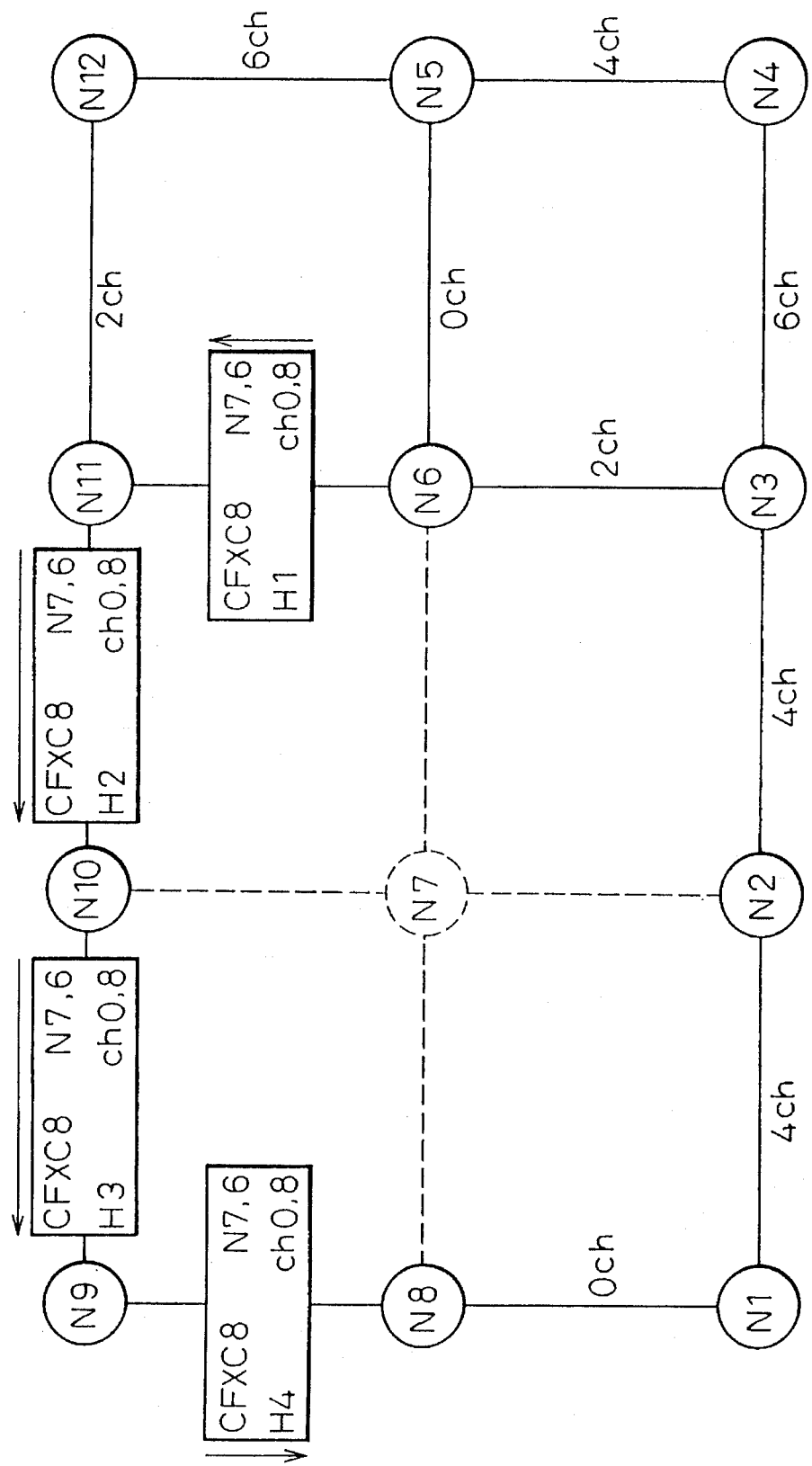
FIG. 23 is a view of a scenario (14) of a network in the present invention.
Figure 24:
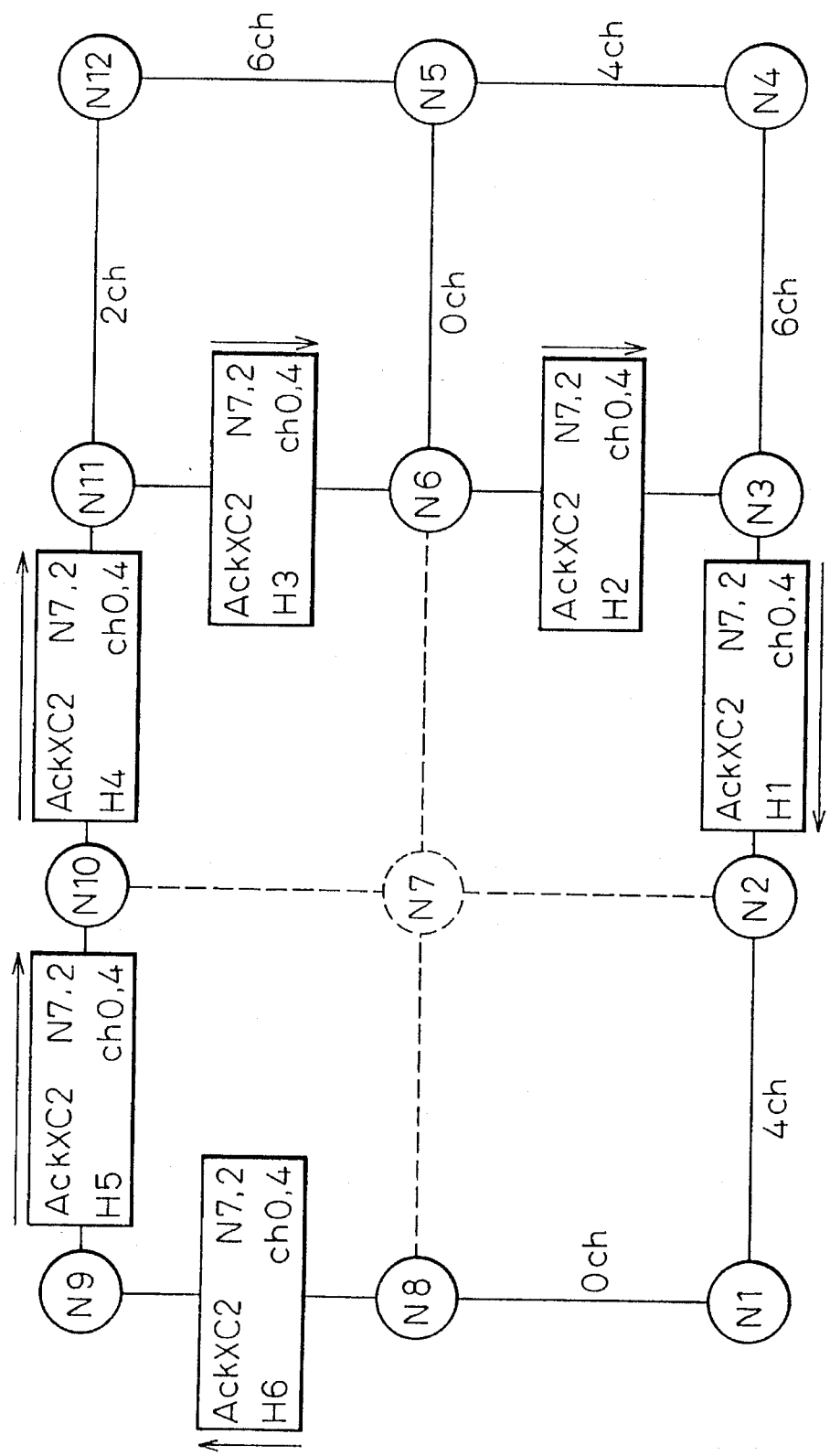
FIG. 24 is a view of a scenario (15) of a network in the present invention.
Figure 25:
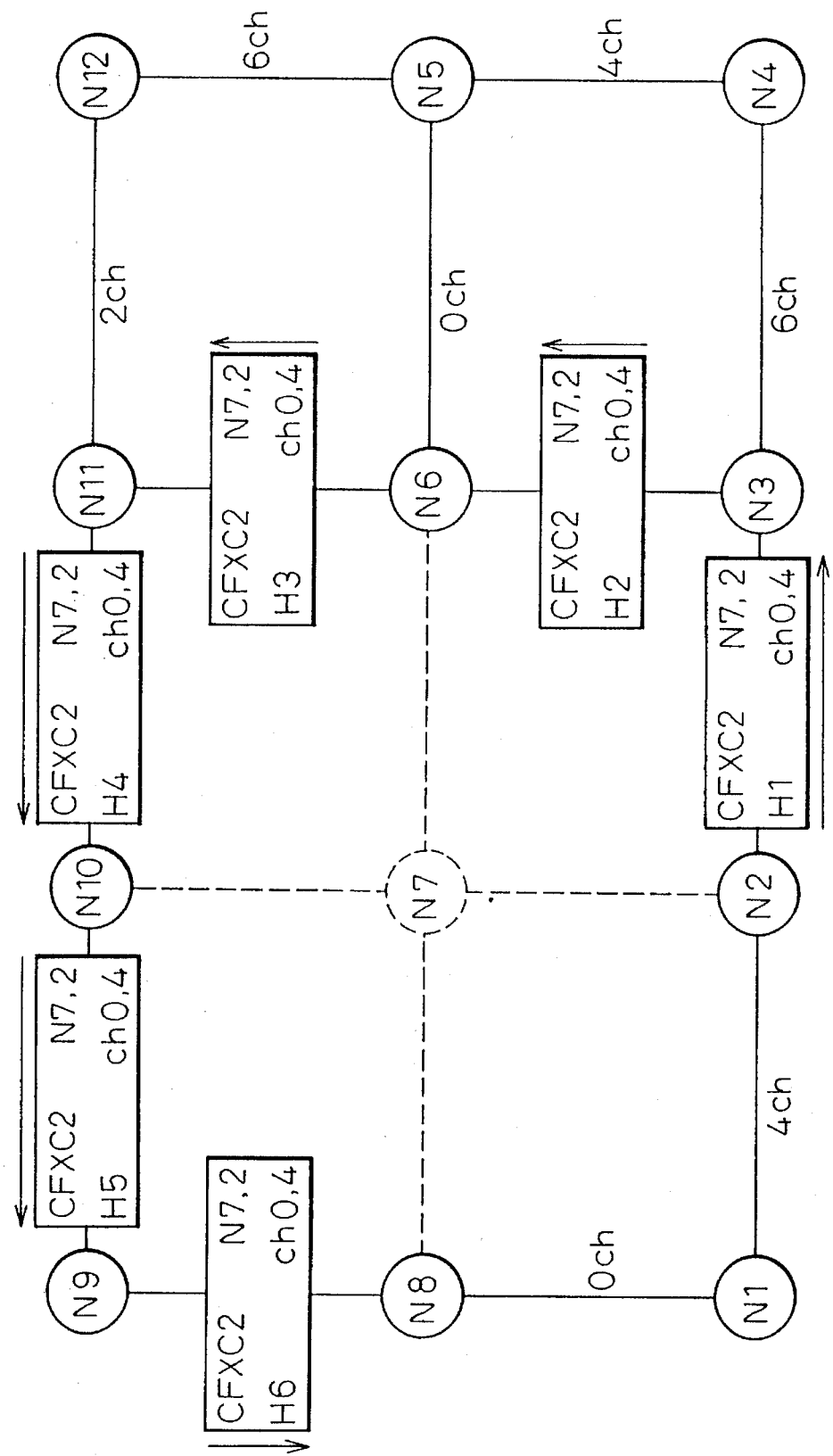
FIG. 25 is a view of a scenario (16) of a network in the present invention.
Figure 26:
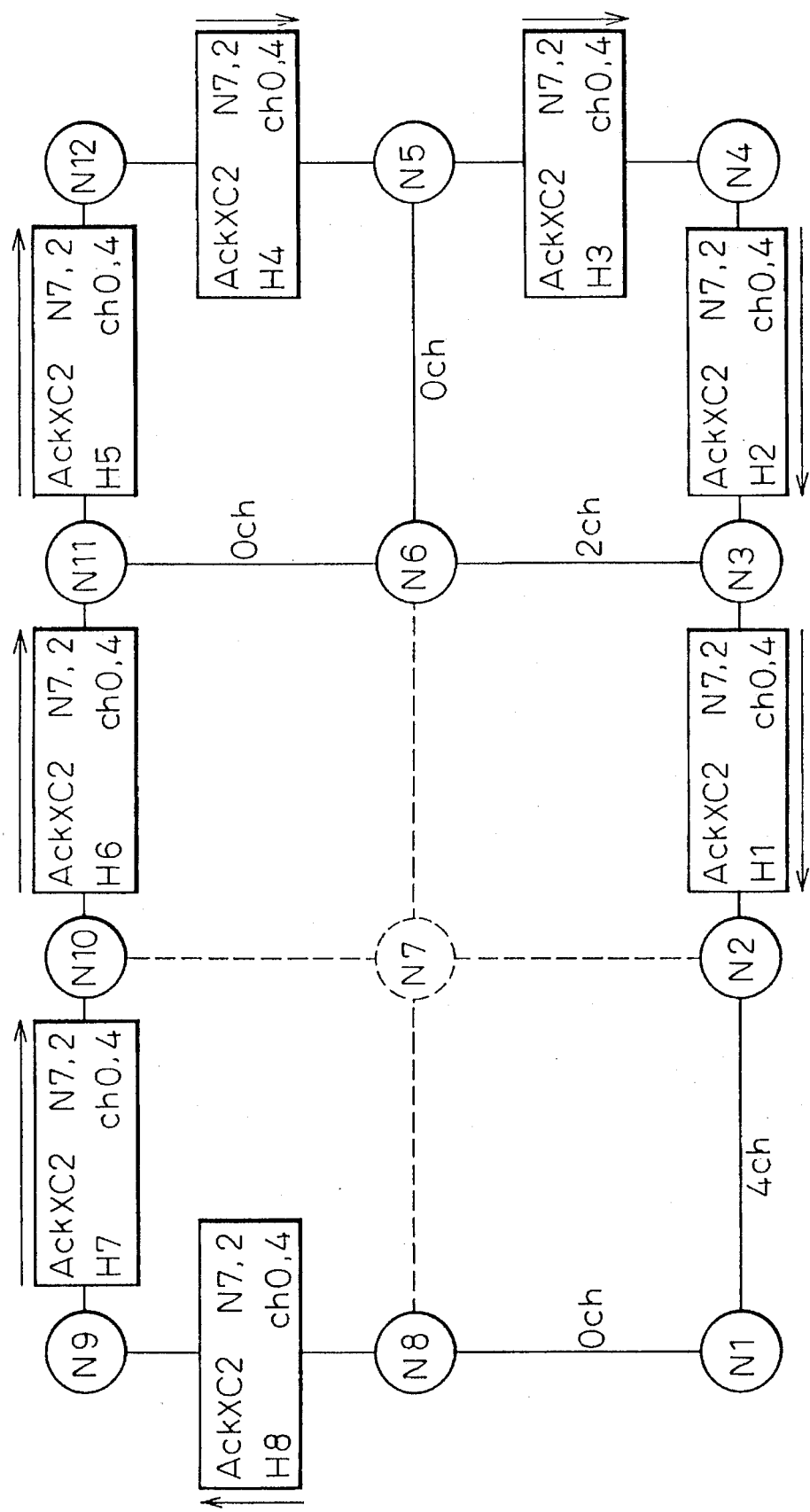
FIG. 26 is a view of a scenario (17) of a network in the present invention.
Figure 27:
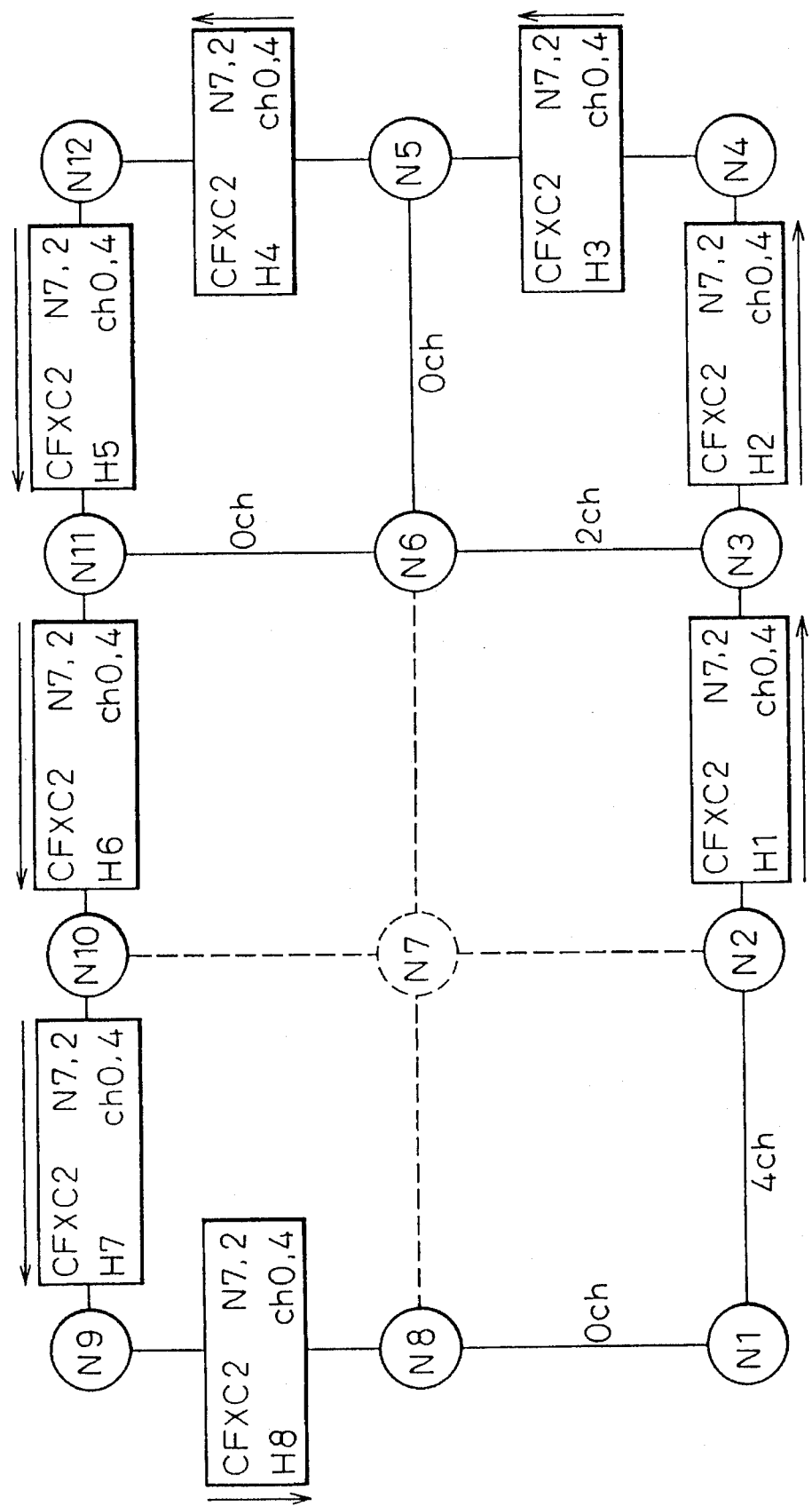
FIG. 27 is a view of a scenario (18) of a network in the present invention.

Take note of the node N6 in FIG. 23. The node N6 initiates the stage 7 for processing a cross-connection acknowledgment message when receiving the cross-connection acknowledgment message from the link L11→6. If the cross-connect equipment switching in the node N6 has already completed, since the node N9 is a chooser node stated in the message, it executes the phase 9.3 for sending the cross-connection confirmation message and sends the cross-connection confirmation message shown in FIG. 42 to the link L6→11.

[14] Ending of Failure Restoration Processing

Figure 28:
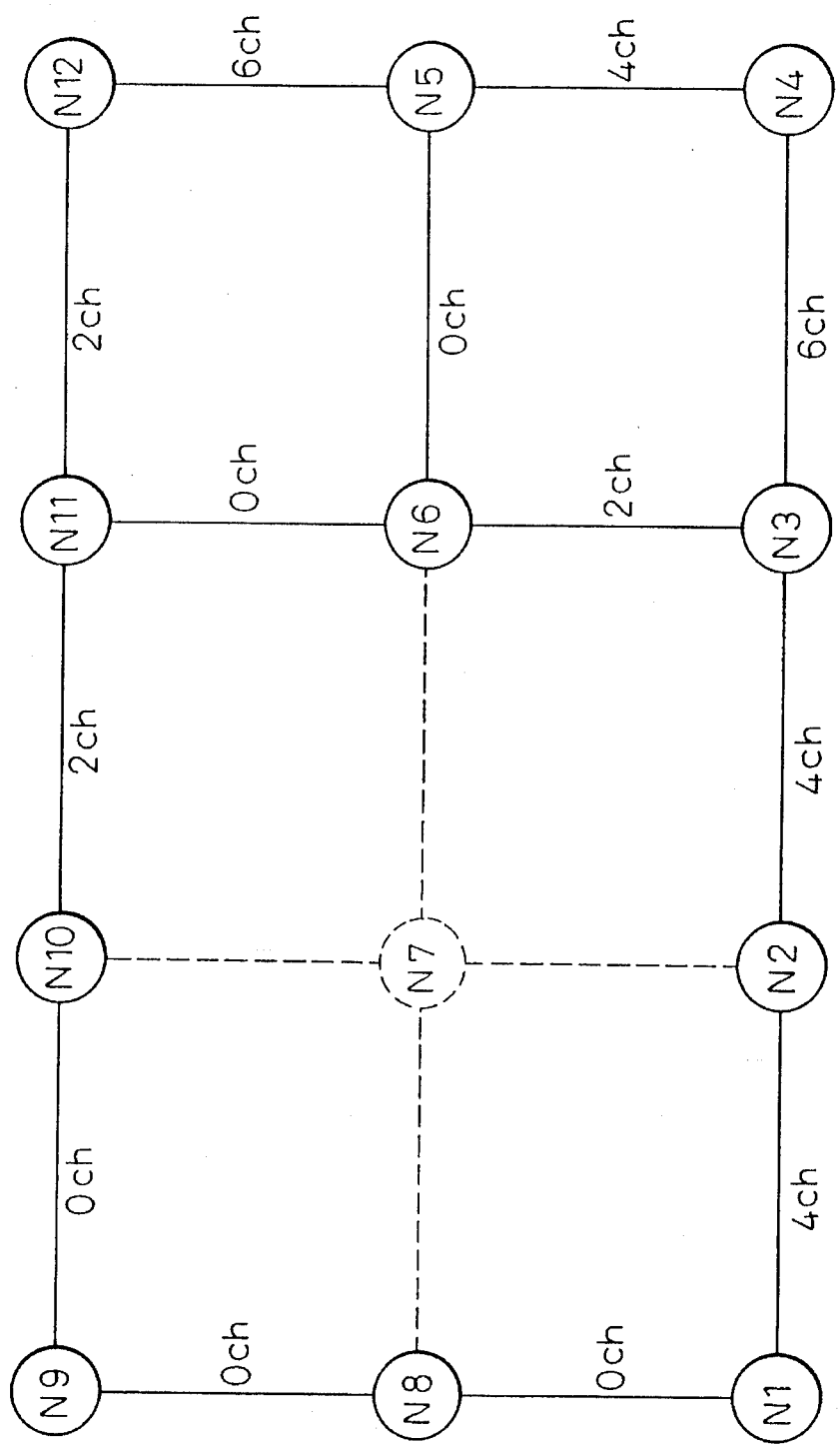
FIG. 28 is a view of a scenario (19) of a network in the present invention.
Figure 29:
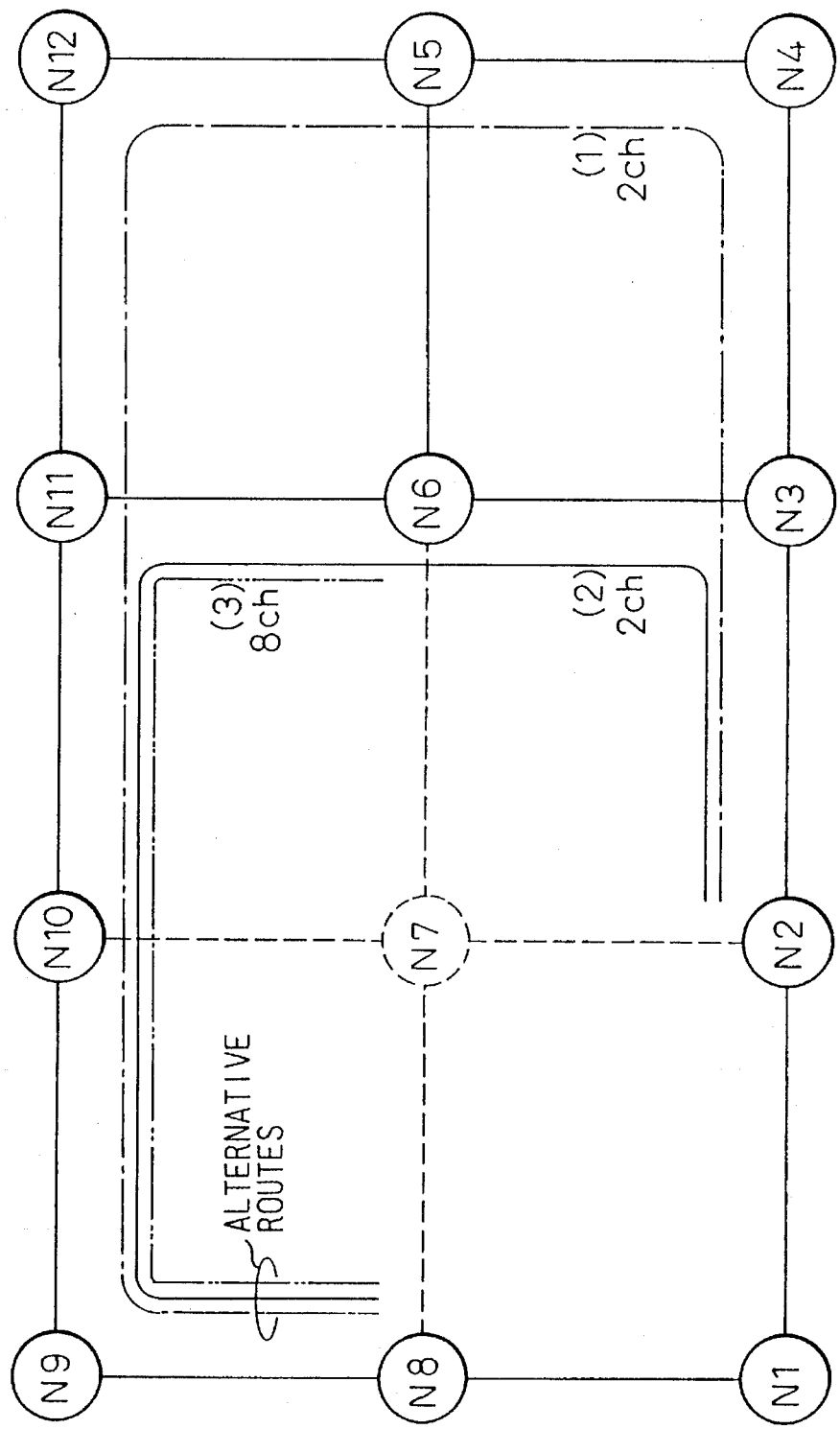
FIG. 29 is a view of a scenario (20) of a network in the present invention.

The above procedure is executed in other routes as well as shown in FIGS. 24 to FIG. 27. FIG. 28 shows the number of released channels of the links after all of the failure restoration processing has ended. Further, FIG. 29 shows the alternative routes secured as a result of the failure restoration processing. It shows that three alternative routes, shown by (1), (2), and (3), are formed.

[15] Arbitration of Competition Among Acknowledgment Messages

FIG. 43 shows a timetable in an example of arbitration of competition among acknowledgment messages, FIG. 43 show the timing of input and output of the acknowledgment messages and cancellation messages input and output at the two nodes A and B in a network topology. In the figure, the solid line arrows show the acknowledgment messages and the broken line arrows show the cancellation messages. The a to h, c', d', g', and h' given near the messages show the number of suppliable channels in the messages. Further, it is assumed that the node A is higher in priority than the node B, the number ω of released channels of the link A←→ just before the restoration processing was started was 20ch, and the number of suppliable channels in the message was as indicated in FIG. 44.

[15.1] When Node A Receives Acknowledgment Message d

The node A is higher in priority than the node B. Ther are three crossing messages, The crossing message table in this case is as shown in FIG. 46. If the number σ of canceled channels is set to 0, the number π of released port channels is:

$$\pi = \omega - a - b - c + e - g$$
$$= 20 - 7 - 5 - 7 + 2 - 3$$
$$= 0$$

so the number χ of the cancellation channels can be found to be $$\chi = d - \sigma - \pi - g + e$$
$$= 4 - 0 - 0 - 3 + 2$$
$$= 3$$

Accordingly, three channels are cancelled in the third message in the crossing message table.

Next, the number of the crossing messages is made 1. The number σ of the cancelled channels is made 3. Then, the number χ of the cancellation channels can be found to be $$\chi = d - \sigma - \pi$$
$$= 4 - 3 - 0$$
$$= 1$$

Accordingly, one channel is cancelled in the first message in the crossing message table.

[15.2] When Node A Receives Acknowledgment Message h

The node A is higher in priority than the node B. Ther are three crossing messages. The crossing message table in this case is as shown in FIG. 47. The number σ of canceled channels is set to 0. The number π of released port channels is:

$$\pi = 0 + f$$
$$= 0 + 3$$
$$= 3$$

so the number χ of the cancellation channels can be found to be $$\begin{aligned} \chi &= h - \sigma - \pi - g + e \\ &= 5 - 0 - 3 - 2 + 2 \\ &= 2 \end{aligned}$$

Accordingly, two channels are cancelled in the third message in the crossing message table.

Next, the number of the crossing messages is made 1. The number $\sigma$ of the cancelled channels is made 2. Then, the number $\chi$ of the cancellation channels can be found to be $$\begin{aligned} \chi &= h - \sigma - \pi \\ &= 5 - 2 - 3 \\ &= 0 \end{aligned}$$

Accordingly, no channel is cancelled in the first message g in the crossing message table.

[15.3] When Node B Receives Acknowledgment Message c

The node B is higher in priority than the node A. The number $\pi$ of released port channels is:

$$\begin{aligned} \pi &= \omega - a - b - d + f - h \\ &= 20 - 7 - 5 - 4 + 3 - 5 \\ &= 2 \end{aligned}$$

so the number of suppliable channels in the message c is made 2.

[15.4] When Node B Receives Acknowledgment Message g

The node B is higher in priority than the node A. The number $\pi$ of opened port channels is:

$$\begin{aligned} \pi &= 0 + e \\ &= 0 + 2 \\ &= 2 \end{aligned}$$

so the number of suppliable channels in the message g is made 2.

In this way, in the end, five channels are cancelled in the acknowledgment message, giving the equivalent of the an acknowledgment message indicating two channels, and one channel is cancelled in the acknowledgment message g, giving the equivalent of an acknowledgment message indicating two channels. Further, the acknowledgment messages c', d', g', and h' become as shown in FIG. 45.

Accordingly, it is possible to process competition for spare channels by acknowledgment messages without contradiction and with almost no waste by this competition arbitration algorithm.

[16] Modes of Operation

Figure 48:
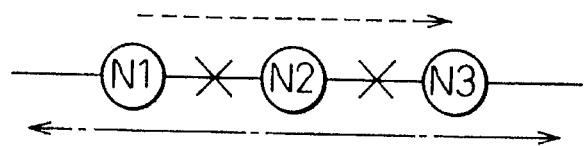
FIG. 48 is a scenario of operation (1) of the system of the present invention.

FIG. 48 shows a scenario of operation (1) of the system of the present invention which illustrates the processing at the time of occurrence of a failure at multiple links. As illustrated, when a multiple link failure occurs at the link L1←→2 and L2←→3 between the successively adjoining nodes N1, N2, and N3, the nodes N1, N2, and N3 detect the failure, but in this case, just the two nodes N1 and N3 at the two ends of the link initiate the failure restoration processing for the failed path passing through the two links illustrated. The center node N2 does not initiate failure restoration processing for the failed paths.

In this way, when a failure occurs at multiple links, the node detecting failures from two links in a failed path passing through two successive failed links does not perform restoration processing for the failed paths passing through the two links, so it is possible to prevent a plurality of nodes from performing redundant failure restoration processing.

Figure 49:
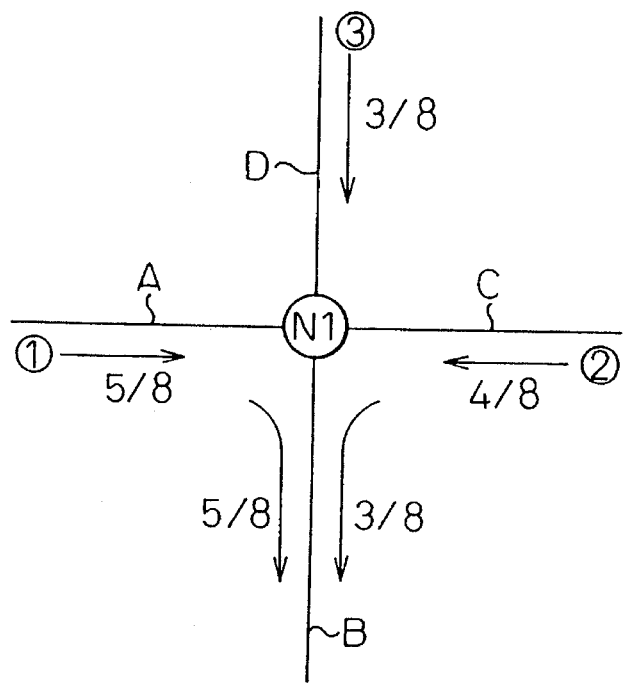
FIG. 49 is a view of a scenario of operation (2) of the system of the present invention.

FIG. 49 is a view of a scenario of operation (2) of the system of the present invention which illustrates the processing at the time of broadcasting a restoration message. As illustrated, at the node N1, where there are eight total requested channels in the restoration messages for the path B, if a restoration message indicating a total of eight requested channels and five (5/8) suppliable channels arrives from the path A, it is sent out to the path B as it is. Further, when a restoration message indicating a total number of eight requested channels and four (4/8) suppliable channels arrives from the path C, a restoration message indicating that just three of the channels are suppliable, i.e., a total of eight requested channels and three (3/8) suppliable channels is sent out to the path B. In the path B, the total number of channels requested is met, so even if a restoration message indicating a total number of eight requested channels and three (3/8) suppliable channels later arrives from the path D, it is not sent out to the path B.

Note that the restoration message limits the number of times nodes may be passed through (number of hops), so the node N1 does not sent out the restoration message if the number of hops exceeds the limit.

In this way, the restoration message continues to be broadcast from the node so long as the number of suppliable channels in the restoration messages of the same role sent out to the node does not exceed the total number of requested channels or the limit of the number of hops is not exceeded.

Figures 50A, 50B:
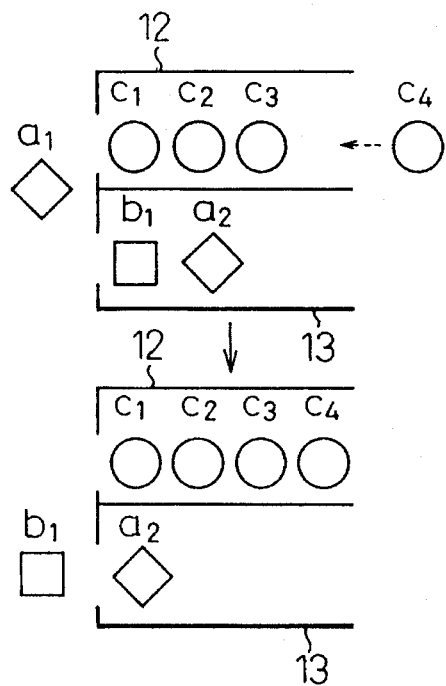

FIGS. 50A and 50B are views for explaining a scenario of operation (3) of the system of the present invention, wherein FIG. 50A shows the conventional case and FIG. 50B the case of the system of the present invention where the restoration message is processed on a nonpriority basis. As shown in FIG. 50A, in a state where a first type of message $a_1$ is being processed and a first type of message $a_2$ and a second type of message $b_1$ of high priorities and restoration messages $c_1, c_2,$ and $c_3$ of low priorities are stored in the queue 11, if a restoration message $c_4$ is input, it is necessary to store the restoration message $c_4$ and take out the message $b_1$ for processing, so the control of the queue 11 becomes complicated. Note that the restoration message is broadcast widely throughout the network, so the amount of the message becomes huge and is processed on a nonpriority basis.

As opposed to this, in the case of the present invention, as shown in FIG. 50B, the messages are separately stored in the cache 12 for the restoration messages and the cache 13 for other messages. Accordingly, in the system of the present invention, it is easy to process the restoration messages on a nonpriority basis and process other types of messages on a priority basis.

The restoration message is sent in different directions in the network as explained above, so along with the increase in their number, there was an unavoidable increase in the amount of processing of messages in the conventional system, but according to the present invention, it is easy to perform nonpriority processing on restoration messages, so it is possible to prevent loss of efficiency of message processing along with increases in the number of restoration messages.

Figure 51:
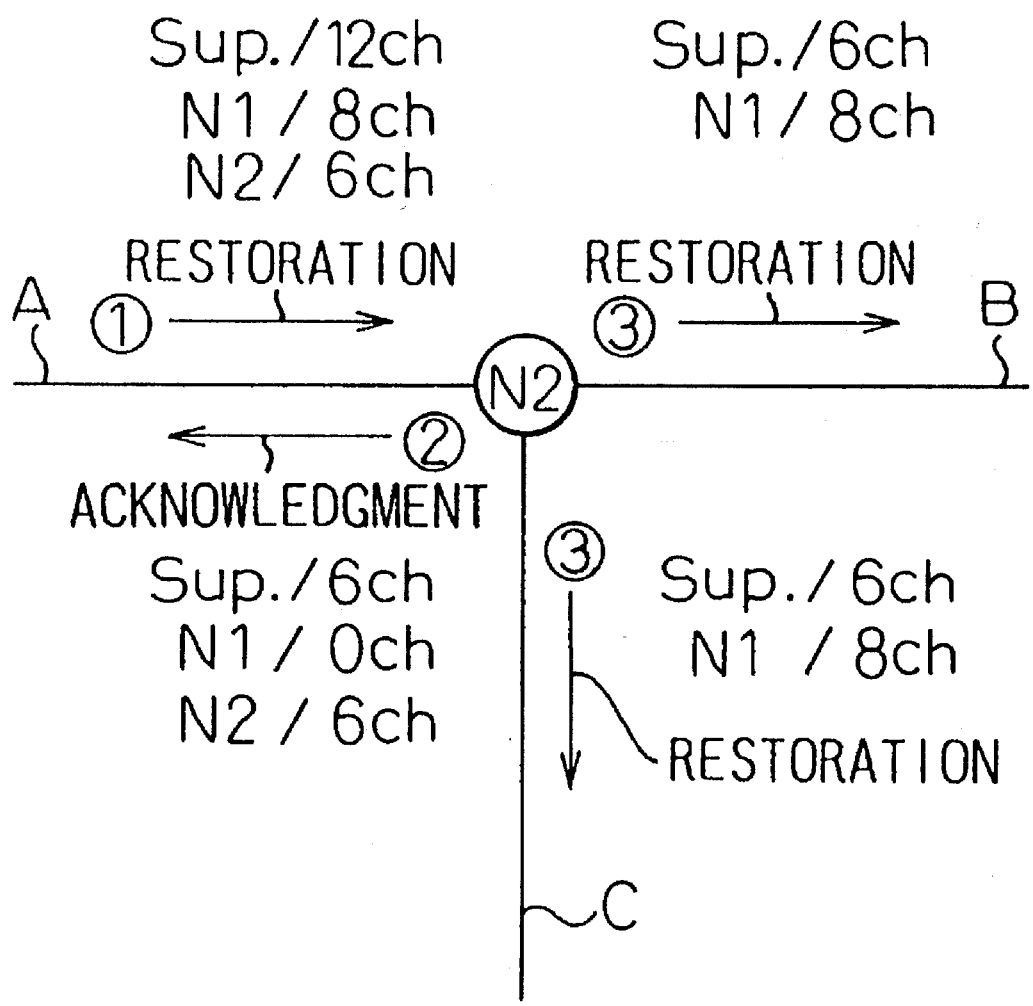
FIG. 51 is a view of a scenario of operation (4) of the system of the present invention.

FIG. 51 is a view of a scenario of operation (4) of the system of the present invention which illustrates the processing for the restoration message at the chooser candidate node. First, when a restoration message indicating 12 (Sup./12ch) as the number of suppliable channels from the path A and the node N1 and node N2, not shown in the path B, and the candidates as chooser nodes (N1/8ch, N2/6ch) arrives at a node N2, the node N2 sends back an acknowledgment message indicating 6 (Sup./6ch) as the number of suppliable channels of the path A N2 as a chooser node (N2/6ch, N1/0ch).

Further, the node N2 prepares a restoration message (N1/8ch) indicating eight channels and in which the node N2 has been removed from the candidates of chooser nodes, makes the number of suppliable channels 6 (Sup./6ch), and sends the message to the other two paths B and C.

When a candidate of a chooser node stated in the restoration message receives this restoration message, it returns an acknowledgment message for reserving the alternative route to the port at which the restoration message was received, then prepares a restoration message in which that node was removed from the candidates for chooser nodes and continues broadcasting it.

Figure 52:
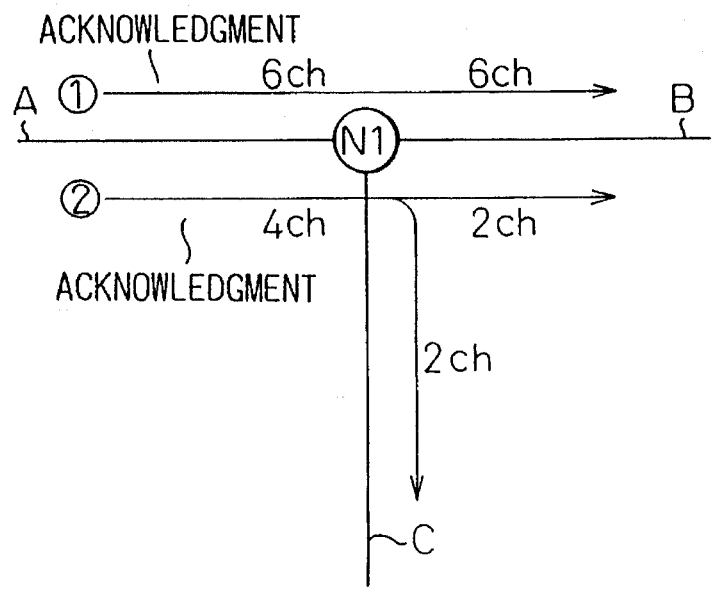
FIG. 52 is a view of a scenario of operation (5) of the system of the present invention.

FIG. 52 is a view of a scenario of operation (5) of the system of the present invention which illustrates the branching of an acknowledgment message. Assume that there are eight spare channels in the path B, the path B is used as the alternative route for the node N1, and there is a restoration message indicating six channels already received and recorded in the restoration message table. At this time, if an acknowledgment message indicating six channels arrives from the path A, the acknowledgment message is sent from the node N1 to the path B as it is.

After this, when a restoration message indicating the path B as an alternative route and indicating that four channels have already passed is recorded in the restoration message table of then ode N1 and an acknowledgment message for these four channels arrives from the path A, the node sends out an acknowledgment message indicating two channels to the remaining spare channels on the path B. Also, when it is recorded in the restoration message table of the node N1 that there is a restoration message indicating the path C as an alternative route and indicating two or more channels already passed, the node sends out an acknowledgment message indicating the remaining two channels using another path C as the alternative route.

In this way, the acknowledgment message is sent out based on the restoration message table, one or more of the earliest arriving restoration messages of the same role are selected until the number of suppliable channels is met or there are no longer any restoration messages, and the acknowledgment message is sent to the ports to which the restoration message were input. In this way, in the present invention, since the acknowledgment message can be branched to a plurality of routes, the alternative route can be set more flexibly.

Figure 53:
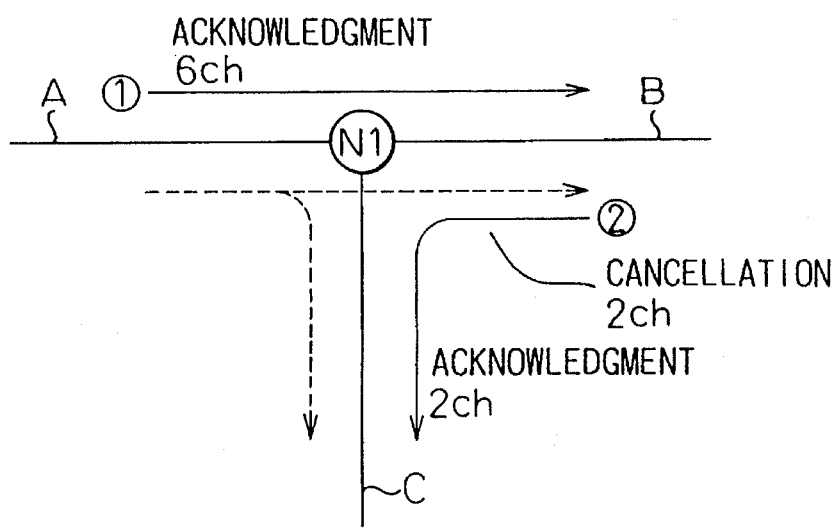
FIG. 53 is a view of a scenario of operation (6) of the system of the present invention.

FIG. 53 is a view of a scenario of operation (6) of the system of the present invention which illustrates the crankback of an acknowledgment message. An acknowledgment message indicating six channels is sent from the path A through the node N1, but only four channels can pass through the path B and a cancellation message for two channels is sent back. At this time, instead of sending this back to the path A, an attempt is made to send an acknowledgment message for two channels from the node N1 to another path C.

In this way, when an acknowledgment message of the number of suppliable channels cannot be sent, a cancellation message of the shortage is sent back to the node sending the acknowledgment message. That node does not return the cancellation message to the sender node as it is, but tries to send the acknowledgment message to another route once again. That is, it is made possible to crank back the acknowledgment message and speed up the search for an alternative route. To make this possible, the acknowledgment message and the cancellation message have information on the alternative route in the process of being reserved.

As explained above, according to the system for searching for alternative routes of the present invention, it is possible to search for alternative routes at a high speed even in case of failures at nodes or failures at multiple links. Further, it is possible to achieve a sufficiently high rate of restoration from failures.

We claim:

1. A system for searching for alternative routes in a network constituted by a plurality of nodes which searches for alternative routes by distributed control in the case of a failure at a link or node, wherein a node detecting a failure in a link or in a node executes a stage for initiation of failure restoration processing in accordance with an initiation message to determine and bundle the failed paths and create and send a restoration message for searching for alternative routes, a node receiving the restoration message executes a stage for processing the restoration message to send back an acknowledgment message for reserving an alternative route when that node is a candidate as a chooser node stated in the restoration message and relays the restoration message on when the node is not a candidate as a chooser node, a node receiving the acknowledgment message executes a stage for processing the acknowledgment message to send a confirmation message for confirming a reserved alternative route and start switching at cross-connect equipment when that node is the sender node in the restoration message and to relay the acknowledgment message and send back a cancellation message for cancelling reservation of the alternative route to the nodes for which reservation of alternative routes could not be continued when that node is not the sender node, a node receiving the cancellation message executes a stage for processing the cancellation message to release reserved spare channels and, then, tries to transmit an acknowledgment message once again to another route in the same way as the above stage for processing an acknowledgment message and suspends processing for chooser nodes for which reservation of the alternative route could not be continued, a node receiving the confirmation message executes a stage for processing the confirmation message to finally confirm the spare channels, starts the cross-connect equipment switching if the node is a chooser node, and relays the confirmation message if the node is not a chooser node, a node for which cross-connect equipment switching has been completed executes a stage for processing a cross-connection completion message in accordance with the cross-connection completion message, issues a cross-connection acknowledgment message when that node is the sender node, further issues a cross-connection confirmation message, when that node is not a sender node, if it has already received a cross-connection acknowledgment message and is a chooser node, and relays the cross-connection acknowledgment message if that node is not a chooser node, immediately accomplishes the processing if not yet receiving the cross-connection acknowledgment message when the cross-connect equipment switching has been started and, conversely, orders cross-connect equipment switching when switching has not yet been started, a node receiving a cross-connection acknowledgment message executes a stage for processing the cross-connection acknowledgment message to send the cross-connection confirmation message if that node is a chooser node at the completion of the cross-connect equipment switching and relay the cross-connection acknowledgment message if that node is not a chooser node, and a node receiving the cross-connection confirmation message executes a stage for processing the cross-connection confirmation message to relay the cross-connection confirmation message if that node is not the sender node and completion the relaying of the message if that node is the sender node, by which an alternative route is formed autonomously in a distributed manner.

2. A system for searching for alternative routes as set forth in claim 1, in which at the stage for initiation of failure restoration processing, a node detecting failure bundles the failed paths affected by that failure, holds the information on all of the chooser candidate node and the number of channels of corresponding paths as a message, and thereby starts to search for alternative routes for the failed paths all together, makes the next node on a failure side of a failed path a chooser candidate node of the message if that node is a termination node, makes the next node to the next node on a candidate if not the termination node, and decides on the node performing the restoration processing for the failed path based on the node identifiers at the end of the path on the failure side and the no. of the node at the end of the path of the nonfailed side.

3. A system for searching for alternative routes as set forth in claim 2, in which at the stage for initiation of the failure restoration processing, when a failure occurs at multiple links, a node detecting failures from two successive failed links on a failed path passing through the two links does not perform restoration processing on the failed path passing through the two links.

4. A system for searching for alternative routes as set forth in claim 2, in which at the stage for processing a restoration message, broadcasting is continued so long as the total number of suppliable channels in the messages of the same role sent to a port up until then, for each port able to send a restoration message for searching for an alternative route, exceeds the total number of requested channels or the number of hops does not exceed a certain limit.

5. A system for searching for alternative routes as set forth in claim 4, in which each node is provided with two message queues, one of which is used as a queue for restoration messages and the other as a queue for other types of messages, and the processing for restoration messages is executed on a nonpriority basis.

6. A system for searching for alternative routes as set forth in claim 4, in which at the stage for processing a restoration message, when a chooser candidate node stated in the restoration message receives a restoration message, it sends the message back to the port receiving a restoration message for reserving an alternative route, then prepares a restoration message from which that node has been removed from the chooser candidate nodes and continues the broadcasting of that message.

7. A system for searching for alternative routes as set forth in claim 2, in which at the stage for processing a restoration message, each node is provided with a restoration message table storing as information the received restoration messages, the port identifiers receiving them, and channel identifiers reserved by the acknowledgment messages and records the alternative route information in the table.

8. A system for searching for alternative routes as set forth in claim 2, in which at the stage for processing an acknowledgment message, each node is provided with an input message table storing the received messages and an output message table storing as information the output messages, the port identifiers receiving as input the messages which caused the processing, and the number of channels confirmed by the confirmation message for the acknowledgment messages and records information on the reservations and decisions of the alternative routes in the same manner.

9. A system for searching for alternative routes as set forth in claim 2, in which at the stage for processing an acknowledgment message, the acknowledgment message is transmitted with reference to the restoration message table, one or more messages arriving the earliest among the restoration messages of the same role are selected until the number of suppliable channels is met or there are no longer any restoration messages, and the acknowledgment messages can be divided into a plurality of messages by sending acknowledgment messages to the ports where the restoration messages were input.

10. A system for searching for alternative routes as set forth in claim 9, in which at the stage for processing an acknowledgment message, the acknowledgment message contains information on the number of the reverse acknowledgment messages and the number of reverse cancellation messages and finds the number of the acknowledgment messages and number of cancellation messages which crossed the acknowledgment message in question so as to arbitrate competition over spare channels among acknowledgment messages.

11. A system for searching for alternative routes as set forth in claim 10, in which at the stage for processing an acknowledgment message, it is decided if an acknowledgment message received by anode has priority over an acknowledgment message which crosses that acknowledgment message based on the no. of the node and the no. of the node passed just before, a cancellation message for cancelling the competing acknowledgment message is sent out and that first acknowledgment message is allowed to pass when it has priority, and reference is made to the spare channels of the ports and an acknowledgment message indicating the shortage of channels is stopped when it does not have priority.

12. A system for searching for alternative routes as set forth in claim 9, in which at the stage for processing a cancellation message, information on the alternative route being reserved by the acknowledgment message and the cancellation message is created and when a node cannot send an acknowledgment message indicating the number of suppliable channels, a cancellation message indicating the shortage is sent back to the node just before which sent the acknowledgment message so that the node just before tries to send the acknowledgment message once again.

13. A system for searching for alternative routes as set forth in claim 2, in which at the stage for processing a confirmation message, each node is provided with a cross-connection table storing as information the confirmation messages ordering switching, the input port identifiers, the output port identifiers, and the state of the starting, ending, and acknowledgmentment of the cross-connect equipment switching to thereby manage the cross-connect equipment.

14. A system for searching for alternative routes as set forth in claim 2, in which at the stage for processing a cross-connection acknowledgment message and the stage for processing a cross-connection confirmation message, the start of switching of the cross-connect equipment is instructed by the processing of the confirmation message and, when the switch instruction is received, if the corresponding cross-connect equipment switching completes, a cross-connection acknowledgment message is sent along the alternative route from the sender node to the chooser node, if the cross-connect switching does not complete, a cross-connection acknowledgment message to be sent when ending the switching is sent along the alternative route from the sender node to the chooser node, then a cross-connection confirmation message is sent from the chooser node to the sender node to confirm the cross-connect equipment switching.

* * * * *